United States Patent
Yamaguchi et al.

(10) Patent No.: US 9,443,421 B2
(45) Date of Patent: Sep. 13, 2016

(54) METHOD USED IN A SYSTEM FOR REMOTELY CONTROLLING AN APPLIANCE

(71) Applicant: Panasonic Corporation, Osaka (JP)

(72) Inventors: Takahiro Yamaguchi, Osaka (JP); Yuichi Futa, Ishikawa (JP); Natsume Matsuzaki, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 150 days.

(21) Appl. No.: 14/359,742

(22) PCT Filed: Nov. 11, 2013

(86) PCT No.: PCT/JP2013/006620
§ 371 (c)(1),
(2) Date: May 21, 2014

(87) PCT Pub. No.: WO2014/076927
PCT Pub. Date: May 22, 2014

(65) Prior Publication Data
US 2014/0347173 A1    Nov. 27, 2014

Related U.S. Application Data

(60) Provisional application No. 61/725,782, filed on Nov. 13, 2012.

(51) Int. Cl.
*G08C 17/02*       (2006.01)
*G06F 21/12*       (2013.01)
(Continued)

(52) U.S. Cl.
CPC ........... *G08C 17/02* (2013.01); *G06F 21/12* (2013.01); *H04L 12/2818* (2013.01); *H04L 63/0876* (2013.01); *G06F 2221/0797* (2013.01); *G08C 2201/61* (2013.01); *G08C 2201/93* (2013.01)

(58) Field of Classification Search
CPC ...... G08C 17/02; G08C 19/12; G08C 19/28; G08C 19/16; G06F 7/04; G06F 3/00; G06F 13/38; G05B 19/00
USPC .................. 726/1, 7; 710/8, 15, 62; 709/208; 340/5.21, 5.23, 5.64, 5.72, 5.25, 12.29, 340/12.16, 13.3; 398/106, 112, 115, 9; 455/151.4
See application file for complete search history.

(56) References Cited

U.S. PATENT DOCUMENTS 6,198,408 B1 * 3/2001 Cohen .................... G08C 19/28
340/12.16
6,647,494 B1    11/2003 Drews
(Continued)

FOREIGN PATENT DOCUMENTS

JP   2003-78971    3/2003
JP   2006-129184   5/2006
(Continued)

OTHER PUBLICATIONS

Notice of Allowance issued Mar. 2, 2015 in U.S. Appl. No. 14/147,908.
(Continued)

Primary Examiner — Thanhnga B Truong
(74) Attorney, Agent, or Firm — Wenderoth, Lind & Ponack, L.L.P.

(57) ABSTRACT

A method used in a remote control system for remotely controlling an appliance by execution of a remote control command contained in a control program stored in an operation terminal device, by which: a first identifier is acquired at a first time point (S801), the first identifier being unique to a portable medium located close to an operation terminal device serving as a remote controller for the appliance; the first identifier is embedded into the control program (S802); a second identifier is acquired at a second time point later than the first time point (S803), the second identifier being unique to a portable medium located close to the operation terminal device serving as the remote controller for the appliance; whether the first identifier matches the second identifier is determined (S804); and remote control of the appliance is prohibited when the first identifier does not match the second identifier (S805).

16 Claims, 34 Drawing Sheets

(51) Int. Cl.
*H04L 12/28* (2006.01)
*H04L 29/06* (2006.01)

(56) References Cited

U.S. PATENT DOCUMENTS

| | | | |
|---|---|---|---|
| 7,493,651 B2 * | 2/2009 | Vanska | G07C 9/00309 |
| | | | 726/2 |
| 8,024,582 B2 | 9/2011 | Kunitz et al. | |
| 8,232,861 B2 * | 7/2012 | Tsou | G08C 17/02 |
| | | | 340/5.21 |
| 8,321,933 B2 | 11/2012 | Traenkenschuh et al. | |
| 8,458,479 B2 | 6/2013 | Takashima | |
| 8,918,544 B2 * | 12/2014 | Chardon | H04N 5/44 |
| | | | 710/15 |
| 8,943,318 B2 | 1/2015 | Lee et al. | |
| 2004/0010561 A1 * | 1/2004 | Kim | G08C 17/00 |
| | | | 709/208 |
| 2010/0130254 A1 | 5/2010 | Kamada et al. | |
| 2012/0105217 A1 * | 5/2012 | Kao | H05B 37/029 |
| | | | 340/13.3 |
| 2013/0050093 A1 | 2/2013 | Kim et al. | |

FOREIGN PATENT DOCUMENTS

| | | |
|---|---|---|
| JP | 2013-45467 | 3/2013 |
| WO | 2008/129773 | 10/2008 |

OTHER PUBLICATIONS

International Search Report issued Feb. 10, 2014 in International (PCT) Application No. PCT/JP2013/006620.

* cited by examiner

Account management table 261

| Account information set |||| |
|---|---|---|---|---|
| User identifier | Password | Time-varying parameter | Unique identifier | |
| SATO | 1234 | AD7C | 8DA4 | 262 |
| ITO | Abcd | 7D2B | 9C5E | |
| JOHN | A2C4 | 4A69 | 7A3E | |
| PETER | 9876 | F93C | 85A1 | |
| ⋮ | ⋮ | ⋮ | ⋮ | |
| 263 | 264 | 265 | 266 | |

FIG. 7

Condition table 271

| Condition information | |
|---|---|
| Appliance information | Condition |
| Inside temperature and humidity measured by air conditioner | Login is unnecessary<br>Unique identifier is necessary |
| Locking state of Door | Login is necessary<br>Unique identifier is necessary |
| Channel of TV that is being tuned to | Login is unnecessary<br>Unique identifier is necessary |
| Title of DVD that is being played back | Login is unnecessary<br>Unique identifier is necessary |
| ⋮ | ⋮ |

273 — (Inside temperature and humidity measured by air conditioner)
272 — Login is unnecessary
274 — Unique identifier is necessary

FIG. 8

Control rule management table 281

| User identifier | SATO | 282 |
|---|---|---|
| Control rule information set ||| 
| Operation information | Condition | Item |
| Rule change | Unique identifier is necessary | — |
| Opening/ closing of door | Unique identifier is necessary | Locking |
| Power control of air conditioner | Unique identifier is necessary | OFF |
| Timer recording of TV program | Unique identifier is unnecessary Login is necessary | Starting of timer recording |
| Operation of living-room light | Unique identifier is necessary | ON, OFF |
| Operation of dining room light | Unique identifier is necessary | ON, OFF |
| Operation of security camera | Unique identifier is unnecessary Login is necessary | Deletion of data |
| ⋮ | ⋮ | ⋮ |

284 — Opening/closing of door
285 — (Rule change row callout)
283, 286 — Locking

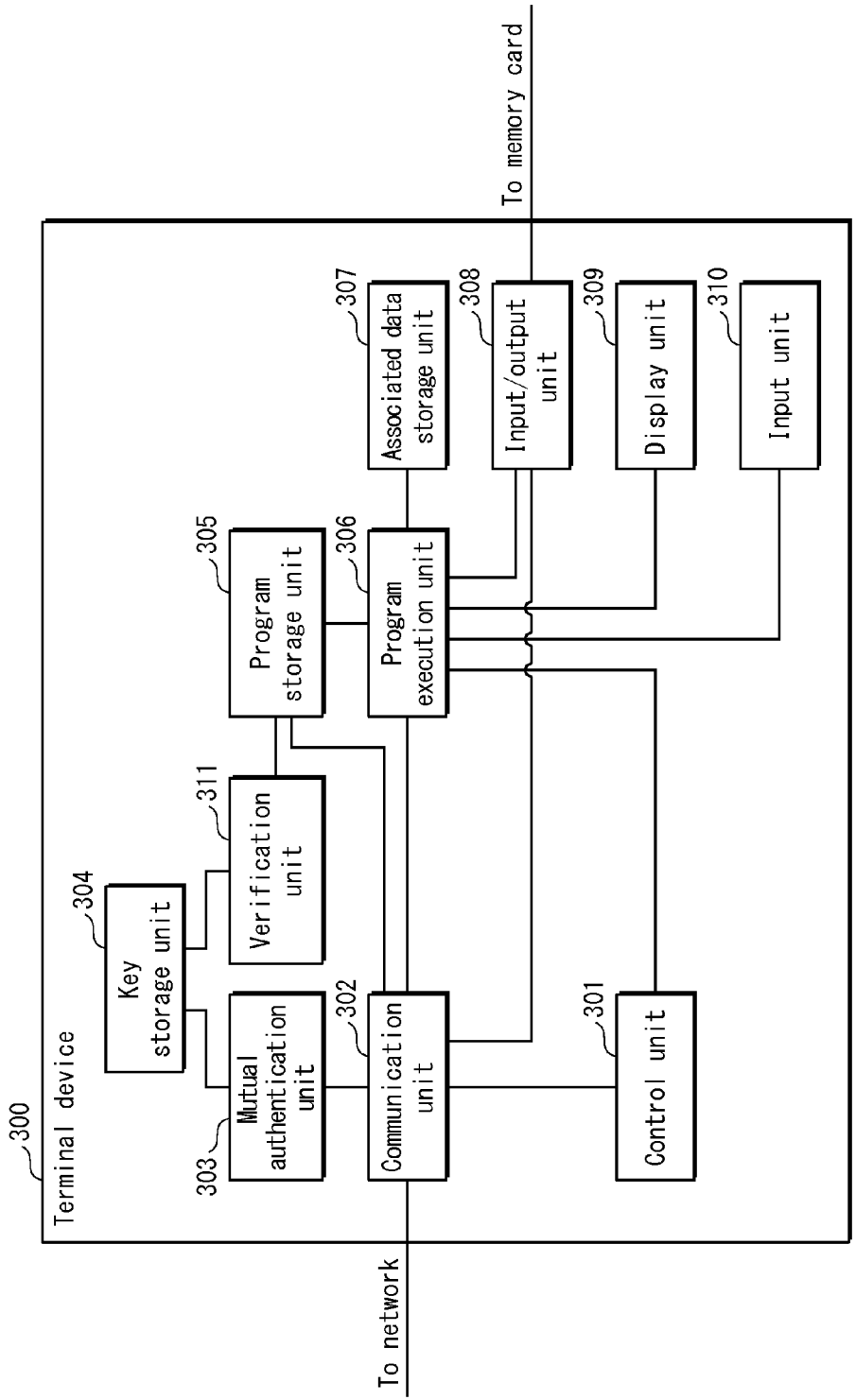

METHOD USED IN A SYSTEM FOR REMOTELY CONTROLLING AN APPLIANCE

This application claims benefit to the U.S. Provisional Application No. 61/725,782, filed on Nov. 13, 2012.

TECHNICAL FIELD

The present invention relates to technology used in a system for remotely controlling an appliance.

BACKGROUND ART

In recent years, various computer programs are provided to mobile terminals such as smart phones and tablets via a network or the like. By executing these programs, mobile terminals provide various functions and services to the users.

Patent Literature 1 discloses a mobile terminal that remotely controls a display device. The mobile terminal displays a control screen for receiving an instruction to control the display device. The user inputs an instruction by using the control screen displayed by the mobile terminal. The instruction thus input is transmitted to the display device, and the display device operates according to the instruction.

When a user attempts to remotely control an appliance installed inside a house by using a mobile terminal or the like outside the house, the mobile terminal or the like requests the user to input the identifier or the password of the user for identification of the user.

CITATION LIST

Patent Literature

[Patent Literature 1] Japanese Patent Application Publication No. 2013-45467

SUMMARY OF INVENTION

Technical Problem

However, there is a problem that if, for example, the identifier or the password of the user is exposed to a third party, the third party would be able to impersonate the user and to remotely control the appliance installed in the user's house.

To solve such a problem, the present invention aims to provide a method, a server device, and a system for preventing a user's appliance from being remotely controlled by an unauthorized third party.

Solution to Problem

To achieve the aim, one aspect of the present invention provides a method used in a remote control system for remotely controlling an appliance by execution of a remote control command contained in a control program stored in an operation terminal device, comprising: a first acquiring step of acquiring a first identifier at a first time point, the first identifier being unique to a portable medium located close to an operation terminal device serving as a remote controller for the appliance; an embedding step of embedding the first identifier into the control program stored in the operation terminal device; a second acquiring step of acquiring a second identifier at a second time point later than the first time point, the second identifier being unique to a portable medium located close to the operation terminal device serving as the remote controller for the appliance; a determining step of determining whether the first identifier embedded in the control program matches the second identifier acquired in the second acquiring step; and a prohibiting step of prohibiting remote control of the appliance when the first identifier does not match the second identifier.

Effects of Invention

This aspect prevents the user's appliance from being remotely controlled by an unauthorized third party.

BRIEF DESCRIPTION OF DRAWINGS

FIG. 7 shows an example data structure of a condition table 271.

FIG. 8 shows an example data structure of a control rule management table 281.

FIG. 9 is a block diagram showing the structure of a terminal device 300.

DESCRIPTION OF EMBODIMENTS

Figure 1:
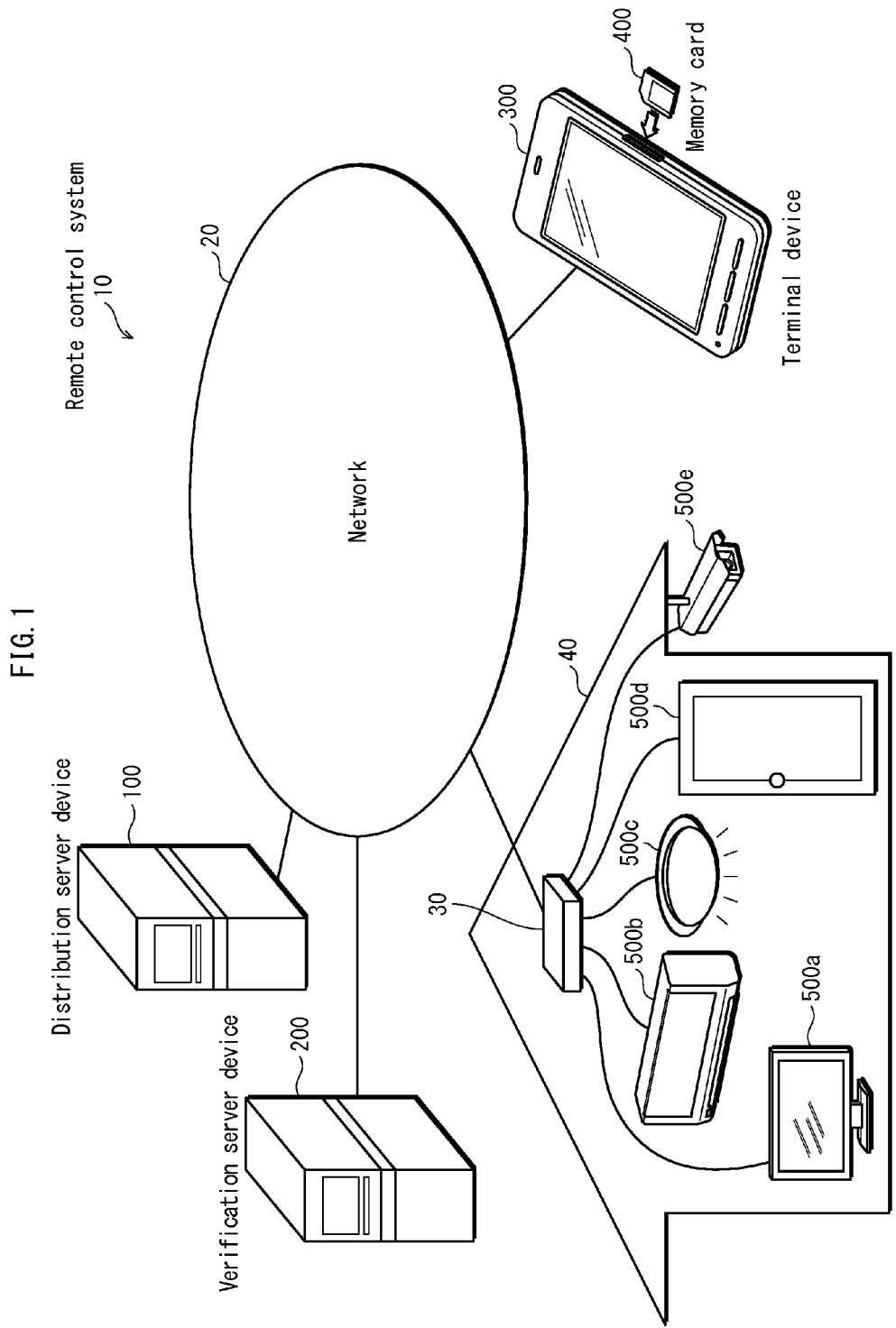
FIG. 1 shows the structure of a remote control system 10 as Embodiment 2 of the present invention.

On aspect of the present invention is a method used in a remote control system for remotely controlling an appliance by execution of a remote control command contained in a control program stored in an operation terminal device, comprising: a first acquiring step of acquiring a first identifier at a first time point, the first identifier being unique to a portable medium located close to an operation terminal device serving as a remote controller for the appliance; an embedding step of embedding the first identifier into the control program stored in the operation terminal device; a second acquiring step of acquiring a second identifier at a second time point later than the first time point, the second identifier being unique to a portable medium located close to the operation terminal device serving as the remote controller for the appliance; a determining step of determining whether the first identifier embedded in the control program matches the second identifier acquired in the second acquiring step; and a prohibiting step of prohibiting remote control of the appliance when the first identifier does not match the second identifier.

This aspect prevents the user's appliance from being remotely controlled by an unauthorized third party.

The operation terminal device may remotely control the appliance via a server device. The server device stores the control program in which the first identifier has not been embedded. The determining step may include: a first step, performed by the operation terminal device, of generating a first operation value by applying a one-way operation to the control program stored in the operation terminal device in which the first identifier has been embedded, and generating a second operation value by applying an operation to the first operation value and the second identifier; a second step, performed by the server device, of embedding the first identifier into the control program stored in the server device, generating a third operation value by applying a same one-way operation as said one-way operation to the control program in which the first identifier has been embedded, and generating a fourth operation value by applying a same operation as said operation to the third operation value and the first identifier; and a third step, performed by the server device, of determining whether the first identifier matches the second identifier by determining whether the second operation value matches the fourth operation value.

The stated structure allows for the matching determination without direct comparison between the first identifier and the second identifier.

The acquiring of the first identifier, the embedding into the control program, the acquiring of the second identifier, the determining and the prohibiting, respectively performed in the first acquiring step, the embedding step, the second acquiring step, the determining step, the determining step and the prohibiting step, may be sequentially repeated, and in the embedding step, the first identifier may be embedded into the control program every time the first identifier is acquired in the first acquiring step.

The stated structure allows for repetition of the embedding of the first identifier, thereby improving the protection against unauthorized remote control.

The first time point is a point when the operation terminal device receives an instruction to remotely control the appliance, and in the first acquiring step, the first identifier may be acquired each time the operation terminal device receives the instruction.

In the embedding step, a random number may be generated, a conversion, which is reversible, may be applied to the random number and the first identifier, and a conversion value obtained by the conversion may be embedded into the control program, and in the determining step, a reverse of the conversion may be applied to the random number and the conversion value embedded in the control program, and the first identifier may be thereby restored.

The stated structure allows for embedding of a conversion value generated from the random number and the first identifier, thereby improving the protection against unauthorized remote control.

In the method, the acquiring of the first identifier, the embedding into the control program, the acquiring of the second identifier, the determining and the prohibiting, respectively performed in the first acquiring step, the embedding step, the second acquiring step, the determining step, the determining step and the prohibiting step, may be sequentially repeated, and in the embedding step, a different random number may be generated each time the first identifier is acquired in the first acquiring step, the conversion may be applied to the random number and the first identifier, and the conversion value obtained by the conversion may be embedded into the control program.

In the determining step, the control program in which the first identifier has been embedded may be acquired, and the first identifier may be extracted from the control program.

This structure reduces the possibility of acquisition of the first identifier when the control program is replaced with another control program, thereby improving the protection against unauthorized remote control.

In the embedding step, the first identifier may be divided into a plurality of identifier pieces, and the plurality of identifier pieces may be dispersed over the control program or a portion of the control program, and in the determining step, the plurality of identifier pieces may be extracted from the control program or the portion of the control program, the plurality of identifier pieces may be combined together, and the first identifier may be thereby restored.

This structure reduces the possibility of acquisition of the first identifier when the control program is replaced with another control program, thereby improving the protection against tampering with the control program.

The control program may include a command region storing commands and a data region storing data, and in the embedding step, the first identifier may be embedded into the data region in the control program.

The stated structure allows for the embedding of the first identifier into the data region, and does not affect the commands contained in the control program.

The control program may include a command region storing commands and a data region storing data, the commands including a dummy command that is not to be executed, and in the embedding step, the first identifier may be embedded into the dummy command in the control program.

The stated structure allows for the embedding of the first identifier into the dummy command, and does not affect the other commands contained in the control program.

In the embedding step, an embedding program for controlling the embedding of the first identifier into the control program may be acquired, and the first identifier may be embedded into the control program by execution of the embedding program by the operation terminal device.

The stated structure allows for controlling the embedding of the first identifier by execution of the embedding program.

The embedding program may indicate an embedding position within the control program where the first identifier is to be embedded, and in the embedding step, the first identifier may be embedded into the embedding position within the control program.

The stated structure allows for controlling the embedding position of the first identifier by execution of the embedding program.

The first time point may be a point when the control program is installed onto the operation terminal device, a point when the control program in the operation terminal device is initially started up, or any point when the control program in the operation terminal device is started up, and the second time point may be a point when the operation terminal device receives the instruction to remotely control the appliance.

The first time point may be a point when the operation terminal device receives a first remote control instruction to remotely control the appliance, and the second time point may be a point when the operation terminal device receives a second remote control instruction to remotely control the appliance.

The operation terminal device may remotely control the appliance via a server device. The method may further comprise: a displaying step, performed by the operation terminal device, of displaying one or more instructions selectable by a user, from among a plurality of instructions to remotely control the appliance; a receiving step, performed by the operation terminal device, of receiving a single instruction selected by the user from among the plurality of instructions; and a transmitting step, performed by the operation terminal device, of transmitting the single instruction to the appliance via the server device The operation terminal device may remotely control the appliance via a server device. The method may further comprise: a displaying step, performed by the operation terminal device, of displaying a first condition and a second condition in association with information on an operation of remotely controlling the appliance, the first condition being a condition for accepting the operation, and the second condition being a candidate for replacing the first condition; a receiving step, performed by the operation terminal device, of receiving an instruction to select the second condition from a user; a transmitting step of transmitting the second condition from the operation terminal device to the server device; and a storing step, performed by the server device, of storing the second condition instead of the first condition in association with the information on the operation of remotely controlling the appliance.

Another aspect of the present invention is a server device for relaying a remote control instruction between an operation terminal device and an appliance, the operation terminal device remotely controlling the appliance by execution of a remote control command contained in a control program stored in the operation terminal device, comprising: a first acquiring unit acquiring a first identifier at a first time point, the first identifier being unique to a portable medium located close to an operation terminal device serving as a remote controller for the appliance; a transmitting unit transmitting the first identifier to the operation terminal device in order to allow for embedding of the first identifier into the control program stored in the operation terminal device; a second acquiring unit acquiring a second identifier at a second time point later than the first time point, the second identifier being unique to a portable medium located close to the operation terminal device serving as the remote controller for the appliance; a determining unit determining whether the first identifier embedded in the control program matches the second identifier acquired by the second acquiring unit; and a prohibiting unit prohibiting remote control of the appliance when the first identifier does not match the second identifier.

This aspect prevents the user's appliance from being remotely controlled by an unauthorized third party.

Another aspect of the present invention is a computer-readable recording medium storing a computer program used in a server device for relaying a remote control instruction between an operation terminal device and an appliance, the operation terminal device remotely controlling the appliance by execution of a remote control command contained in a control program stored in the operation terminal device, the computer program being for performing: a first acquiring step of acquiring a first identifier at a first time point, the first identifier being unique to a portable medium located close to an operation terminal device serving as a remote controller for the appliance; a transmitting step of transmitting the first identifier to the operation terminal device in order to allow for embedding of the first identifier into the control program stored in the operation terminal device; a second acquiring step of acquiring a second identifier at a second time point later than the first time point, the second identifier being unique to a portable medium located close to the operation terminal device serving as the remote controller for the appliance; a determining step of determining whether the first identifier embedded in the control program matches the second identifier acquired in the second acquiring step; and a prohibiting step of prohibiting remote control of the appliance when the first identifier does not match the second identifier.

This aspect prevents the user's appliance from being remotely controlled by an unauthorized third party.

Another aspect of the present invention is a method used in a server device for relaying a remote control instruction between an operation terminal device and an appliance, the operation terminal device remotely controlling the appliance by execution of a remote control command contained in a control program stored in the operation terminal device, comprising: a first acquiring step of acquiring a first identifier at a first time point, the first identifier being unique to a portable medium located close to an operation terminal device serving as a remote controller for the appliance; a transmitting step of transmitting the first identifier to the operation terminal device in order to allow for embedding of the first identifier into the control program stored in the operation terminal device; a second acquiring step of acquiring a second identifier at a second time point later than the first time point, the second identifier being unique to a portable medium located close to the operation terminal device serving as the remote controller for the appliance; a determining step of determining whether the first identifier embedded in the control program matches the second identifier acquired in the second acquiring step; and a prohibiting step of prohibiting remote control of the appliance when the first identifier does not match the second identifier.

This aspect prevents the user's appliance from being remotely controlled by an unauthorized third party.

Another aspect of the present invention is an integrated circuit included in a server device for relaying a remote control instruction between an operation terminal device and an appliance, the operation terminal device remotely controlling the appliance by execution of a remote control command contained in a control program stored in the operation terminal device, comprising: a first acquiring unit acquiring a first identifier at a first time point, the first identifier being unique to a portable medium located close to an operation terminal device serving as a remote controller for the appliance; a transmitting unit transmitting the first identifier to the operation terminal device in order to allow for embedding of the first identifier into the control program stored in the operation terminal device; a second acquiring unit acquiring a second identifier at a second time point later than the first time point, the second identifier being unique to a portable medium located close to the operation terminal device serving as the remote controller for the appliance; a determining unit determining whether the first identifier embedded in the control program matches the second identifier acquired by the second acquiring unit; and a prohibiting unit prohibiting remote control of the appliance when the first identifier does not match the second identifier.

This aspect prevents the user's appliance from being remotely controlled by an unauthorized third party.

Another aspect of the present invention is a system including: an operation terminal device remotely controlling an appliance by execution of a remote control command contained in a control program stored in the operation terminal device; the appliance; and a server device relaying a remote control instruction between the operation terminal device and the appliance, the server device comprising: a first acquiring unit acquiring a first identifier at a first time point, the first identifier being unique to a portable medium located close to an operation terminal device serving as a remote controller for the appliance; a transmitting unit transmitting the first identifier to the operation terminal device in order to allow for embedding of the first identifier into the control program stored in the operation terminal device; a second acquiring unit acquiring a second identifier at a second time point later than the first time point, the second identifier being unique to a portable medium located close to the operation terminal device serving as the remote controller for the appliance; a determining unit determining whether the first identifier embedded in the control program matches the second identifier acquired by the second acquiring unit; and a prohibiting unit prohibiting remote control of the appliance when the first identifier does not match the second identifier, and the operation terminal device comprising: an acquiring unit acquiring an identifier from a portable medium located close to the operation terminal device, the identifier being unique to the portable medium; a transmitting unit transmitting the identifier to the server device; and an embedding unit receiving the first identifier from the server device and embedding the first identifier into the control program.

This aspect prevents the user's appliance from being remotely controlled by an unauthorized third party.

1. Embodiment 1

The following describes a remote control system 10e as Embodiment 1 pertaining to the present invention.

Figure 35:
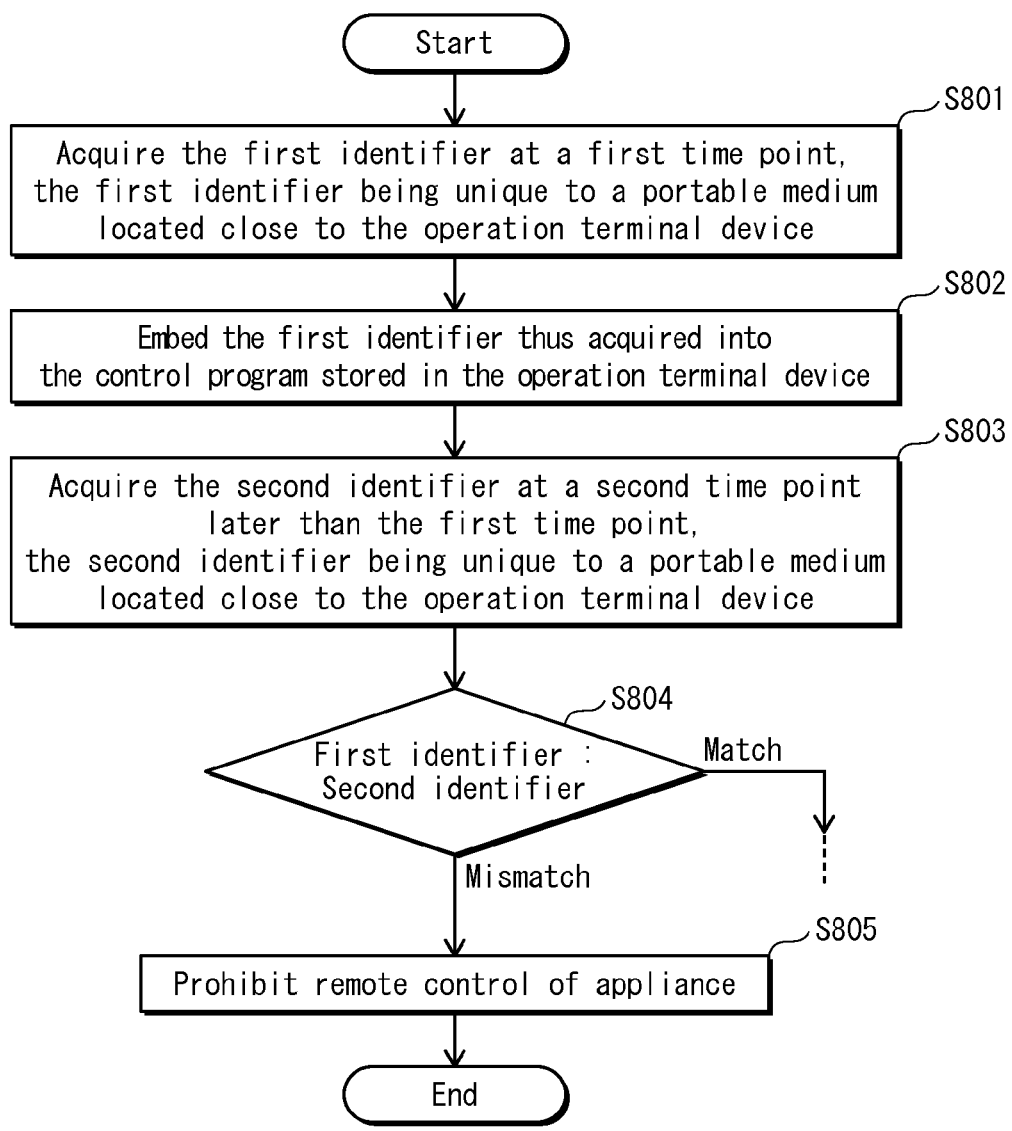
FIG. 35 is a flowchart showing operational procedures performed within a remote control system 10e as Embodiment 1 of the present invention.

(1) Referring to the flowchart shown in FIG. 35, the following describes a method used in the remote control system 10e that remotely controls appliances by execution of a remote control command contained in a control program stored in an operation terminal device.

The method used in a remote control system 10e comprises: a first acquiring step (Step S801) of acquiring a first identifier at a first time point, the first identifier being unique to a portable medium located close to an operation terminal device serving as a remote controller for the appliance; an embedding step (Step S802) of embedding the first identifier into the control program stored in the operation terminal device; a second acquiring step (Step S803) of acquiring a second identifier at a second time point later than the first time point, the second identifier being unique to a portable medium located close to the operation terminal device serving as the remote controller for the appliance; a determining step (Step S804) of determining whether the first identifier embedded in the control program matches the second identifier acquired in the second acquiring step; and a prohibiting step (Step S805) of prohibiting remote control of the appliance when the first identifier does not match the second identifier.

(2) The operation terminal device may remotely control the appliance via a server device. The server device stores the control program in which the first identifier has not been embedded.

The determining step may include: a first step, performed by the operation terminal device, of generating a first operation value by applying a one-way operation to the control program stored in the operation terminal device in which the first identifier has been embedded, and generating a second operation value by applying an operation to the first operation value and the second identifier; a second step, performed by the server device, of embedding the first identifier into the control program stored in the server device, generating a third operation value by applying a same one-way operation as said one-way operation to the control program in which the first identifier has been embedded, and generating a fourth operation value by applying a same operation as said operation to the third operation value and the first identifier; and a third step, performed by the server device, of determining whether the first identifier matches the second identifier by determining whether the second operation value matches the fourth operation value.

(3) In the method, the acquiring of the first identifier, the embedding into the control program, the acquiring of the second identifier, the determining and the prohibiting, respectively performed in the first acquiring step, the embedding step, the second acquiring step, the determining step, the determining step and the prohibiting step, are sequentially repeated. In the embedding step, the first identifier may be embedded into the control program every time the first identifier is acquired in the first acquiring step.

(4) The first time point may be a point when the operation terminal device receives an instruction to remotely control the appliance.

In the first acquiring step, the first identifier is acquired each time the operation terminal device receives the instruction.

(5) In the embedding step, a random number may be generated, a conversion, which is reversible, may be applied to the random number and the first identifier, and a conversion value obtained by the conversion may be embedded into the control program, and in the determining step, a reverse of the conversion may be applied to the random number and the conversion value embedded in the control program, and the first identifier may be thereby restored.

(6) In the method, the acquiring of the first identifier, the embedding into the control program, the acquiring of the second identifier, the determining and the prohibiting, respectively performed in the first acquiring step, the embedding step, the second acquiring step, the determining step, the determining step and the prohibiting step, may be sequentially repeated.

In the embedding step, a different random number may be generated each time the first identifier is acquired in the first acquiring step, the conversion may be applied to the random number and the first identifier, and the conversion value obtained by the conversion may be embedded into the control program.

(7) In the determining step, the control program in which the first identifier has been embedded may be acquired, and the first identifier may be extracted from the control program.

(8) In the embedding step, the first identifier may be divided into a plurality of identifier pieces, and the plurality of identifier pieces may be dispersed over the control program or a portion of the control program.

In the determining step, the plurality of identifier pieces may be extracted from the control program or the portion of the control program, the plurality of identifier pieces may be combined together, and the first identifier may be thereby restored.

(9) The control program may include a command region storing commands and a data region storing data.

In the embedding step, the first identifier may be embedded into the data region in the control program.

(10) The control program may include a command region storing commands and a data region storing data, the commands including a dummy command that is not to be executed. In the embedding step, the first identifier is embedded into the dummy command in the control program.

(11) In the embedding step, an embedding program for controlling the embedding of the first identifier into the control program may be acquired, and the first identifier may be embedded into the control program by execution of the embedding program by the operation terminal device.

(12) The embedding program may indicate an embedding position within the control program where the first identifier is to be embedded, and in the embedding step, the first identifier may be embedded into the embedding position within the control program.

(13) The first time point may be a point when the control program is installed onto the operation terminal device, a point when the control program in the operation terminal device is initially started up, or any point when the control program in the operation terminal device is started up.

The second time point is a point when the operation terminal device receives the instruction to remotely control the appliance.

(14) The first time point may be a point when the operation terminal device receives a first remote control instruction to remotely control the appliance.

The second time point is a point when the operation terminal device receives a second remote control instruction to remotely control the appliance.

(15) The operation terminal device may remotely control the appliance via a server device.

The method may further comprise: a displaying step, performed by the operation terminal device, of displaying one or more instructions selectable by a user, from among a plurality of instructions to remotely control the appliance; a receiving step, performed by the operation terminal device, of receiving a single instruction selected by the user from among the plurality of instructions; and a transmitting step, performed by the operation terminal device, of transmitting the single instruction to the appliance via the server device.

(16) The operation terminal device may remotely control the appliance via a server device.

The method may further comprise: a displaying step, performed by the operation terminal device, of displaying a first condition and a second condition in association with information on an operation of remotely controlling the appliance, the first condition being a condition for accepting the operation, and the second condition being a candidate for replacing the first condition; a receiving step, performed by the operation terminal device, of receiving an instruction to select the second condition from a user; a transmitting step of transmitting the second condition from the operation terminal device to the server device; and a storing step, performed by the server device, of storing the second condition instead of the first condition in association with the information on the operation of remotely controlling the appliance.

2. Embodiment 2

The following describes a remote control system 10 as Embodiment 2 pertaining to the present invention.

2.1 Remote Control System 10

As shown in FIG. 1, the remote control system 10 includes a distribution server device 100, a verification server device 200, a terminal device 300, a memory card 400, and appliances 500a, 500b, 500c, 500d and 500e.

The distribution server device 100, the verification server device 200 and the terminal device 300 are connected via a network 20. The appliances 500a, 500b, 500c, 500d and 500e are provided within a user's house 40. The appliances 500a, 500b, 500c, 500d and 500e are connected to the network 20 via a router 30.

The appliances 500a, 500b, 500c, 500d and 500e are, for example, a TV receiver, an air conditioner, a lighting device, a door lock system, and a security camera, respectively.

The memory card 400, which is portable, is attached to the terminal device 300.

In the following, the appliances 500a, 500b, 500c, 500d and 500e may be referred to collectively as "the appliances 500".

The terminal device 300 transmits, for example, the following remote control instructions to the appliances 500 via the verification server device 200.

Instructions to be transmitted to the appliance 500a as a TV receiver include an instruction to power on or off, an instruction to select a channel, an instruction to set timer recording, an instruction to cancel timer recording, an instruction to acquire information of the channel that is being tuned to, and an instruction to acquire information of the program that is being received. Instructions to be transmitted to the appliance 500b as an air conditioner include: an instruction to power on or off; an instruction to change the temperature setting; an instruction to acquire the current temperature; an instruction to acquire the current humidity; and an instruction to switch between a cooling mode, a heating mode, and a fan mode. Instructions to be transmitted to the appliance 500c as a lighting device include: an instruction to power on or off; and an instruction to change the brightness. Instructions to be transmitted to the appliance 500d as a door lock system include: an instruction to lock; an instruction to unlock; and an instruction to acquire state information showing whether the door is locked or unlocked. Instructions to be transmitted to the appliance 500e as a security camera include: an instruction to start recording; an instruction to stop recording; an instruction to transfer a recorded video to a TV receiver; and an instruction to delete a recorded video.

The verification server device 200 transmits a control program for remote control of an appliance to the distribution server device 100. The terminal device 300 receives the control program from the distribution server device 100, and installs the control program thus received.

The terminal device 300 starts up the control program according to the user's instruction. Subsequently, the terminal device 300 acquires a unique identifier from the memory card 400 attached to the terminal device 300, and transmits the unique identifier thus acquired to the verification server device 200. If the terminal device 300 stores therein associated data, the terminal device 300 embeds the associated data into the control program.

The verification server device 200 receives the unique identifier from the terminal device 300. When the user of the terminal device 300 successfully logs in, the verification server device 200 generates the associated data containing the acquired unique identifier, and transmits the associated data thus generated to the terminal device 300. The terminal device 300 receives the associated data, and stores therein the associated data thus received.

The verification server device 200 embeds the associated data into the control program, calculates a hash value from the control program, and calculates an evaluation value S by using a random number, the hash value, and the unique identifier.

The terminal device 300 acquires the unique identifier from the memory card 400, calculates the hash value from the control program, and calculates an evaluation value S' by using a random number, the hash value and the unique identifier.

The verification server device 200 receives the evaluation value S' from the terminal device 300, and compares the evaluation value S' with the evaluation value S. When the evaluation value S' matches the evaluation value S, the verification server device 200 permits the remote control of the appliance. When the evaluation value S' does not match the evaluation value S, the verification server device 200 prohibits the remote control of the appliance.

2.2 Distribution Server Device 100

Figure 2:
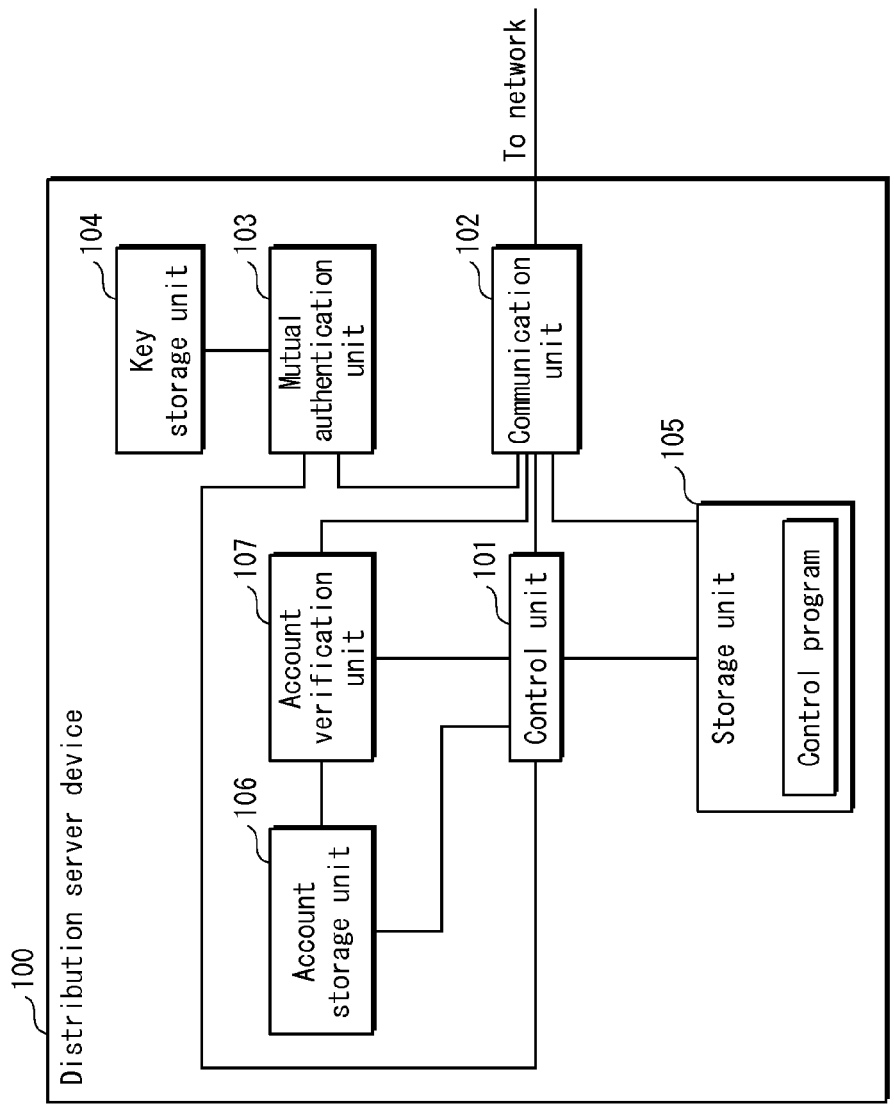
FIG. 2 is a block diagram showing the structure of a distribution server device 100.

As shown in FIG. 2, the distribution server device 100 includes a control unit 101, a communication unit 102, a mutual authentication unit 103, a key storage unit 104, a storage unit 105, an account storage unit 106, and an account verification unit 107.

The distribution server device 100 is specifically realized as a computer system including a microprocessor, ROM, RAM, a hard disk device, and so on. The RAM or the hard disk device stores a computer program. The microprocessor operates according to the computer program and thereby realizes the functions of the distribution server device 100.

(1) Key Storage Unit 104 and Storage Unit 105

The key storage unit 104 is specifically realized as a hard disk device, for example. The key storage unit 104 stores therein a private key assigned to the distribution server device 100. The key storage unit 204 also stores the system key Ksc in advance. The system key Ksc is a common key used within the remote control system. Note that the key storage unit of each of the verification server device 200, the terminal device 300 and the memory card 400 stores the same system key Ksc as the key storage unit 104. These system keys have been written in advance.

The storage unit 105 is realized as a hard disk device, for example. The storage unit 105 has a region for storing a control program.

(2) Communication Unit 102

The communication unit 102 exchanges information with the verification server device 200 and with the terminal device 300 via the network 20.

Specifically, the communication unit 102 receives a control program from the verification server device 200 via a network 20 by using a secure means. Upon receiving the control program, the communication unit 102 writes the control program thus received into the storage unit 105. The communication unit 102 also receives a request for a control program from the terminal device 300 via the network 20. Upon receiving the request of a control program, the communication unit 102 outputs the request thus received to the control unit 101. The communication unit 102 also receives a user identifier and a password from the terminal device 300 via the network 20 by using a secure means. Upon receiving the user identifier and the password, the communication unit 102 outputs the user identifier and the password thus received to the account verification unit 107.

Also, under the control of the control unit 101, the communication unit 102 transmits a request for the user identifier and the password to the terminal device 300. Also, under the control of the control unit 101, the communication unit 102 reads the control program stored in the storage unit 105. Subsequently, the communication unit 102 transmits the control program thus read to the terminal device 300 by using a secure means. Also, under the control of the control unit 101, the communication unit 102 transmits a message to the terminal device 300. The secure means will be described later.

(3) Account Storage Unit 106 and Account Verification Unit 107

The account storage unit 106 stores therein a user identifier assigned to a user, and a password of the user, in association with each other. The user identifier and the password are input by an operator of the distribution server device 100.

The account verification unit 107 receives the user identifier and the password of the user of the terminal device 300 from the terminal device 300 via the network 20 and the communication unit 102 by using a secure means. Upon receiving the user identifier and the password, the account verification unit 107 subsequently determines whether the user identifier and the password thus received are stored in the account storage unit 106.

If the user identifier and the password thus received are not stored in the account storage unit 106, the account verification unit 107 determines that the login has failed (i.e. unsuccessful login). If the user identifier and the password thus received are stored in the account storage unit 106, the account verification unit 107 determines that the login has been successful (i.e. successful login).

When the user identifier and the password thus received are not stored in the account storage unit 106, that is, in the case of the unsuccessful login, the account verification unit 107 generates a message indicating the unsuccessful login. Subsequently, the account verification unit 107 transmits the message thus generated to the terminal device 300 via the communication unit 102 and the network 20. Subsequently, the account verification unit 107 prohibits the user using the user identifier and the password from logging in.

When the user identifier and the password thus received are stored in the account storage unit 106, the account verification unit 107 permits the user using the user identifier and the password to log in.

The account verification unit 107 outputs permission/prohibition information, which indicates either permission or prohibition of logging in, to the control unit 101.

(4) Control Unit 101

The control unit 101 controls the communication unit 102, the mutual authentication unit 103, the key storage unit 104, the storage unit 105, the account storage unit 106, and the account verification unit 107.

The control unit 101 receives a request for a control program from the terminal device 300 via the network 20 and the communication unit 102. Upon receiving the request for the control program, the control unit 101 transmits a request for the user identifier and the password to the terminal device 300 via the communication unit 102 and the network 20.

The control unit 101 receives the permission/prohibition information, which indicates either permission or prohibition of logging in, from the account verification unit 107.

When receiving the request for the control program and the permission/prohibition information indicates permission of logging in, the control unit 101 controls the communication unit 102 to read the control program from the storage unit 105. Subsequently, the control unit 101 controls the communication unit 102 to transmit the control program thus read to the terminal device 300 via the communication unit 102 and the network 20 by using a secure means.

(5) Mutual Authentication Unit 103

The mutual authentication unit 103 has the same structure as the mutual authentication unit 203 of the verification server device 200.

When receiving the control program, the mutual authentication unit 103 performs mutual authentication and key sharing with the mutual authentication unit 203 of the verification server device 200. When transmitting the control program, the mutual authentication unit 103 performs mutual authentication and key sharing with the mutual authentication unit 303 of the terminal device 300. The mutual authentication and the key sharing will be described later.

Also, the mutual authentication unit 103 supports the communications using the secure means performed with the verification server device 200 and with the terminal device 300. The communications using the secure means will be described later.

2.3 Verification Server Device 200

Figure 3:
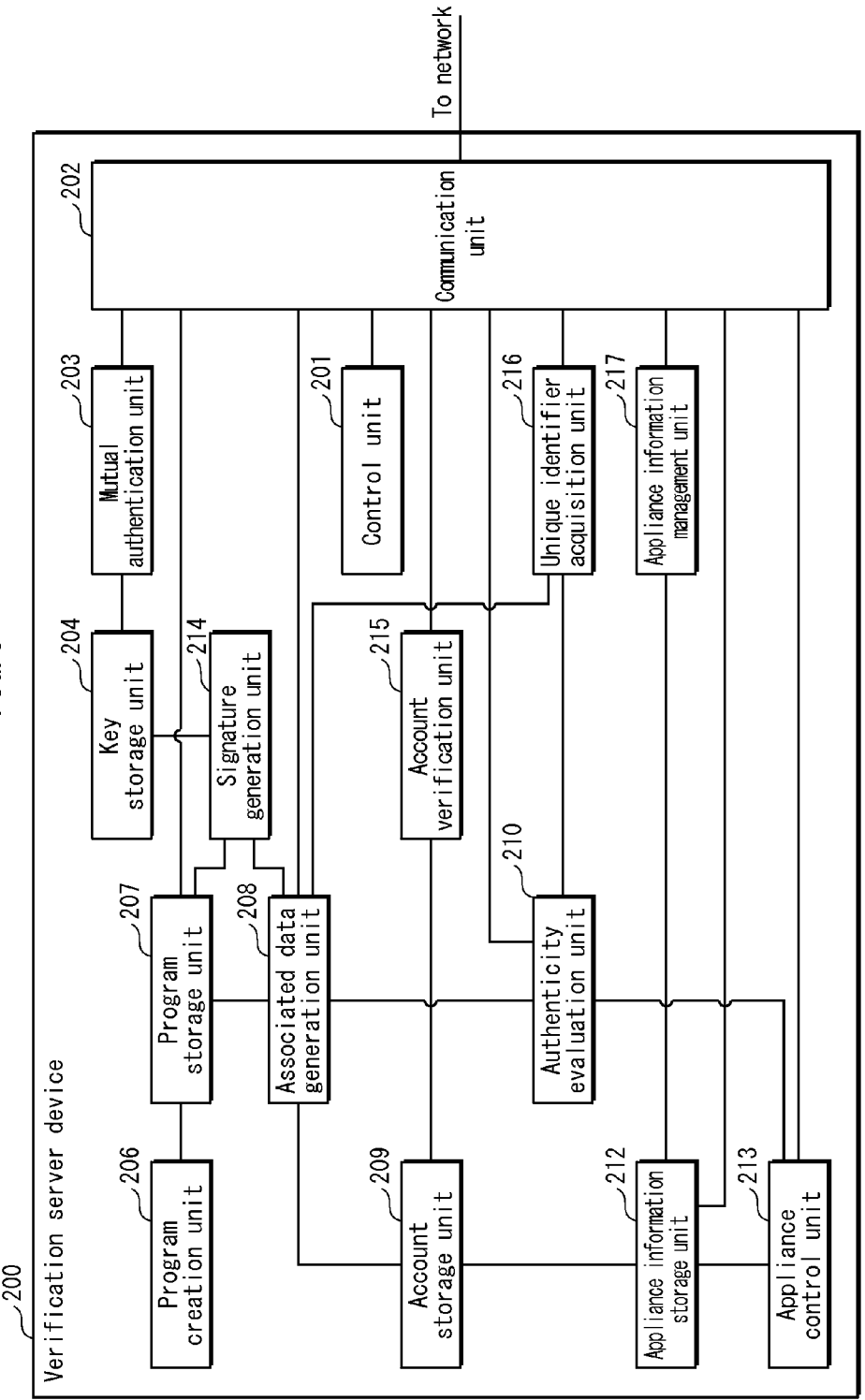
FIG. 3 is a block diagram showing the structure of a verification server device 200.

As shown in FIG. 3, the verification server device 200 includes a control unit 201, a communication unit 202, a mutual authentication unit 203, a key storage unit 204, a program creation unit 206, a program storage unit 207, an associated data generation unit 208, an account storage unit 209, an authenticity evaluation unit 210, an appliance information storage unit 212, an appliance control unit 213, a signature generation unit 214, an account verification unit 215, and a unique identifier acquisition unit 216.

The verification server device 200 is specifically realized as a computer system including a microprocessor, ROM, RAM, a hard disk device, a display device, a keyboard, and so on. The RAM or the hard disk device stores a computer program. The microprocessor operates according to the computer program and thereby realizes the functions of the verification server device 200.

(1) Program Storage Unit 207, Key Storage Unit 204 and Appliance Information Storage Unit 212

(Program Storage Unit 207)

The program storage unit 207 is specifically realized as a hard disk device, for example. The program storage unit 207 has regions for storing the control program 231 and the control program 331.

The control program 231 is a computer program to be distributed to the terminal device 300 via the distribution server device 100. The control program 331 is a computer program that is the same as the computer program installed in the terminal device 300. To enable the verification server device 200 to duplicate the state of the control program installed in the terminal device 300, the program storage unit 207 has a region for storing the control program 331.

Figure 4:
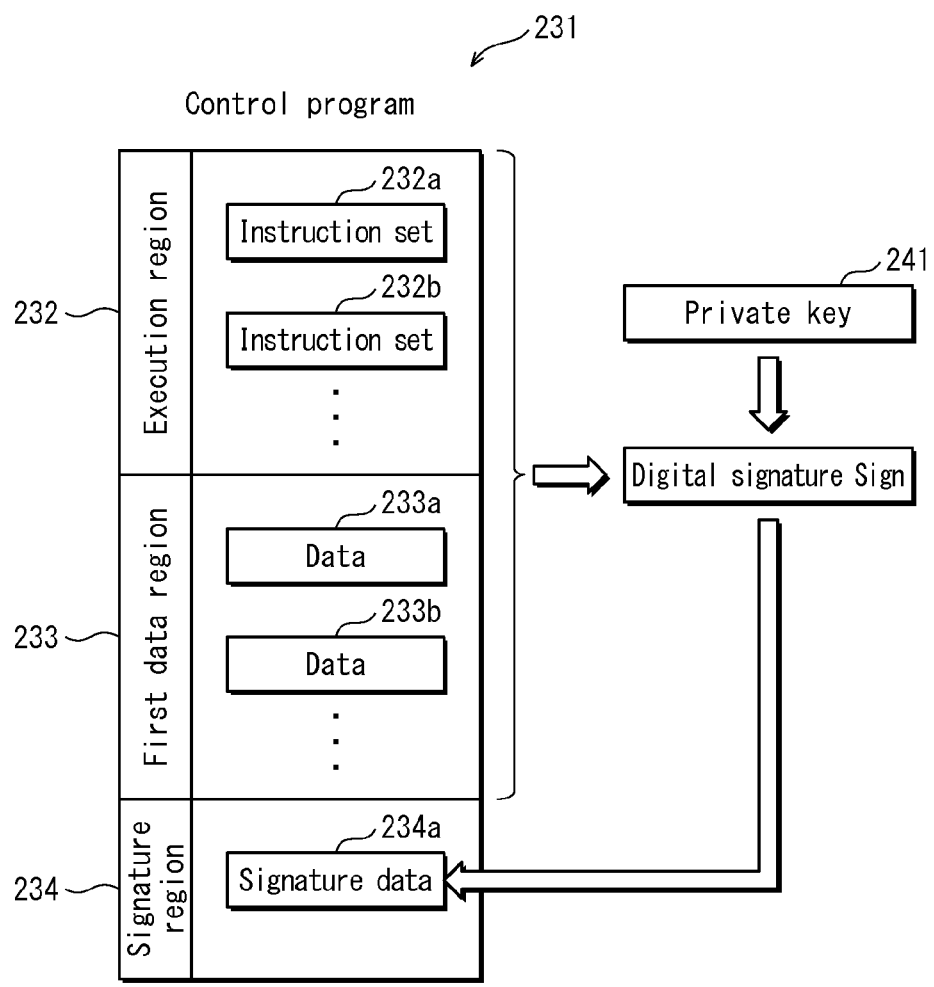
FIG. 4 shows an example data structure of a control program 231.

(a) FIG. 4 shows the data structure of the control program 231. As shown in this drawing, the control program 231 is composed of an execution region 232, a first data region 233, and a signature region 234.

The execution region 232 stores therein a plurality of instruction sets 232a, 232b, and so on. Each instruction set includes operation commands to be executed by the terminal device 300. The first data region 233 stores data 233a, 233b, and so on which are read-only and referred to when the plurality of instruction sets 232a, 232b, and so on are executed. The signature region 234 stores signature data 234a.

The signature data 234a is generated by the signature generation unit 214. The signature data 234a is generated by applying a digital signature Sign to the execution region 232 and the first data region 233 of the control program 231 by using a private key 241 assigned to the verification server device 200.

Signature Data 234a=Sign(Private Key 241, (Execution Region 232 and First Data Region 233))

In the above, Sign(A, B) denotes the signature data generated by applying the digital signature Sign to the data B by using the private key A. Here, the digital signature Sign is, for example, a digital signature algorithm based on Elliptic Curve Digital Signature standard (ECDSA).

By performing digital signature verification Vrfy corresponding to the digital signature Sign by using the signature data 234a, it is possible to determine whether the execution region 232 and the first data region 233 have been tampered with. Here, the digital signature verification Vrfy is, for example, a digital signature verification algorithm based on Elliptic Curve Digital Signature standard (ECDSA).

Figure 10:
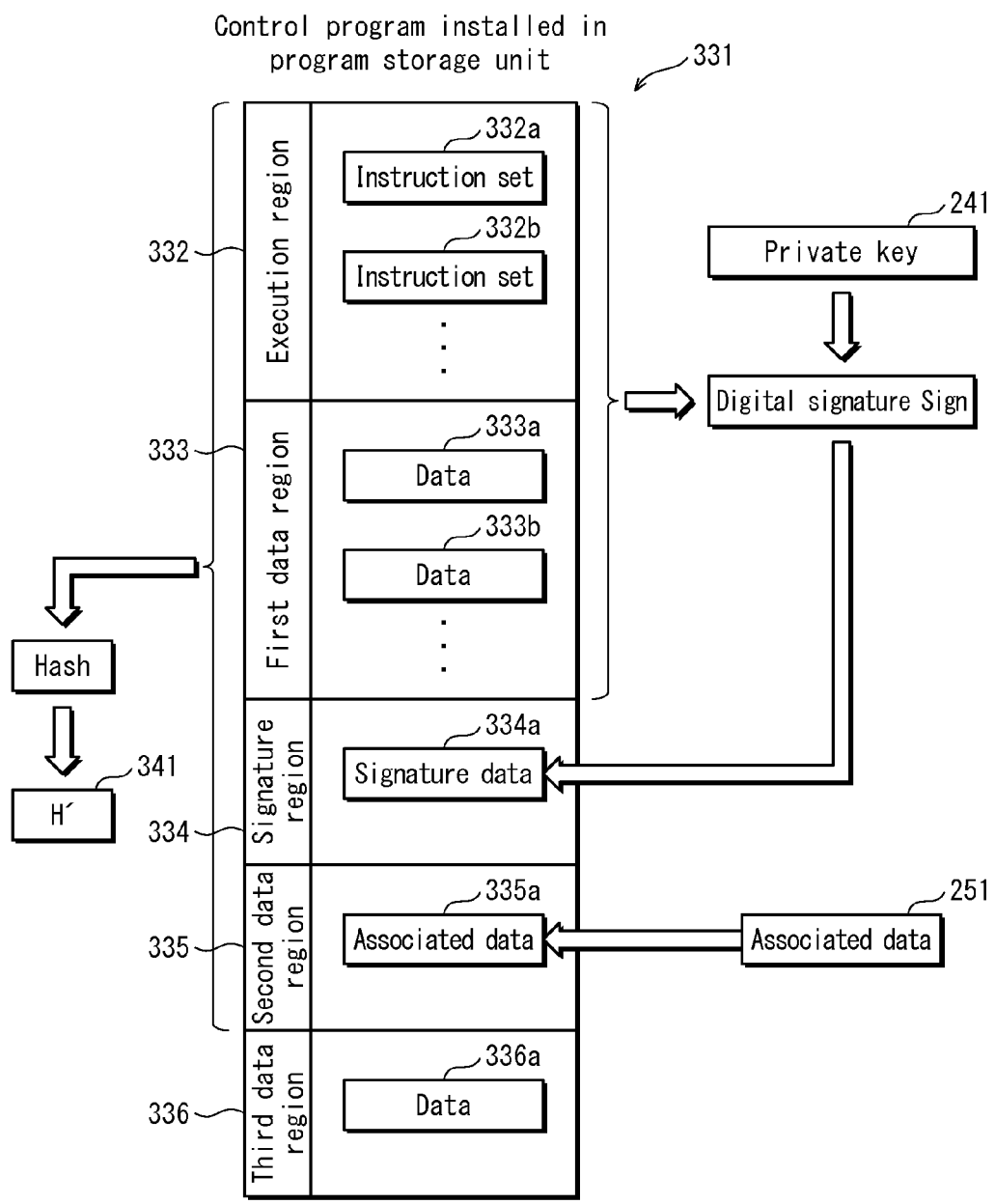
FIG. 10 shows an example data structure of a control program 331 which has been installed.

(b) FIG. 10 shows the data structure of the control program 331. As shown in this drawing, the control program 331 is composed of an execution region 332, a first data region 333, a signature region 334, a second data region 335, and a third data region 336.

The execution region 332 stores therein a plurality of instruction sets 332a, 332b, and so on. Each instruction set includes operation commands to be executed by the terminal device 300. The first data region 333 stores data 333a, 333b, and so on which are read-only and referred to when the plurality of instruction sets 332a, 332b, and so on are executed. The signature region 334 stores signature data 334a.

The execution region 332, the first data region 333 and the signature region 334 are the same as the execution region 232, the first data region 233 and the signature region 234 shown in FIG. 4, respectively. The plurality of instruction sets 332a, 332b and so on stored in the execution region 332 are the same as the plurality of instruction sets 232a, 232b, and so on shown in FIG. 4, respectively. The data 333a, 333b and so on stored in the first data region 333 are the same as the data 233a, 233b and so on shown in FIG. 4, respectively. The signature data 334a stored in the signature region 334 is the same as the signature data 234a shown in FIG. 4.

The second data region 335 stores associated data 335a. The associated data 335a will be described later.

The third data region 336 stores data 336a. The data 336a is added, updated, overwritten or referred to according to the instruction sets 332a, 332b and so on.

(Key Storage Unit 204)

The key storage unit 204 is specifically realized as a hard disk device, for example. The key storage unit 204 stores therein a private key 241 assigned to the verification server device 200. The key storage unit 204 also stores the system key Ksc in advance.

(Appliance Information Storage Unit 212)

The appliance information storage unit 212 stores a condition table 271 and a control rule management table 281 written in advance.

The condition table 271 has, as shown in FIG. 7 for example, a region for storing a plurality of condition information sets.

Each condition information set includes appliance information and a condition associated with each other. The appliance information shows the type of information of the appliance. The condition shows a condition for acquisition applied to the appliance state information corresponding to the type indicated by the appliance information. The appliance state information, corresponding to the type indicated by the appliance information, shows the actual state of the appliance.

When the appliance is an air conditioner, the appliance information indicates "Inside temperature, humidity measured by air conditioner", for example. The appliance state information corresponding to the appliance information is, for example, temperature "25 degrees" and humidity "50%" actually measured by the air conditioner.

When the appliance is a TV receiver, the appliance information indicates "Channel that is being tuned to", for example. The appliance state information corresponding to the appliance information is, for example, "16" which is the number of the channel that is currently tuned to.

When the appliance is a DVD playback device, the appliance information is "Title of the DVD that is being played back", for example. The appliance state information corresponding to the appliance information is, for example, the actual title "Galaxy Wars" of the DVD currently being played back by the DVD playback device.

The specific examples of the condition include, whether it is necessary to log into the verification server device 200 from the terminal device 300, and whether the unique identifier of the memory card 400 attached to the terminal device 300 is necessary.

The condition table 271 contains, for example, a condition information set 272. The condition information set 272 contains the appliance information 273 "Inside temperature and humidity measured by air conditioner" and the condition "Login is unnecessary, Unique identifier is necessary" in association with each other. The condition information set 272 indicates that it is unnecessary to log into the verification server device 200 from the terminal device 300 to acquire the inside temperature and humidity measured by the air conditioner as the appliance via the network 20, but the unique identifier is required.

The control rule management table 281 has, as shown in FIG. 8, a region for storing a user identifier and a plurality of control rule information sets, in association with each other.

The user identifier identifies the user of the remote control system 10. Each control rule information set contains operation information, a condition, and an item. The operation information shows the information of the operation that the user can be permitted to perform. The condition indicates the condition for permitting the user to perform the operation. The item shows a target operation related to the operation information.

The control rule management table 281 contains, as shown in FIG. 8, a control rule information set 283 for example. The control rule information set 283 contains operation information 284 "Opening/closing of door", a condition 285 "Unique identifier is necessary", and an item "Locking".

In this way, the control rule information set 283 indicates that the operation of opening or closing the door requires the unique identifier, and that the target operation related to the operation information is locking.

(2) Program Creation Unit 206

The program creation unit 206 creates a control program according to operations by the user of the verification server device 200. The program creation unit 206 writes the control program thus created into the program storage unit 207.

Examples of the control program include a computer program for acquiring information of the appliance 500 to be subject to the remote control, a computer program for operating the appliance 500 under the remote control, a computer program for changing the appliance control rule, and so on.

The control program to be created is composed of the execution region 232 and the first data region 233 from among the regions of the control program 231 shown in FIG. 4, for example.

The program creation unit 206 reads the control program 231 shown in FIG. 4 from the program storage unit 207 according to operations by the user of the verification server device 200. Subsequently, the program creation unit 206 installs the control program 231 thus read into the program storage unit 207. Consequently, the control program 331 shown in FIG. 10 is stored into the program storage unit 207. As described above, when compared with the control program 231, the control program 331 additionally has the second data region 335 and the third data region 336. At this stage, the second data region 335 and the third data region 336 are in their initial states. That is, no data is stored in these regions.

(3) Account Storage Unit 209 and Account Verification Unit 215

(Account Storage Unit 209)

The account storage unit 209 stores an account management table 261.

Figures 5, 6:
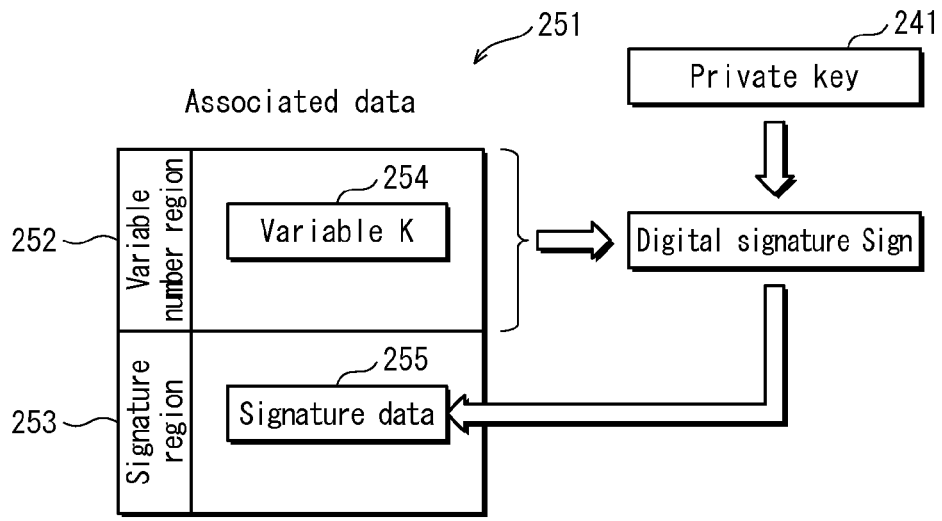
FIG. 5 shows an example data structure of associated data 251.
FIG. 6 shows an example data structure of an account management table 261.

The account management table 261 is, as shown in FIG. 6 for example, a region for storing a plurality of account information sets. Each account information set corresponds to a user. Each account information set contains a user identifier, a password, a time-varying parameter and a unique identifier. The user identifier uniquely identifies the user. The password is used for authenticating the user. The time-varying parameter is a random number generated at each time. The unique identifier is an identifier that is unique to the memory card owned by the user.

The account management table 261 contains, as shown in FIG. 6 for example, an account information set 262. The account information set 262 contains a user identifier 263 "SATO", a password 264 "1234", a time-varying parameter 265 "AD7C" and a unique identifier 266 "8DA4".

(Account Verification Unit 215)

The account verification unit 215 receives login necessity information showing whether login is necessary or not from the terminal device 300 via the network 20 and the communication unit 202. Subsequently, the account verification unit 215 determines whether the login necessity information thus received shows that login is necessary or not.

When the login necessity information shows that login is not necessary, the account verification unit 215 does not perform login processing.

When the login necessity information thus received indicates that login is necessary, the account verification unit 215 receives the user identifier and the password of the user from the terminal device 300 via the network 20 and the communication unit 202 by using a secure means. The secure means will be described later. Subsequently, the account verification unit 215 determines whether the pair of the user identifier and the password is contained in the account management table 261 in the account storage unit 209.

The account verification unit 215 determines that the login has failed (i.e. unsuccessful login) if the account verification unit 215 does not receive the user identifier and the password from the terminal device 300 even after five minutes, for example, have elapsed since receiving the login necessity information from the terminal device 300. If the user identifier and the password thus received are not stored in the account management table 261, the account verification unit 215 determines that the login has failed (i.e. unsuccessful login).

If the user identifier and the password thus received are stored in the account management table 261, the account verification unit 215 determines that the login has been successful (i.e. successful login).

The account verification unit 215 sends the login results, showing either successful login or unsuccessful login, to the control unit 201.

In the case of the unsuccessful login, the account verification unit 215 generates a message showing the unsuccessful login. Subsequently, the account verification unit 215 transmits the message to the terminal device 300 via the communication unit 202 and the network 20.

(4) Unique Identifier Acquisition Unit 216

The unique identifier acquisition unit 216 receives a connection request from the control unit 201. Upon receiving the connection request, after the mutual authentication and the key sharing, the unique identifier acquisition unit 216 transmits a request for the unique identifier to the memory card 400 via the communication unit 202, the network 20 and the terminal device 300.

Subsequently, the unique identifier acquisition unit 216 receives a unique identifier Y or a message "no unique identifier", which indicates that no unique identifier is stored in the memory card 400, from the memory card 400 via the terminal device 300, the network 20 and the communication unit 202 by using a secure means. The secure means will be described later. If the unique identifier acquisition unit 216 does not receive the unique identifier Y or the message indicating that no unique identifier is stored in the memory card 400 even after a predetermined period has elapsed since transmitting the request for the unique identifier to the memory card 400, the unique identifier acquisition unit 216 generates a message indicating "no unique identifier". The predetermined period is 200 ms, for example.

Subsequently, the unique identifier acquisition unit 216 outputs the unique identifier Y thus acquired or the message indicating "no unique identifier" to the associated data generation unit 208 and the authenticity evaluation unit 210.

(5) Control Unit 201

The control unit 201 controls the communication unit 202, the mutual authentication unit 203, the key storage unit 204, the program creation unit 206, the program storage unit 207, the associated data generation unit 208, the account storage unit 209, the authenticity evaluation unit 210, the appliance information storage unit 212, the appliance control unit 213, the signature generation unit 214, the account verification unit 215 and the unique identifier acquisition unit 216.

The control unit 201 also receives a connection request for operating the appliance from the terminal device 300, via the network 20 and the communication unit 202. Upon receiving the connection request, the control unit 201 outputs the connection request for operating the appliance to the mutual authentication unit 203 and the unique identifier acquisition unit 216.

The control unit 201 receives the login results, which indicate either the successful login or the unsuccessful login, from the account verification unit 215. When receiving the login results indicating successful login, the control unit 101 stores the received user identifier and password.

(6) Communication Unit 202

Under the control of the control unit 201, the communication unit 202 exchanges information with the distribution server device 100, the terminal device 300, the memory card 400, and the appliances 500a, 500b, 500c, 500d and 500e via the network 20.

Specifically, under the control of the control unit 201, the communication unit 202 transmits the control program to the distribution server device 100 via the network 20.

Under the control of the control unit 201, the communication unit 202 also transmits the request for the unique identifier to the memory card 400 via the network 20 and the terminal device 300. The communication unit 202 also transmits the message, the associated data and the random number R to the terminal device 300 via the network 20.

The communication unit 202 also receives the connection request for operating the appliance, the login necessity information, the user identifier, the password, the operation instruction for the appliance, and the evaluation value S' from the terminal device 300 via the network 20. The communication unit 202 receives the unique identifier Y or the message indicating "no unique identifier" from the memory card 400 via the terminal device 300 and the network 20.

(7) Mutual Authentication Unit 203

The mutual authentication unit 203 receives the connection request for transmitting the control program and the connection request for operating the appliance from the control unit 201.

When receiving the connection request for transmitting the control program, the mutual authentication unit 203 performs the mutual authentication with the mutual authentication unit 103 of the distribution server device 100, and shares the same shared key with the distribution server device 100.

When receiving the connection request for operating the appliance, the mutual authentication unit 203 performs the mutual authentication with the mutual authentication unit 303 of the terminal device 300, and shares the same shared key with the terminal device 300. The mutual authentication unit 203 also performs the mutual authentication with the mutual authentication unit 403 of the memory card 400 and shares the same shared key with the memory card 400.

Figure 15:
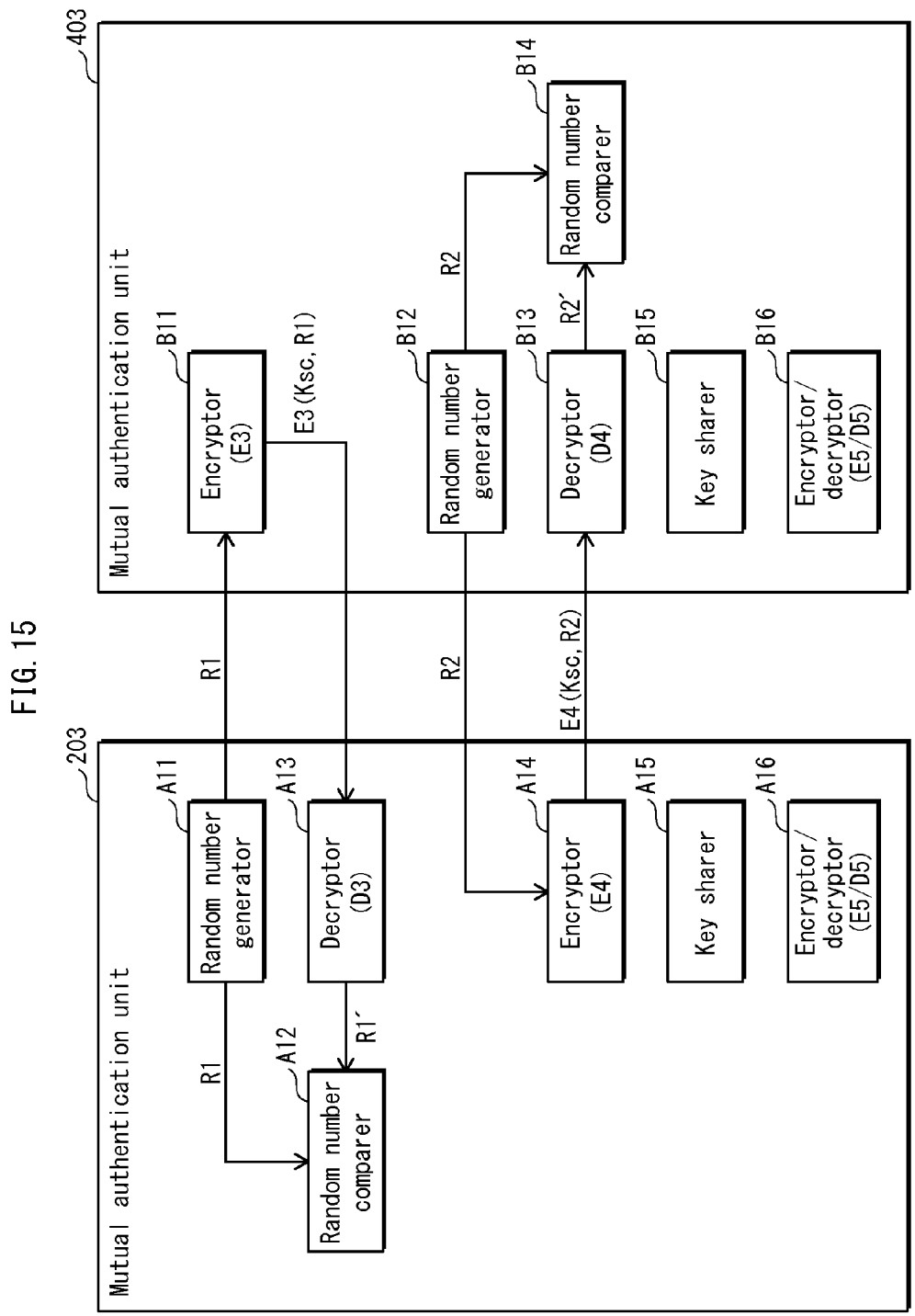
FIG. 15 is a block diagram showing the structure of a mutual authentication unit 203 of the verification server device 200 and the structure of a mutual authentication unit 403 of the memory card 400.

As shown in FIG. 15, the mutual authentication unit 203 includes a random number generator A11, a random number comparer A12, a decryptor A13, an encryptor A14, a key sharer A15 and an encryptor/decryptor A16.

The random number generator A10 generates a random number R1. The random number generator A10 subsequently outputs the random number R1 thus generated to the random number comparer A12. The random number generator A11 also transmits the random number R1 thus generated to the mutual authentication unit of the other party in terms of the mutual authentication.

The decryptor A13 receives an encrypted random number E3(Ksc, R1) from the mutual authentication unit of the other party in terms of the mutual authentication. Subsequently, the decryptor A13 decrypts the encrypted random number E3(Ksc, R1) according to a decryption algorithm D3 by using the system key Ksc, and thereby generates a plaintext R1'=D3(Ksc, E3(Ksc, R1)). The decryptor A13 subsequently outputs the plaintext R1' thus generated to the random number comparer A12.

Here, the decryption algorithm D3 is an algorithm according to a secret key cryptosystem. The decryption algorithm D3 is, for example, an algorithm conforming to the Advanced Encryption Standard (AES). E3(K, A) denotes a ciphertext generated by applying the encryption algorithm E3 to a plaintext A by using a key K. D3(K, B) denotes a plaintext generated by applying a decryption algorithm D3 to a ciphertext B by using a key K.

The random number comparer A12 receives the random number R1 from the random number generator A11, and the plaintext R1' from the decryptor A13. The random number comparer A12 compares the random number R1 with the plaintext R1'. When the random number R1 matches the plaintext R11, the mutual authentication unit 203 determines that the other party is valid. When the random number R1 does not match the plaintext R1', the mutual authentication unit 203 determines that the other party is invalid.

The encryptor A14 receives the random number R2 from the mutual authentication unit of the other party. Upon receiving the random number R2, the encryptor A14 encrypts the random number R2 according to an encryption algorithm E4 by using the system key Ksc, thereby generating an encrypted random number E4(Ksc, R2), and transmits the generated encrypted random number E4(Ksc, R2) to the other party.

Here, the encryption algorithm E4 is an algorithm according to a secret key cryptosystem. The encryption algorithm E4 is, for example, an algorithm conforming to the AES. E4(K, A) denotes an encrypted text generated by applying the encryption algorithm E4 to a plaintext A by using a key K.

When the mutual authentication is successful, the key sharer A15 performs the key sharing, and calculates the shared key k. When the mutual authentication fails, the key sharer A15 does not calculate the shared key k.

When the mutual authentication is successful, the encryptor/decryptor A16 encrypts data by using the shared key k thus calculated, and thereby generates encrypted data. The encrypted data is transmitted to the other party. The encryptor/decryptor A16 receives encrypted data from the other party. Subsequently, the encryptor/decryptor A16 decrypts the encrypted data by using the shared key k thus calculated, and generates the original data. The above-mentioned secure means is realized by these procedures.

(8) Associated Data Generation Unit 208

The associated data generation unit 208 receives the acquired unique identifier Y or the message indicating "no unique identifier" from the unique identifier acquisition unit 216.

Subsequently, the associated data generation unit 208 determines whether the unique identifier Y has been received. When the unique identifier Y has been received, the associated data generation unit 208 generates a random number R. The associated data generation unit 208 writes the generated random number R and the received unique identifier Y, which serve as the time-varying parameter and the unique identifier, into the account management table 261 in association with the received user identifier and password.

Subsequently, the associated data generation unit 208 calculates a variable K according to the following formula by using the unique identifier Y and the random number R.

Variable K=Unique Identifier Y XOR Random Number R

Here, XOR is an operator denoting exclusive OR.

Subsequently, as shown in FIG. 5, the associated data generation unit 208 generates associated data 251 composed of a variable number region 252 and a signature region 253. At this stage, the variable number region 252 and the signature region 253 are in their initial states. That is, no data is stored in these regions.

Subsequently, the associated data generation unit 208 calculates a variable K(254) and writes the variable K(254) into the variable number region 252.

Subsequently, the associated data generation unit 208 outputs the variable K(254) to the signature generation unit 214, and instructs the signature generation unit 214 to generate signature data corresponding to the variable K(254). Subsequently, the associated data generation unit 208 receives signature data 255 corresponding to the variable K(254) from the signature generation unit 214. The signature data 255 is obtained by applying the digital signature Sign to the variable K(254) by using the private key 241 assigned to the verification server device 200. Upon receiving the signature data 255 from the signature generation unit 214, the associated data generation unit 208 writes the signature data 255 into the signature region 253 of the associated data 251.

As shown in FIG. 5, the associated data 251 is composed of the variable number region 252 and the signature region 253. The variable number region 252 stores the variable K(254), and the signature region 253 stores the signature data 255.

Subsequently, the associated data generation unit 208 transmits the associated data 251 and the random number R to the terminal device 300 via the communication unit 202 and the network 20 by using a secure means.

When the unique identifier Y has not been received, the associated data generation unit 208 does not perform the generation of the random number R, the calculation of the variable K, the generation of the associated data, the provision of the instruction to generate the signature data, or the transmission of the associated data and the random number R.

When the unique identifier Y and the instruction to operate the appliance have been received, the associated data generation unit 208 overwrites the second data region 335 of the control program 331 stored and installed in the program storage unit 207, with the associated data 251 containing the variable K(254) and the signature data 255.

Upon completing the overwriting with the associated data 251, the associated data generation unit 208 outputs a completion notification to the authenticity evaluation unit 210. The completion notification indicating that the overwriting with the associated data 251 has been completed.

When the unique identifier has not been received, the associated data generation unit 208 does not overwrite the second data region 335 of the control program 331 with the associated data.

(9) Signature Generation Unit 214

The signature generation unit 214 receives an instruction to generate signature data from the program creation unit 206 and the associated data generation unit 208.

When receiving the instruction to generate signature data from the program creation unit 206, the signature generation unit 214 reads the private key 241 assigned to the verification server device 200 from the key storage unit 204. Subsequently, the signature generation unit 214 reads the control program from the program storage unit 207. As shown in FIG. 4, the control program thus read includes the execution region 232 and the first data region 233. At this stage, however, the control program thus read does not include the signature region 234 shown in FIG. 4.

Subsequently, the signature generation unit 214 generates the signature data 234a by applying the digital signature Sign to the read control program, by using the read private key 241.

Signature Data 234a=Sign(Private Key 241, Control Program)

Subsequently, the signature generation unit 214 adds the signature data 234a thus generated to the control program, and overwrites the control program stored in the program storage unit 207 with the control program 231 to which the signature data has been added.

When receiving the instruction to generate signature data from the associated data generation unit 208, the signature generation unit 214 furthermore receives the variable K(254) from the associated data generation unit 208. Subsequently, the signature generation unit 214 reads the private key 241 assigned to the verification server device 200 from the key storage unit 204. Subsequently, the signature generation unit 214 generates the signature data 255 by applying the digital signature Sign to the variable K(254) by using the private key 241.

Signature Data 255=Sign(Private Key 241, Variable K(254))

Subsequently, the signature generation unit 214 outputs the signature data 255 to the associated data generation unit 208.

(10) Authenticity Evaluation Unit 210

The authenticity evaluation unit 210 receives the acquired unique identifier Y or the message indicating "no unique identifier" from the unique identifier acquisition unit 216. The authenticity evaluation unit 210 also receives the random number R from the associated data generation unit 208. The authenticity evaluation unit 210 also receives the completion notification, which indicates that the overwriting of the control program with the associated data 251 has been completed, from the associated data generation unit 208.

Upon receiving the completion notification and the unique identifier Y, the authenticity evaluation unit 210 reads the control program 331 after the overwriting with the associated data, from the program storage unit 207. Subsequently, the authenticity evaluation unit 210 calculates a hash value H by applying a hash operation Hash to the instruction and data stored in the execution region 332, the first data region 333, the signature region 334 and the second data region 335 included in the read control program 331.

Hash Value H=Hash(Instruction and Data stored in Execution Region 332, First Data Region 333, Signature Region 334 and Second Data Region 335 included in Control Program 331)

The third data region 336 is excluded from the hash operation Hash because the data stored in the third data region 336 varies depending on the execution status of the control program 331.

The hash operation Hash is performed according to, for example, Secure Hash Algorithm 1 (SHA-1). Alternatively, the hash operation Hash may be performed according to Secure Hash Algorithm 2 (SHA-2), Secure Hash Algorithm 256-bit (SHA-256), or the like.

Note that the hash operation Hash applied here should be the same as the hash operation Hash applied by a unique identifier acquisition processing unit 902.

Subsequently, the authenticity evaluation unit 210 calculates the evaluation value S by using the unique identifier Y, the hash value H and the random number R.

Evaluation Value S=Unique Identifier Y XOR Oneway (Hash Value H, Random Number R)

Here, one-way operation Oneway(A, B) denotes the value obtained by applying a one-way operation to data A and data B. For example, the one-way operation Oneway(A, B) is a hash value obtained by applying a keyed hash operation to the data A, using the data B as the key. The one-way operation Oneway(A, B) may be a hash value obtained by applying a hash operation to the concatenated data obtained by joining the data A and the data B in this order. Alternatively, the one-way operation Oneway(A, B) may be a hash value obtained by generating a ciphertext by using the data B as the key and an encryption algorithm according to the AES as the secret key cryptosystem, and applying the hash operation SHA-1 to the generated ciphertext.

Note that the one-way operation Oneway applied here should be the same as the one-way operation Oneway applied by the unique identifier acquisition processing unit 902.

The authenticity evaluation unit 210 also receives the evaluation value S' from the terminal device 300 via the network 20 and the communication unit 202.

Subsequently, the authenticity evaluation unit 210 determines whether the evaluation value S thus calculated matches the evaluation value S' thus received. When the evaluation value S matches the evaluation value S', remote control of the appliance and its related operations should be permitted. When the evaluation value S does not match the evaluation value S', remote control of the appliance and its related operations should be prohibited.

When the evaluation value S does not match the evaluation value S', the authenticity evaluation unit 210 generates a message indicating that the remote control of the appliance and its related operations should be prohibited. Subsequently, the authenticity evaluation unit 210 transmits the message thus generated to the terminal device 300 via the communication unit 202 and the network 20.

When the evaluation value S matches the evaluation value S', the authenticity evaluation unit 210 outputs permission information to the appliance control unit 213. The permission information indicates that the remote control of the appliance and its related operations should be permitted. Only in this case, the remote control of the appliance and its related operations will be performed. When the evaluation value S does not matches the evaluation value S', the authenticity evaluation unit 210 outputs prohibition information to the appliance control unit 213. The prohibition information indicates that the remote control of the appliance and its related operations should be prohibited. In this case, the remote control of the appliance and its related operations will not be performed.

When the unique identifier Y has not been received, the authenticity evaluation unit 210 does not perform the calculation of the hash value H, the calculation of the evaluation value S, or the comparison between the evaluation value S and the evaluation value S'.

(11) Appliance Information Management Unit 217

The appliance information management unit 217 receives an instruction to change the control rule from the terminal device 300 via the network 20 and the communication unit 202. Subsequently, the appliance information management unit 217 changes the control rule management table 281 stored in the appliance information storage unit 212 according to the received control change instruction.

(12) Appliance Control Unit 213

The appliance control unit 213 receives an operational instruction from the terminal device 300 via the network 20 and the communication unit 202. Examples of the operational instruction include: a request for acquisition of information related to the appliance 500; an instruction related to the remote control of the appliance 500, an instruction to change the appliance control rule; and so on.

The appliance control unit 213 determines whether the received operational instruction is a request for acquisition of information related to the appliance 500, an instruction related to the remote control of the appliance 500, an instruction to change the appliance control rule, or another different instruction.

When the operational instruction is the request for acquisition of information related to the appliance 500, the appliance control unit 213 performs processing for acquiring information related to the appliance 500. When the operational instruction is the instruction related to the remote control of the appliance 500, the appliance control unit 213 performs processing related to the remote control of the appliance 500. When the operational instruction is the instruction to change the appliance control rule, the appliance control unit 213 changes the appliance control rule. When the operational instruction is an instruction different from the instructions mentioned the above, the appliance control unit 213 performs different processing.

(Acquisition of Information Related to Appliance 500)

The appliance control unit 213 extracts appliance information from the request for information related to the appliance 500 received from the terminal device 300. Subsequently, the appliance control unit 213 reads the conditions corresponding to the extracted appliance information from the condition table 271.

Subsequently, the appliance control unit 213 determines whether the current state of the verification server device 200 satisfies the conditions read from the condition table 271.

Here, the current state of the verification server device 200 is specifically represented by whether the user of the terminal device 300 is logging in the verification server device 200, and whether the unique identifier has been acquired from the memory card 400 attached to the terminal device 300.

For example, in the case where the user is not logging in the verification server device 200 and the unique identifier has not been acquired, if the conditions are "login is unnecessary, unique identifier is necessary" or "login is necessary, unique identifier is necessary", the state of the verification server device 200 does not satisfy the conditions.

In the case where the user is logging in the verification server device 200 and the unique identifier has not been acquired, if the conditions are "login is necessary, unique identifier is necessary", the current state of the verification server device 200 does not satisfy the conditions. If the conditions are "logging is necessary, unique identifier is unnecessary", the current state of the verification server device 200 satisfies the conditions.

In the case where the user is logging in the verification server device 200 and the unique identifier has been acquired, if the conditions are "login is unnecessary, unique identifier is necessary" or "login is necessary, unique identifier is necessary", the current state of the verification server device 200 satisfies the conditions.

When the current state of the verification server device 200 does not satisfy the read conditions, the appliance control unit 213 generates a message indicating that appliance control unit 213 has failed to acquire the appliance state information. Subsequently, the appliance control unit 213 transmits the message thus generated to the terminal device 300 via the communication unit 202 and the network 20.

When the current state of the verification server device 200 satisfies the read conditions, the appliance control unit 213 outputs the request for acquisition of the appliance state information to the appliance 500 via the communication unit 202 and the network 20.

The appliance control unit 213 of the verification server device 200 receives the appliance state information from the appliance 500 via the network 20 and the communication unit 202. Subsequently, the appliance control unit 213 generates a message including the appliance state information thus received. Subsequently, the appliance control unit 213 transmits the message thus generated to the terminal device 300 via the communication unit 202 and the network 20.

(Processing Related to Remote Control of Appliance 500)

The appliance control unit 213 repeats the following processing procedures (a) through (d) for all the control rule information sets contained in the control rule management table 281.

(a) The appliance control unit 213 reads one control rule information set from the control rule management table 281.

(b) Subsequently, the appliance control unit 213 determines whether the current state of the verification server device 200 satisfies the conditions contained in the control rule information set thus read.

Here, as stated above in the explanation of the acquisition of the information related to the appliance 500, the state of the verification server device 200 is specifically represented by whether the user of the terminal device 300 is logging in the verification server device 200, and whether the unique identifier has been acquired from the memory card 400 attached to the terminal device 300.

The method for the determination is as described above.

For example, in the case where the user is not logging in the verification server device 200 and the unique identifier has not been acquired, if the conditions are "login is unnecessary, unique identifier is necessary" or "login is necessary, unique identifier is necessary", the state of the verification server device 200 does not satisfy the conditions.

In the case where the user is logging in the verification server device 200 and the unique identifier has been acquired, if the conditions are "login is necessary, unique identifier is necessary", the current state of the verification server device 200 satisfies the conditions.

(c) When the current state of the verification server device 200 does not satisfy the read conditions, the appliance control unit 213 extracts the operation information from the read control rule information set. Subsequently, the appliance control unit 213 generates a message indicating that it is impossible to acquire the extracted operation information. Subsequently, the appliance control unit 213 transmits the message thus generated to the terminal device 300 via the communication unit 202 and the network 20.

(d) When the current state of the verification server device 200 satisfies the read conditions, the appliance control unit 213 extracts the operation information and the item from the read control rule information set. Subsequently, the appliance control unit 213 generates a message indicating the operation information and the item thus extracted. Subsequently, the appliance control unit 213 outputs the message thus generated to the appliance 500 via the communication unit 202 and the network 20.

The appliance control unit 213 transmits the operational instruction received from the terminal device 300 to the appliance 500 via the communication unit 202 and the network 20.

(Processing for Appliance Control Rule Change)

The appliance control unit 213 determines whether the user of the terminal device 300 is successfully logging in. The appliance control unit 213 also determines whether the unique identifier has been acquired.

When the user is not successfully logging in, the appliance control unit 213 generates a message indicating that the user is not successfully logging in. Subsequently, the appliance control unit 213 transmits the message thus generated to the terminal device 300 via the communication unit 202 and the network 20.

When the unique identifier has not been acquired, the appliance control unit 213 generates a message indicating that the unique identifier has not been acquired. Subsequently, the appliance control unit 213 transmits the message thus generated to the terminal device 300 via the communication unit 202 and the network 20.

When the user is successfully logging in and the unique identifier has been acquired, the appliance control unit 213 reads the control rule management table 281 from the appliance information storage unit 212. Subsequently, the appliance control unit 213 transmits the control rule management table 281 thus read to the terminal device 300 via the communication unit 202 and the network 20.

2.4 Terminal Device 300

As shown in FIG. 9, the terminal device 300 includes a control unit 301, a communication unit 302, a mutual authentication unit 303, a key storage unit 304, a program storage unit 305, a program execution unit 306, an associated data storage unit 307, an input/output unit 308, a display unit 309, an input unit 310 and a verification unit 311.

The terminal device 300 is specifically realized as a computer system including a microprocessor, ROM, RAM, a hard disk device, a display device, an input device, and so on. The RAM or the hard disk device stores a computer program. The microprocessor operates according to the computer program and thereby realizes the functions of the terminal device 300.

(1) Key Storage Unit 304, Program Storage Unit 305, and Associated Data Storage Unit 307

(Key Storage Unit 304)

The key storage unit 304 is specifically realized as a hard disk device, for example. The key storage unit 304 stores therein a public key of the verification server device 200 for example. The key storage unit 204 also stores the system key Ksc in advance.

(Program Storage Unit 305)

The program storage unit 305 is specifically realized as a hard disk device, for example. The program storage unit 305 has regions for storing the control program 231 transmitted from the distribution server device 100 and the control program 331 installed in the terminal device 300.

The control program 231 has a data structure shown in FIG. 4. The control program 331 has a data structure shown in FIG. 10.

(Associated Data Storage Unit 307)

The associated data storage unit 307 is specifically realized as a hard disk device, for example. The associated data storage unit 307 has regions for storing the associated data 251 and the random number R shown in FIG. 5.

(2) Communication Unit 302

The communication unit 302 exchanges information with the distribution server device 100 and the verification server device 200 via the network 20.

The communication unit 302 specifically transmits, under the control of the control unit 301, the request for a control program, the connection request for operating the appliance, the login necessity information, the operational instruction, and the evaluation value S' to the distribution server device 100 via the network 20.

The communication unit 302 also transmits, under the control of the control unit 301, the user identifier and the password to the distribution server device 100 via the network 20 by using a secure means.

The communication unit 302 also receives various messages from the verification server device 200 via the network 20. Subsequently, the control unit 301 outputs the received message to the display unit 309.

The communication unit 302 also receives the control program, the associated data and the random number R from the distribution server device 100 via the network 20 by using a secure means. Subsequently, the communication unit 302 writes the received control program into the program storage unit 305. The communication unit 302 also writes the received associated data and the random number R into the associated data storage unit 307.

The communication unit 302 also receives information from the verification server device 200 via the network 20, and outputs the received information to the memory card 400 via the input/output unit 308. The communication unit 302 also receives information from the memory card 400 via the input/output unit 308, and transmits the received information to the verification server device 200 via the network 20.

(3) Mutual Authentication Unit 303

The mutual authentication unit 303 has the same structure as the mutual authentication unit 203 of the verification server device 200.

When receiving a request for acquisition of the control program, the mutual authentication unit 303 performs mutual authentication and key sharing with the mutual authentication unit 103 of the distribution server device 100.

When transmitting the connection request for operating the appliance, the mutual authentication unit 303 performs mutual authentication and key sharing with the mutual authentication unit 203 of the verification server device 200.

Furthermore, when acquiring the unique identifier, the mutual authentication unit 303 performs mutual authentication and key sharing with the mutual authentication unit 403 of the memory card 400.

(4) Verification Unit 311

Upon receiving a request for starting up the control program 331, the verification unit 311 reads the public key assigned to the verification server device 200 from the key storage unit 304. Subsequently, the verification unit 311 applies digital signature verification Vrfy to the signature data 334a stored in the signature region 334 of the control program 331 installed in the program storage unit 305 and to the execution region 332 and the first data region 333 of the control program 331 by using the public key thus read.

When the digital signature verification Vrfy fails, the verification unit 311 generates a message indicating that the verification has failed, and outputs the generated message to the display unit 309. Accordingly, the terminal device 300 terminates the processing.

When the digital signature verification Vrfy is successful, the terminal device 300 continues its processing.

The verification unit 311 outputs the verification result, which indicates a failure or a success of the verification, to the program execution unit 306.

(5) Program Execution Unit 306

The program execution unit 306 installs the control program 231 into the program storage unit 305. As a result, the control program 331 is stored in the program storage unit 305 as shown in FIG. 10. At this point, the second data region 335 and the third data region 336 does not store associated data or data.

The program execution unit 306 receives the verification result, which indicates a failure or a success of the verification, from the verification unit 311. When the received verification result indicates a failure of the verification, the program execution unit 306 terminates the subsequent processing of the terminal device 300.

When the received verification result indicates a success of the verification, the program execution unit 306 puts the control program 331 into the execution state.

Figure 11:
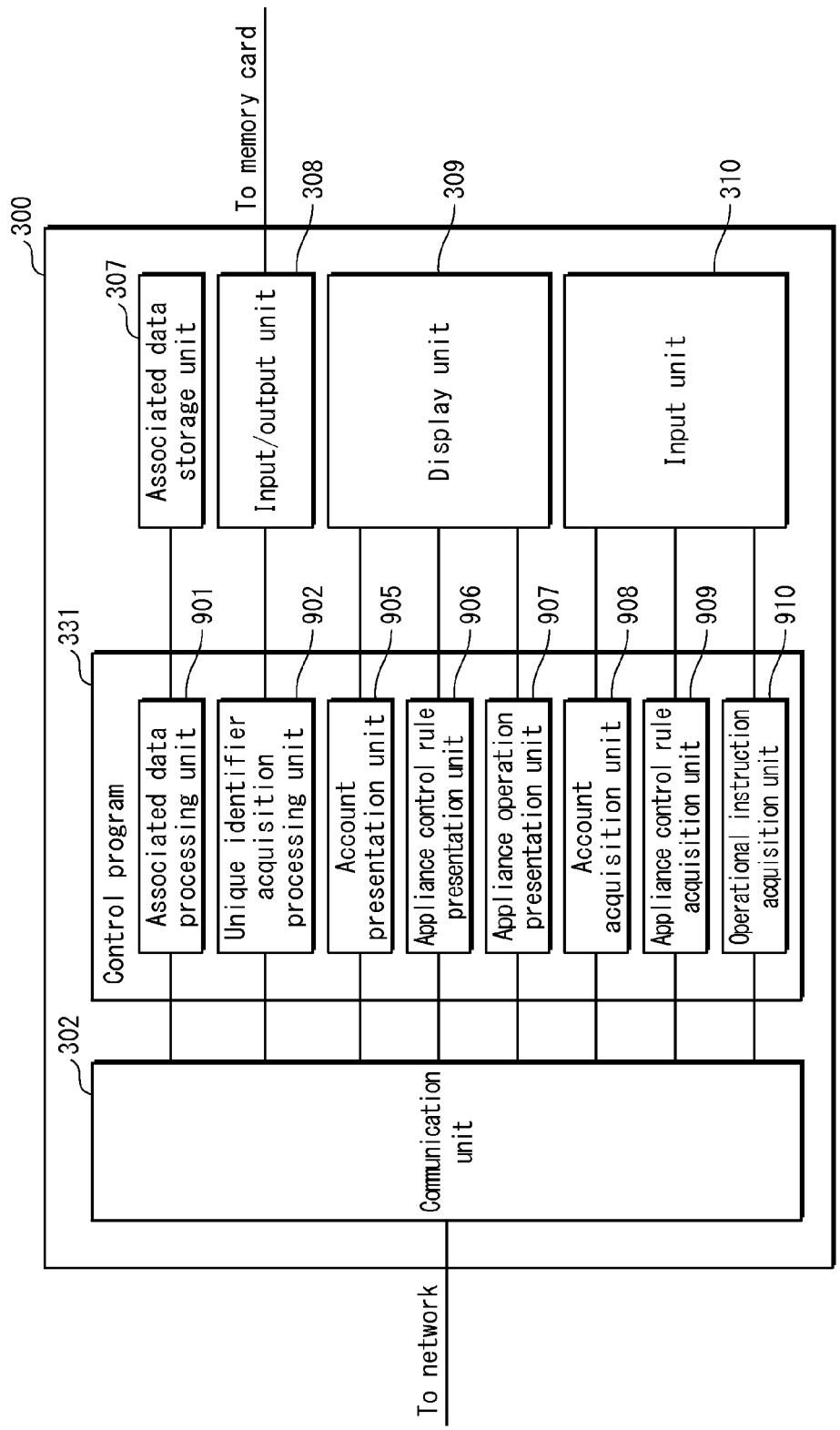
FIG. 11 shows a functional structure of a control program 331 that runs in the terminal device 300.

The program execution unit 306 executes the control program 331 and thereby realizes the functions of an associated data processing unit 901, a unique identifier acquisition processing unit 902, an account presentation unit 905, an appliance control rule presentation unit 906, an appliance operation presentation unit 907, an account acquisition unit 908, an appliance control rule acquisition unit 909 and an operational instruction acquisition unit 910 as shown in FIG. 11.

(Associated Data Processing Unit 901)

The associated data processing unit 901 determines whether the associated data is stored in the associated data storage unit 307. When the associated data is stored in the associated data storage unit 307, the associated data processing unit 901 overwrites the second data region 335 in the control program 331 with the associated data stored in the associated data storage unit 307. When the associated data is not stored in the associated data storage unit 307, the associated data processing unit 901 does not perform the overwriting with the associated data.

The associated data processing unit 901 receives the associated data and the random number R from the verification server device 200 via the network 20 and the communication unit 302 by using a secure means.

Subsequently, the associated data processing unit 901 determines whether the associated data and the random number R have been received.

When the associated data and the random number R have been received, the associated data processing unit 901 writes the received associated data into the associated data storage unit 307. Subsequently, the associated data processing unit 901 writes the received random number R into the associated data storage unit 307.

When the associated data and the random number R have not been received, the associated data processing unit 901 does not perform the writing of the associated data and the random number R.

(Unique Identifier Acquisition Processing Unit 902)

When receiving the operational instruction from the user, the unique identifier acquisition processing unit 902 outputs a request for the unique identifier to the memory card 400 via the input/output unit 308. Immediately after outputting the request for the unique identifier, the unique identifier acquisition processing unit 902 provisionally sets "0" to the unique identifier Y' as a variable.

The unique identifier acquisition processing unit 902 determines whether the unique identifier has been received from the memory card 400. Here, the unique identifier to be received is denoted as unique identifier Y'. When receiving the unique identifier Y', the unique identifier acquisition processing unit 902 calculates the hash value H' by applying the hash operation Hash to the memory and the data stored in the execution region 332, the first data region 333, the signature region 334 and the second data region 335 of the control program 331 stored in the program storage unit 305.

Hash Value H'=Hash(Memory and Data Stored in Execution Region 332, First Data Region 333, Signature Region 334 and Second Data Region 335 of Control Program 331 stored in Program Storage Unit 305)

The third data region 336 is excluded from the hash operation Hash because the data stored in the third data region 336 varies depending on the execution status of the control program 331.

Here, examples of the hash operation Hash include SHA-1. The hash operation Hash may be SHA-2, SHA-256, or the like.

Note that the hash operation Hash applied here should be the same as the hash operation Hash applied by the authenticity evaluation unit 210.

Subsequently, the unique identifier acquisition processing unit 902 calculates the evaluation value S' by using the unique identifier Y', the hash value H' and the random number R.

Evaluation Value S'=Unique Identifier Y' XOR Oneway (Hash Value H', Random Number R)

Here, one-way operation Oneway(A, B) denotes the value obtained by applying a one-way operation to data A and data B. For example, the one-way operation Oneway(A, B) is a hash value obtained by applying a keyed hash operation to the data A, using the data B as the key. The one-way operation Oneway(A, B) may be a hash value obtained by applying a hash operation to the concatenated data obtained by joining the data A and the data B in this order. Alternatively, the one-way operation Oneway(A, B) may be a hash value obtained by generating a ciphertext by using the data B as the key and an encryption algorithm according to the AES as the secret key cryptosystem, and applying the hash operation SHA-1 to the generated ciphertext.

Note that the one-way operation Oneway applied here should be the same as the one-way operation Oneway applied by the authenticity evaluation unit 210.

Subsequently, the unique identifier acquisition processing unit 902 transmits the evaluation value S' to the verification server device 200 via the communication unit 302 and the network 20.

(Account Presentation Unit 905)

The account presentation unit 905 outputs the user identifier and the password input by the user, to the display unit 309, and causes the display unit 309 to display them.

(Appliance Control Rule Presentation Unit 906)

<Appliance Control Rule Change>

The appliance control rule presentation unit 906 receives the control rule management table from the verification server device 200 via the network 20 and the communication unit 302. Subsequently, the appliance control rule presentation unit 906 generates a control rule change screen 361 by using the control rule management table thus received.

Figure 13:
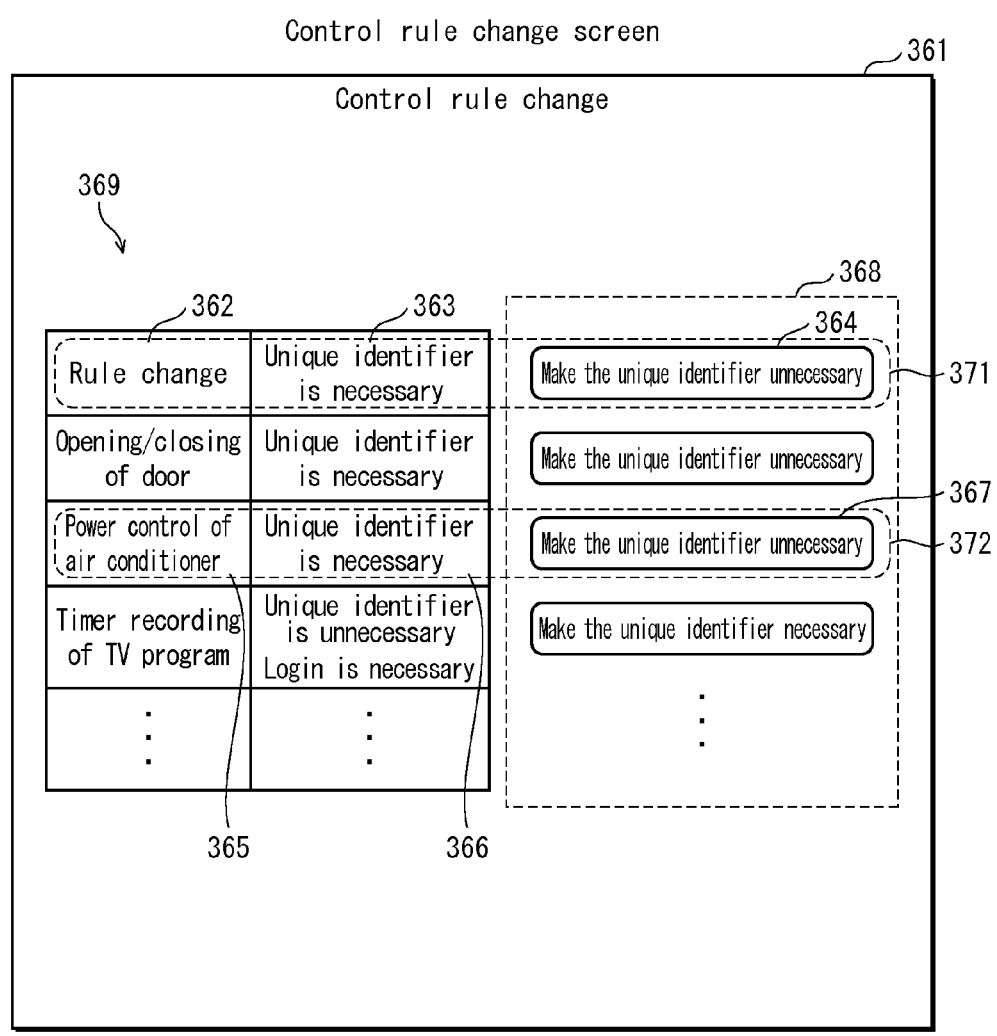
FIG. 13 shows a control rule change screen 361 displayed on the terminal device 300.

FIG. 13 shows an example of the control rule change screen 361. As shown in the drawing, the control rule change screen 361 contains a plurality of fields. The fields respectively correspond to the control rule information sets of the control rule management table. The fields include combinations of a display field and a button field. The display field displays the operation information and the conditions. The button field displays the information about the changing of the conditions.

The appliance control rule presentation unit 906 generates the fields of the control rule change screen 361 for each of the control rule information sets contained in the control rule management table. Specifically, the appliance control rule presentation unit 906 generates the display field from the operation information and the conditions contained in the control rule information set. That is, the contents of the display field are the operation information and the conditions. The appliance control rule presentation unit 906 generates the button field from the conditions contained in the control rule information set. That is, the appliance control rule presentation unit 906 generates candidate conditions for the condition changing, from conditions not contained in the control rule information set, and displays the generated candidate conditions in the button field.

The control rule change screen 361 contains fields 371 and 372, for example.

The display field contained in the field 371 displays operation information 362 "Rule change" and conditions 363 "unique identifier is necessary", and the button field contained in the field 371 displays a condition change 364 "Make the unique identifier unnecessary".

The display field contained in the field 372 displays operation information 365 "Power control of air conditioner" and conditions 366 "Unique identifier is necessary", and the button field contained in the field 372 displays a condition change 367 "Make the unique identifier unnecessary".

As described above, each field shows the restriction for the corresponding item. The restriction determines whether login is required or not and whether the unique identifier is required or not. The button field displays candidate conditions for changing the current restriction. The user can change the current restriction by pressing the button field.

(Appliance Operation Presentation Unit 907)

<Processing for Appliance Information Acquisition>

The appliance operation presentation unit 907 receives the message indicating that it is impossible to acquire the appliance state information, from the verification server device 200 via the network 20 and the communication unit 302. The appliance state information shows the state of the appliance. Subsequently, the appliance operation presentation unit 907 outputs the received message to the display unit 309.

The appliance operation presentation unit 907 receives the message containing the appliance state information, from the verification server device 200 via the network 20 and the communication unit 302. Subsequently, the appliance operation presentation unit 907 outputs the received message to the display unit 309.

<Processing related to Remote Control of Appliance 500>

The appliance operation presentation unit 907 receives the message that indicates that it is impossible to acquire the appliance state information and the message that contains the operation information and the item which have been acquired, from the verification server device 200 via the network 20 and the communication unit 302. Subsequently, the appliance operation presentation unit 907 generates an appliance operation menu by using, from among the received messages, the message containing the operation information and the item.

Figure 12:
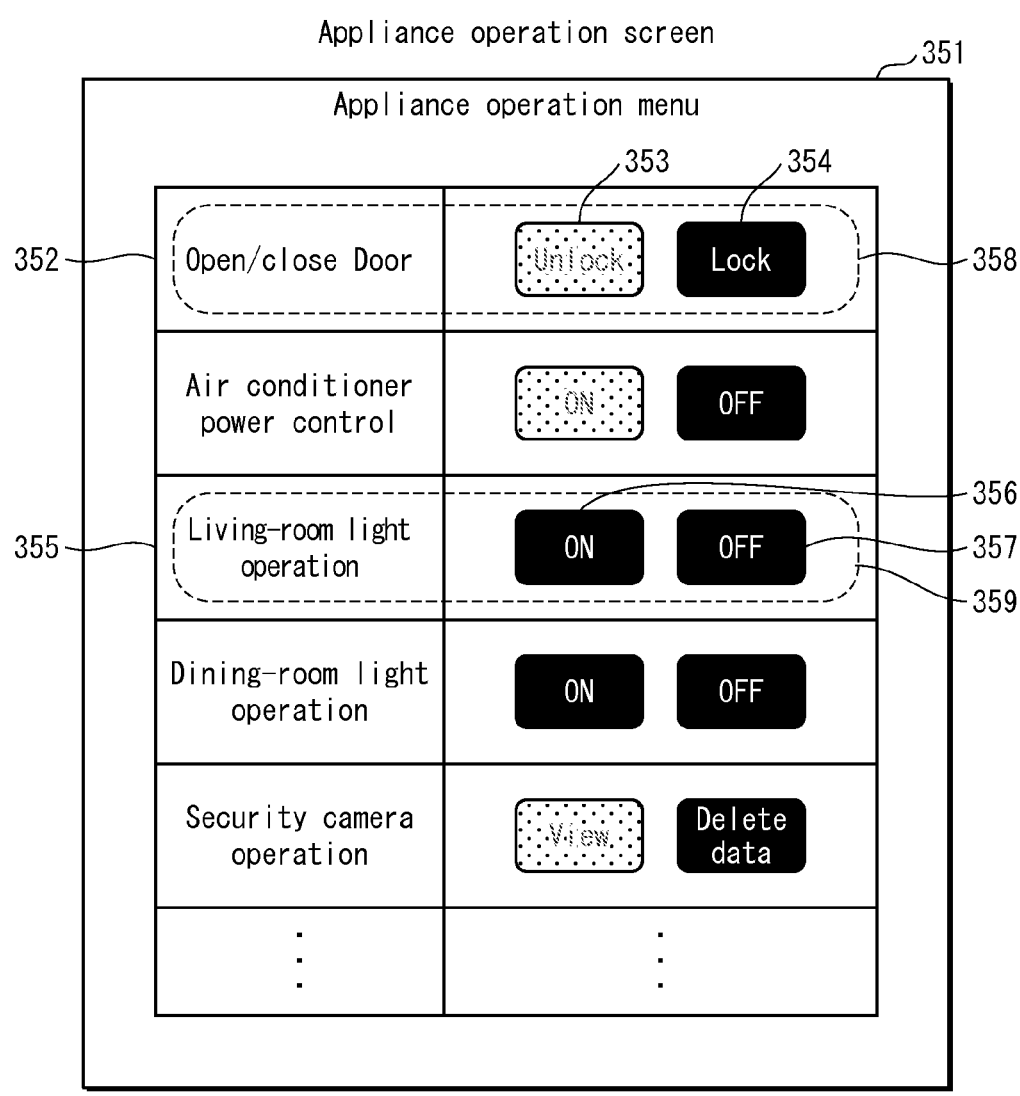
FIG. 12 shows an appliance operation screen 351 displayed on the terminal device 300.

FIG. 12 shows an appliance operation screen 351 as an example appliance operation menu.

The appliance operation screen 351 contains a plurality of fields. Each field corresponds to an operation of an appliance, and also corresponds to a single message. Each field contains operation information and an operation button.

The appliance operation presentation unit 907 generates a single field corresponding to a received single message. The operation information contained in the message is assigned to the operation information of the field, and the item contained in the message is assigned to the operation button.

The appliance operation screen 351 shown in FIG. 12 displays the operation information and the operation button in correspondence with each appliance. The button field displays the candidate conditions for changing the current restriction. The user can change the current restriction by pressing the operation button.

The appliance operation screen 351 contains fields 358 and 359, for example. The field 358 contains operation information 352 "Open/close door", and an operation button 353 "Unlock" and an operation button 354 "Lock" corresponding to the operation information 352. The operation button 353 is displayed in grey color (halftone), showing that the operation button 353 is inactive. The user can not operate the operation button 353. In order to show that the operation button 354 "Lock" is currently operable, the operation button 354 "Lock" is displayed with increased contrast, showing that the operation button 354 is active. The user can operate the operation button 354. Instead of the colors of the operation buttons, sizes or shapes of the operation buttons may be changed in order to show whether the buttons are active or inactive.

The field 359 contains operation information 355 "Living-room light operation", and an operation button 356 "ON" and an operation button 357 "OFF" corresponding to the operation information 355. The user can operate the operation button 356 and the operation button 357.

In FIG. 12, the appliance operation screen 351 displays the operation information and the operation button in correspondence with operations of each appliance. However, the appliance operation screen 351 may display the operation information and the operation button in correspondence with the functions of each appliance. For example, when the appliance is a TV receiver, the operation information and the operation button may be displayed for each of the functions such as channel changing and timer recording of a program.

In the present description, the appliance operation screen 351 is generated by the terminal device 300. However, this is not essential. The appliance operation screen 351 may be generated by the verification server device 200 and transmitted to the terminal device 300. The terminal device 300 receives the appliance operation screen 351, and displays the appliance operation screen 351 thus received.

(Account Acquisition Unit 908)

The account acquisition unit 908 receives a request for the user identifier and the password from the distribution server device 100 via the network 20 and the communication unit 302. Upon receiving the user identifier and the password, the account acquisition unit 908 controls the input unit 310 to receive the user identifier and the password.

When a request for starting up the control program is received and the connection request for connecting to the verification server device 200 is transmitted, the account acquisition unit 908 controls the input unit 310 to receive login necessity information indicating whether the login is necessary. Subsequently, the account acquisition unit 908 receives the login necessity information from the input unit 310. Subsequently, the account acquisition unit 908 transmits the login necessity information to the verification server device 200 via the communication unit 302 and the network 20.

The account acquisition unit 908 determines whether the received login necessity information indicates that the login is necessary. When the received login necessity information indicates that the login is necessary, the account acquisition unit 908 controls the input unit 310 to receive the user identifier and the password. When the received login necessity information indicates that the login is unnecessary, the account acquisition unit 908 does not provide the input unit 310 with a request to receive the user identifier and the password.

The account acquisition unit 908 receives the user identifier and the password from the input unit 310. Subsequently, the account acquisition unit 908 transmits the user identifier and the password thus received to the distribution server device 100 via the communication unit 302 and the network 20 by using a secure means.

(Appliance Control Rule Acquisition Unit 909)

The appliance control rule acquisition unit 909 receives an instruction to change the control rule from the input unit 310. Subsequently, the appliance control rule acquisition unit 909 transmits the instruction to change the control rule to the verification server device 200 via the communication unit 302 and the network 20.

(Operational Instruction Acquisition Unit 910)

When receiving an operational instruction that is not an instruction to terminate the processing, the operational instruction acquisition unit 910 transmits the received operational instruction to the verification server device 200 via the communication unit 302 and the network 20.

When receiving an operational instruction to terminate the processing from the input unit 310, the operational instruction acquisition unit 910 performs control for terminating the processing by the terminal device 300.

(6) Control Unit 301

The control unit 301 controls the communication unit 302, the mutual authentication unit 303, the key storage unit 304, the program storage unit 305, the program execution unit 306, the associated data storage unit 307, the input/output unit 308, the display unit 309, the input unit 310, and the verification unit 311.

The control unit 301 receives various messages from the distribution server device 100 via the network 20 and the communication unit 302. Subsequently, the control unit 301 outputs the received message to the display unit 309.

The control unit 301 outputs to the display unit 309 a message indicating that the user is not successfully logging in. The control unit 301 also outputs to the display unit 309 a message indicating that the unique identifier has not been acquired.

(7) Input Unit 310, Display Unit 309 and Input/Output Unit 308

The input unit 310 receives the operational instruction and data from the user of the terminal device 300.

Specifically, the input unit 310 receives an instruction to acquire the control program, the user identifier and the password, the login necessity information, an instruction to start up the control program, a request to acquire the appliance information, an instruction related to the remote control of the appliance, and an instruction to change the control rule. Subsequently, the input unit 310 outputs the operational instruction and the data thus received to the control unit 301. Examples of the instruction related to the remote control of the appliance include an instruction to remotely control the appliance. Specifically, examples of the remote control instruction include an instruction to power on or off the appliance 500a as a TV receiver, an instruction to power on or off the appliance 500b as an air conditioner, an instruction to power on or off the appliance 500c as a living-room light, and so on.

The display unit 309 receives various messages from the control unit 301 or the communication unit 302. Subsequently, the display unit 309 displays the received message. Examples of the message include a message indicating that the user is not logging in, a message indicating that the unique identifier has not been acquired, and so on.

The display unit 309 displays the appliance operation screen 351 shown in FIG. 12 as an appliance operation menu. The display unit 309 also displays the control rule change screen 361 shown in FIG. 13, which is used for changing the control rule.

The input/output unit 308 relays information exchanged between the memory card 400 and the program execution unit 306, between the memory card 400 and the communication unit 302, or between the memory card 400 and the control unit 301.

2.5 Memory Card 400

Figure 14:
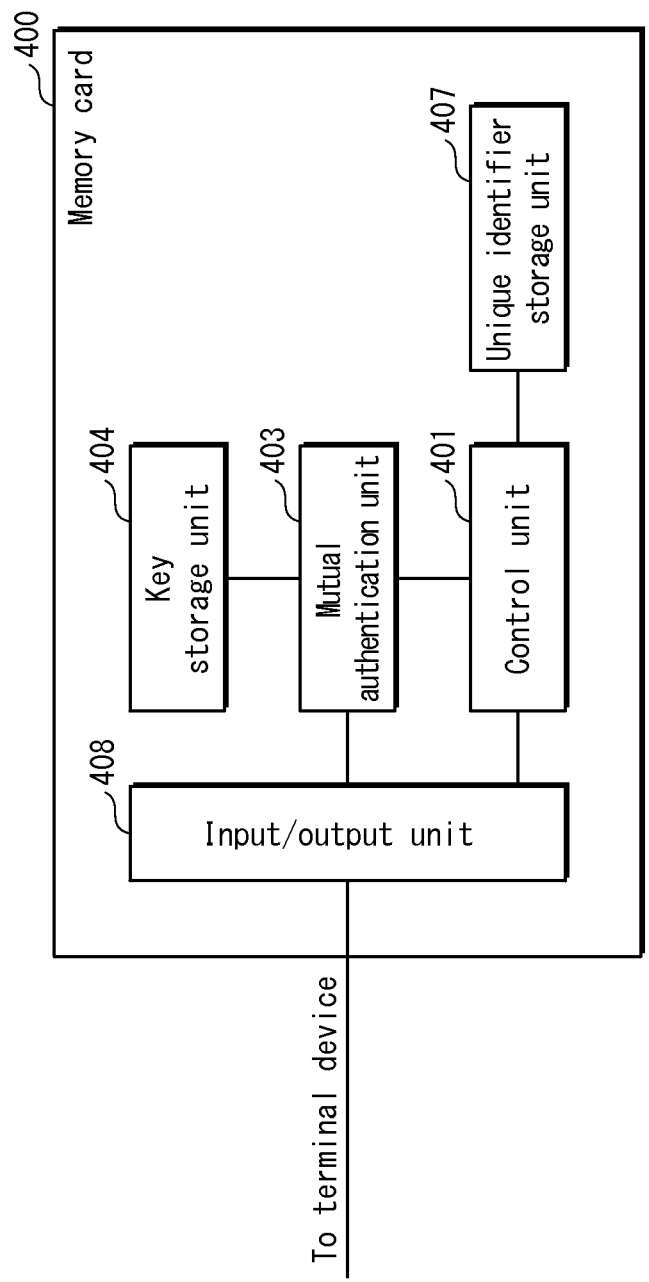
FIG. 14 is a block diagram showing the structure of a memory card 400.

As shown in FIG. 14, the memory card 400 includes a control unit 401, a mutual authentication unit 403, a key storage unit 404, a unique identifier storage unit 407 and an input/output unit 408.

The memory card 400 is specifically realized as a computer system including a microprocessor, ROM, RAM, an input/output device, and so on. The RAM stores the computer program. The microprocessor operates in accordance with the computer program to have the memory card 400 realize the functions.

(1) Unique Identifier Storage Unit 407 and Key Storage Unit 404

The unique identifier storage unit 407 includes a non-volatile semiconductor memory. The unique identifier storage unit 407 stores a unique identifier that is unique to the memory card 400. The unique identifier has a length of 32 bits, for example.

The key storage unit 404 stores the system key Ksc written in advance.

(2) Control Unit 401

The control unit 401 controls the mutual authentication unit 403, the key storage unit 404, the unique identifier storage unit 407 and the input/output unit 408.

The control unit 401 also receives a request for the unique identifier from the verification server device 200 via the network 20, the terminal device 300 and the input/output unit 408. Upon receiving a request for the unique identifier, the control unit 401 attempts to read the unique identifier from the unique identifier storage unit 407. When successfully reading the unique identifier, the control unit 401 transmits the unique identifier thus read to the verification server device 200 via the input/output unit 408, the terminal device 300 and the network 20 by using a secure means. When failing to read the unique identifier, the control unit 401 transmits a message indicating that there is no unique identifier, to the verification server device 200 via the input/output unit 408, the terminal device 300 and the network 20 by using a secure means.

The control unit 401 also receives a request for the unique identifier from the terminal device 300 via the input/output unit 408. Upon receiving a request for the unique identifier, the control unit 401 attempts to read the unique identifier from the unique identifier storage unit 407. When successfully reading the unique identifier, the control unit 401 outputs the unique identifier thus read to the terminal device 300 by using a secure means. When failing to read the unique identifier, the control unit 401 outputs a message indicating that there is no unique identifier, to the terminal device 300 by using a secure means.

(3) Mutual Authentication Unit 403

When the connection request is transmitted to the verification server device 200 from the terminal device 300, the mutual authentication unit 403 performs mutual authentication with the mutual authentication unit 203 of the verification server device 200 according to a request from the verification server device 200, and shares a shared key with the verification server device 200.

Also, when an operational instruction to operate the appliance 500 is transmitted to the verification server device 200 from the terminal device 300, the mutual authentication unit 403 performs mutual authentication with the mutual authentication unit 303 of the terminal device 300 according to a request from the terminal device 300, and shares a shared key with the terminal device 300.

As shown in FIG. 15, the mutual authentication unit 403 includes an encryptor B11, a random number generator B12, a decryptor B13, a random number comparer B14, a key sharer B15 and an encryptor/decryptor B16.

The encryptor B11 receives the random number R1 from the other party in terms of the mutual authentication. Upon receiving the random number R1, the encryptor B11 encrypts the random number R1 according to an encryption algorithm E3 by using the system key Ksc, thereby generating an encrypted random number E3(Ksc, R1), and transmits the generated encrypted random number E3(Ksc, R1) to the other party.

Here, the encryption algorithm E3 is an algorithm according to a secret key cryptosystem. The encryption algorithm E3 is, for example, an algorithm conforming to the AES. E3(K, A) denotes a ciphertext generated by applying the encryption algorithm E3 to a plaintext A by using a key K.

The random number generator B12 generates a random number R2. The random number generator B12 subsequently outputs the random number R2 thus generated to the random number comparer B14. The random number generator B12 also transmits the random number R2 thus generated to the mutual authentication unit of the other party in terms of the mutual authentication.

The decryptor B13 receives an encrypted random number E4(Ksc, R2) from the other party in terms of the mutual authentication. Subsequently, the decryptor B13 decrypts the encrypted random number E4(Ksc, R2) according to a decryption algorithm D3 by using the system key Ksc, and thereby generates a plaintext R2'=D4(Ksc, E4(Ksc, R2)). The decryptor B13 subsequently outputs the plaintext R2' thus generated to the random number comparer B14.

Here, the decryption algorithm D4 is an algorithm according to a secret key cryptosystem. The encryption algorithm D4 is, for example, an algorithm conforming to the AES. E4(K, A) denotes a ciphertext generated by applying the encryption algorithm E4 to a plaintext A by using a key K. D4(K, B) denotes a plaintext generated by applying a decryption algorithm D4 to a ciphertext B by using a key K.

The random number comparer B14 receives the random number R2 and the plaintext R2'. The random number comparer B14 compares the random number R2 with the plaintext R2'. When the random number R2 matches the plaintext R2', the mutual authentication unit 403 determines that the other party is valid. When the random number R2 does not match the plaintext R2', the mutual authentication unit 403 determines that the other party is invalid.

When the mutual authentication is successful, the key sharer B15 performs the key sharing, and calculates the shared key k'. When the mutual authentication fails, the key sharer B15 does not calculate the shared key k'.

When the mutual authentication is successful, the encryptor/decryptor B16 encrypts data by using the shared key k' thus calculated, and thereby generates encrypted data. The encrypted data is transmitted to the other party. The encryptor/decryptor B16 receives encrypted data from the other party. Subsequently, the encryptor/decryptor B16 decrypts the encrypted data by using the shared key k' thus calculated, and generates the original data.

(4) Input/Output Unit 408

The input/output unit 408 receives information from the terminal device 300, and outputs the received information to the control unit 401 or the mutual authentication unit 403.

The input/output unit 408 also receives information from the control unit 401 or the mutual authentication unit 403, and outputs the received information to the terminal device 300.

2.6 Appliance 500

The following describes the appliance 500 as the representative of the appliances 500a, 500b, 500c, 500d and 500e.

Figure 16:
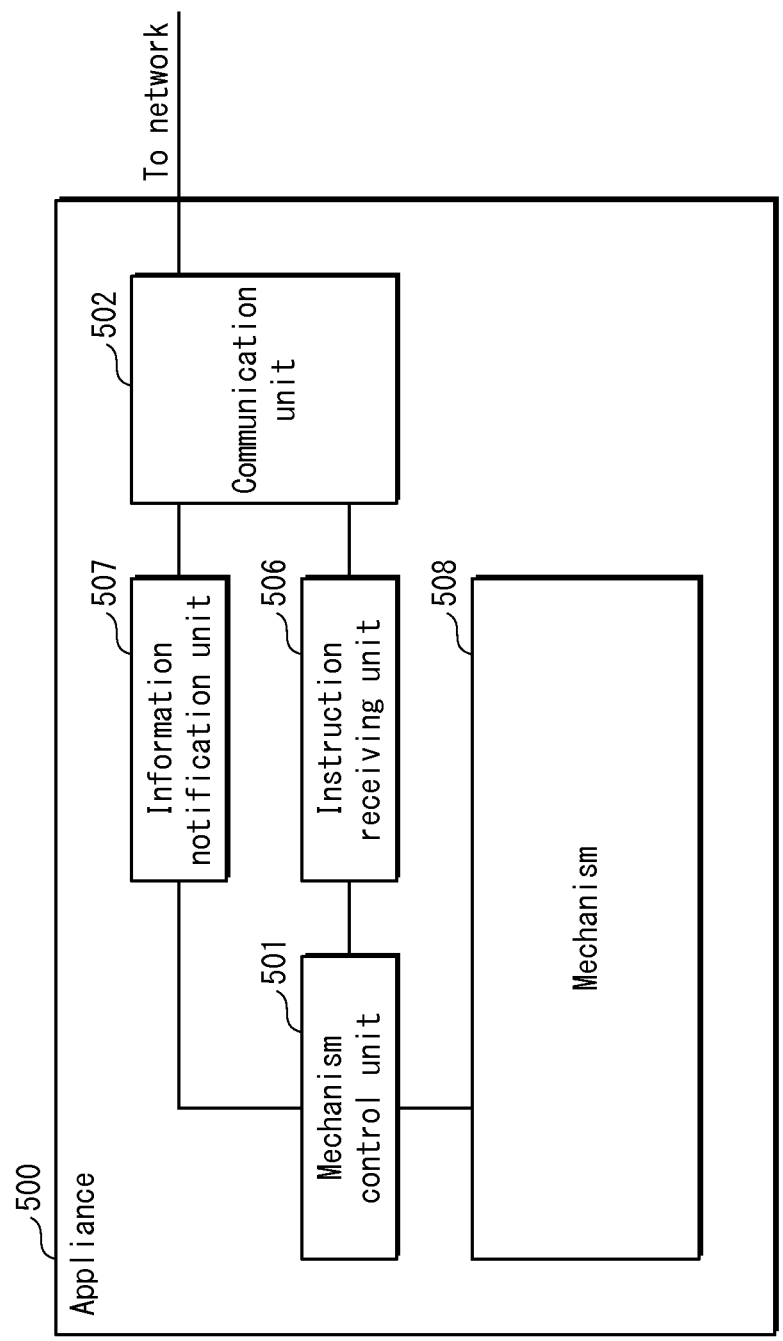
FIG. 16 is a block diagram showing the structure of an appliance 500.

As shown in FIG. 16, the appliance 500 includes a mechanism control unit 501, a communication unit 502, an instruction receiving unit 506, an information notification unit 507, and a mechanism 508.

The mechanism 508 is the principal part for achieving the functions of the appliance 500. When the appliance 500 is a lighting device, the mechanism 508 is a lighting mechanism. When the appliance 500 is a TV receiver, the mechanism 508 receives broadcast waves, and from the received broadcast waves, extracts a program on a channel desired by the user and plays back and displays the extracted program. When the appliance 500 is a door, the mechanism 508 is a lock system for controlling locking and unlocking of the door.

The mechanism 508 receives an operational instruction, including the remote control instruction, from the mechanism control unit 501, and operates according to the remote control instruction included in the received operational instruction.

The communication unit 510 exchanges information with the verification server device 200 via the network 20.

The information notification unit 507 receives, from the mechanism control unit 501, appliance state information indicating the state of the mechanism 508 of the appliance, and transmits the received appliance state information to the verification server device 200 via the communication unit 502 and the network 20.

The instruction receiving unit 506 receives, from the verification server device 200, a remote control instruction for controlling the mechanism 508 of the appliance via the network 20 and the communication unit 502, and outputs the received remote control instruction to the mechanism control unit 501.

The mechanism control unit 501 receives the remote control instruction from the instruction receiving unit 506, and controls the mechanism 508 according to the received remote control instruction. Also, the mechanism control unit 501 acquires, from the mechanism 508, the appliance state information indicating the state of the mechanism 508, and outputs the acquired appliance state information to the information notification unit 507.

The mechanism control unit 501 receives a request for acquisition of the appliance state information from the verification server device 200 via the network 20, the communication unit 502 and the instruction receiving unit 506. Subsequently, the mechanism control unit 501 extracts, from the request for acquisition of the appliance state information, appliance information related to the target appliance, and acquires the appliance state information corresponding to the extracted appliance information from the mechanism 508. Subsequently, the mechanism control unit 501 transmits the acquired appliance state information to the verification server device 200 via the information notification unit 507, the communication unit 502 and the network 20.

2.7 Operations of Remote Control System 10

Figure 17:
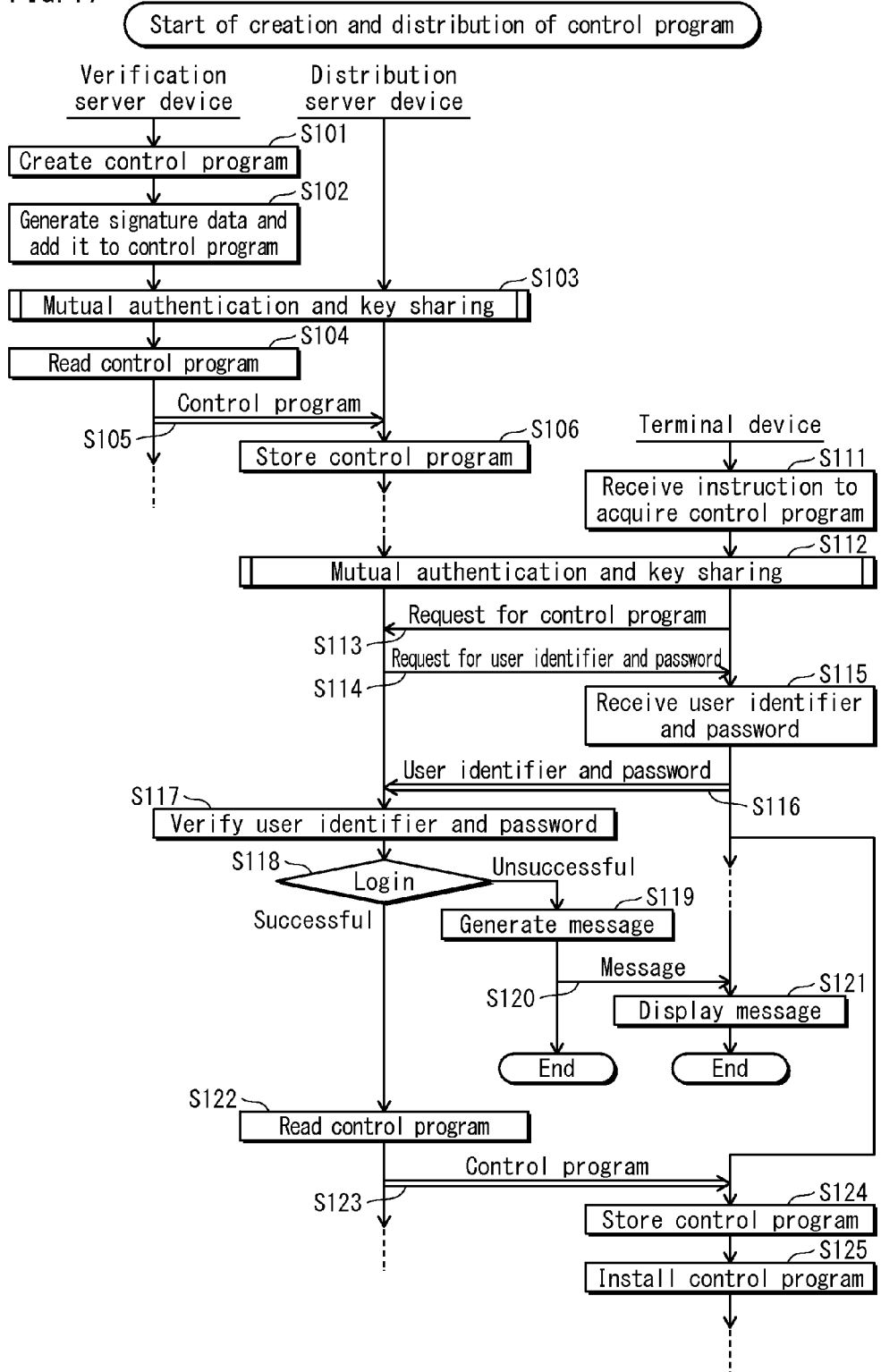
FIG. 17 is a sequence diagram showing procedures performed within the remote control system 10 to create and distribute a control program.

(1) Procedures for Creation of Control Program and Distribution of Control Program The following explains the procedures for creation of the control program and the distribution of the control program with reference to the sequence diagram shown in FIG. 17.

The program creation unit 206 of the verification server device 200 creates a control program according to operations by the user of the verification server device 200. Subsequently, the program creation unit 206 writes the control program thus created into the program storage unit 207 (Step S101).

The signature generation unit 214 reads the private key assigned to the verification server device 200 from the key storage unit 204, and reads the control program from the program storage unit 207. Subsequently, the signature generation unit 214 generates the signature data by applying the digital signature Sign to the read control program, by using the read private key. Subsequently, the signature generation unit 214 adds the signature data thus generated to the control program, and overwrites the control program stored in the program storage unit 207 with the control program to which the signature data has been added (Step S102).

Subsequently, the mutual authentication unit 203 of the verification server device 200 and the mutual authentication unit 103 of the distribution server device 100 perform mutual authentication and key sharing (Step S103). The details of the mutual authentication and the key sharing will be described later.

Subsequently, the communication unit 202 reads the control program from the program storage unit 207 (Step S104).

Subsequently, the communication unit 202 of the verification server device 200 transmits the read control program to the distribution server device 100 via the network 20 by using a secure means (Step S105). Subsequently, the communication unit 102 of the distribution server device 100 receives the control program from the verification server device 200 via the network 20 by using a secure means (Step S105).

The communication by using a secure means is realized by the following method.

The mutual authentication unit 203 encrypts the control program by using the shared key generated in the mutual authentication and the key sharing shown in Step S103, thereby generating an encrypted control program. In Step S105, the communication unit 202 transmits the encrypted control program to the distribution server device 100 via the network 20. Subsequently, the communication unit 102 receives the encrypted control program from the verification server device 200 via the network 20. The mutual authentication unit 103 decrypts the encrypted control program by using the shared key generated in the mutual authentication and the key sharing shown in Step S103, thereby generating the control program.

Subsequently, the communication unit 102 writes the received control program into the storage unit 105 (Step S106).

By the procedures described above, the control program is transmitted from the verification server device 200 to the distribution server device 100.

Subsequently, the input unit 310 of the terminal device 300 receives, from the user of the terminal device 300, an instruction to acquire the control program (Step S111).

Subsequently, the mutual authentication unit 103 of the distribution server device 100 and the mutual authentication unit 303 of the terminal device 300 perform mutual authentication and key sharing (Step S112).

Subsequently, under the control of the control unit 301, the communication unit 302 transmits a request for the control program to the distribution server device 100 via the network 20 (Step S113). The control unit 101 of the distribution server device 100 receives the request for the control program from the terminal device 300 via the network 20 and the communication unit 102 (Step S113).

Subsequently, the control unit 101 transmits a request for the user identifier and the password to the terminal device 300 via the communication unit 102 and the network 20 (Step S114). The account acquisition unit 908 receives the request for the user identifier and the password from the distribution server device 100 via the network 20 and the communication unit 302 (Step S114).

Subsequently, the input unit 310 receives the user identifier and the password from the user of the terminal device 300 (Step S115). The account acquisition unit 908 transmits the user identifier and the password thus received to the distribution server device 100 via the communication unit 302 and the network 20 by using a secure means (Step S116). The account verification unit 107 receives the user identifier and the password from the terminal device 300 via the network 20 and the communication unit 102 by using a secure means (Step S116). Here, the secure means is realized by the above-described method using encryption and decryption.

Subsequently, the account verification unit 107 determines whether the user identifier and the password thus received are stored in the account storage unit 106 (Step S117). If the user identifier and the password thus received are not stored in the account storage unit 106, the account verification unit 107 determines that the login has failed (i.e. unsuccessful login). If the user identifier and the password thus received are stored in the account storage unit 106, the account verification unit 107 determines that the login has been successful (i.e. successful login).

In the case of the unsuccessful login (Step S118: unsuccessful), the account verification unit 107 generates a message showing the unsuccessful login (Step S119). Subsequently, the account verification unit 107 transmits the message to the terminal device 300 via the communication unit 102 and the network 20 (Step S120). Accordingly, the terminal device 100 terminates the processing.

The control unit 301 of the terminal device 300 receives the message from the distribution server device 100 via the network 20 and the communication unit 302 (Step S120). Subsequently, the display unit 309 displays the received message (Step S121). Accordingly, the terminal device 300 terminates the processing.

In the case of the successful login (Step S118: Successful), the control unit 101 reads the control program from the storage unit 105 (Step S122). Subsequently, the control unit 101 transmits the control program thus read to the terminal device 300 via the communication unit 102 and the network 20 by using a secure means (Step S123). The communication unit 302 receives the control program from the distribution server device 100 via the network 20 by using a secure means (Step S123). Here, the secure means is the same as described above. Subsequently, the communication unit 302 writes the received control program into the program storage unit 305 (Step S124). Subsequently, the program execution unit 306 installs the control program into the program storage unit 305 (Step S125).

By the procedures described above, the control program is transmitted from the distribution server device 100 to the terminal device 300.

(2) Procedures for Starting up the Control Program

Figure 18:
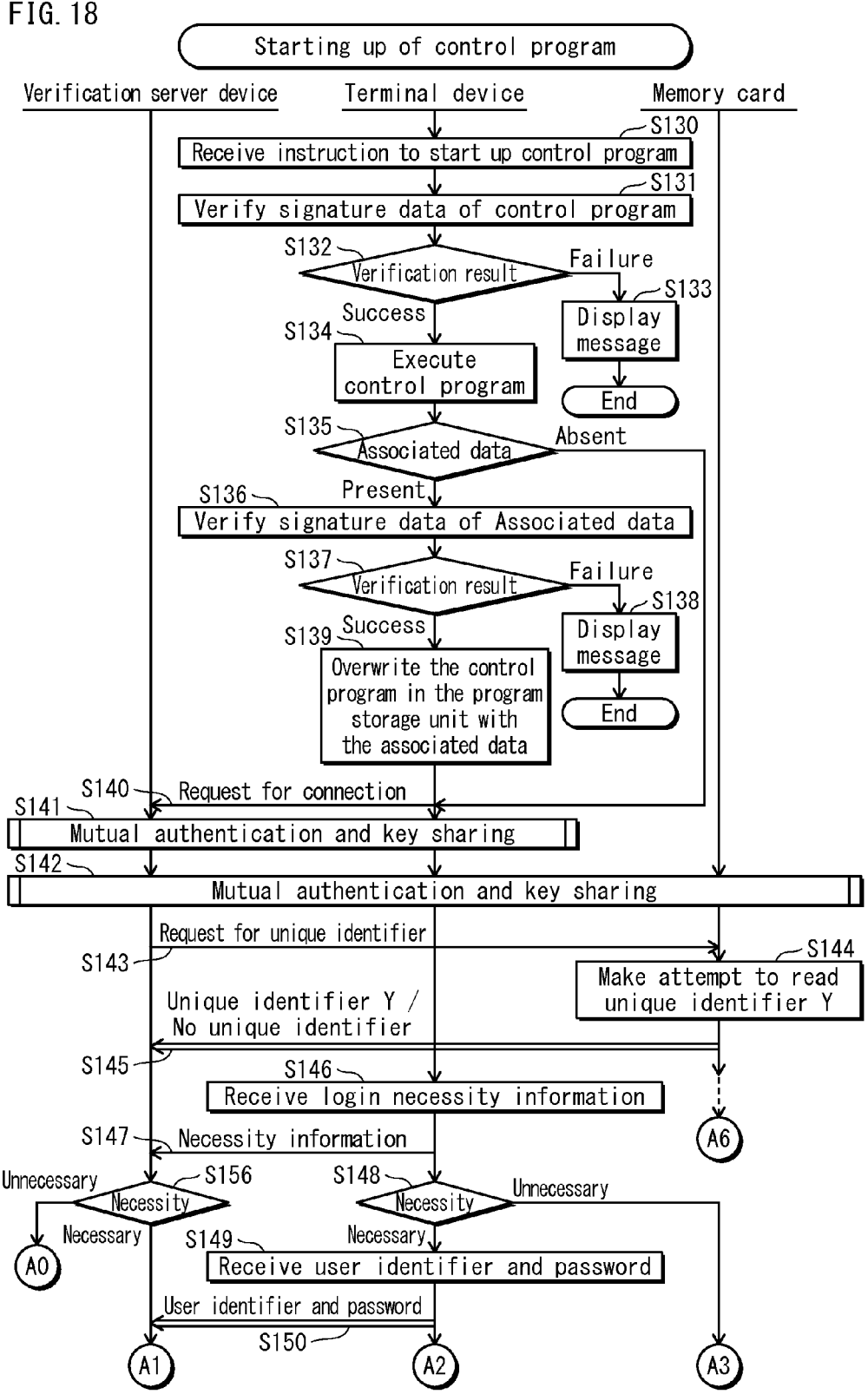
FIG. 18 is a sequence diagram (Part 1) showing procedures performed within the remote control system 10 when starting up the control program, followed by FIG. 19.
Figure 19:
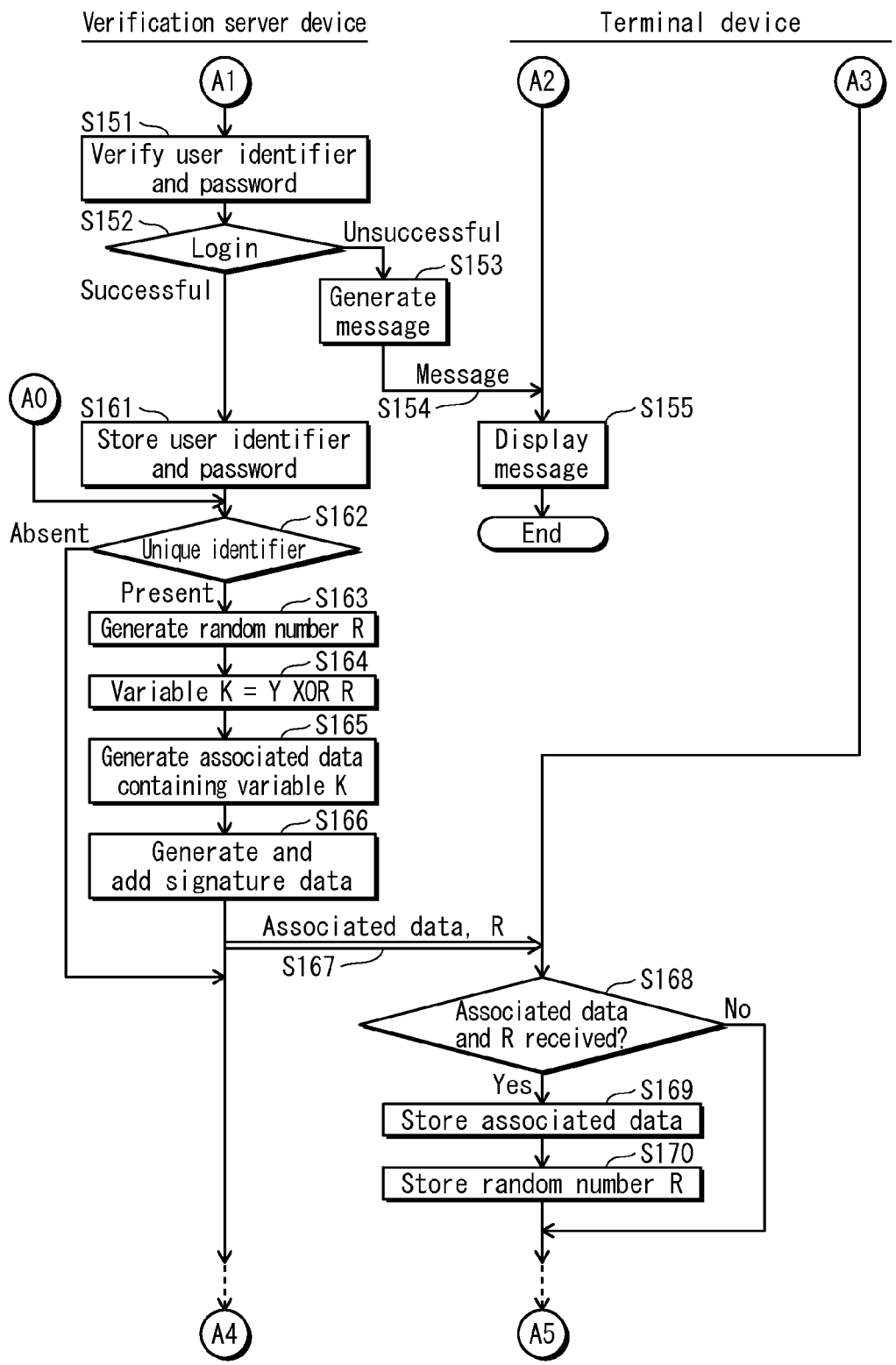
FIG. 19 is a sequence diagram (Part 2) showing procedures performed within the remote control system 10 when starting up the control program, followed by FIG. 20.
Figure 20:
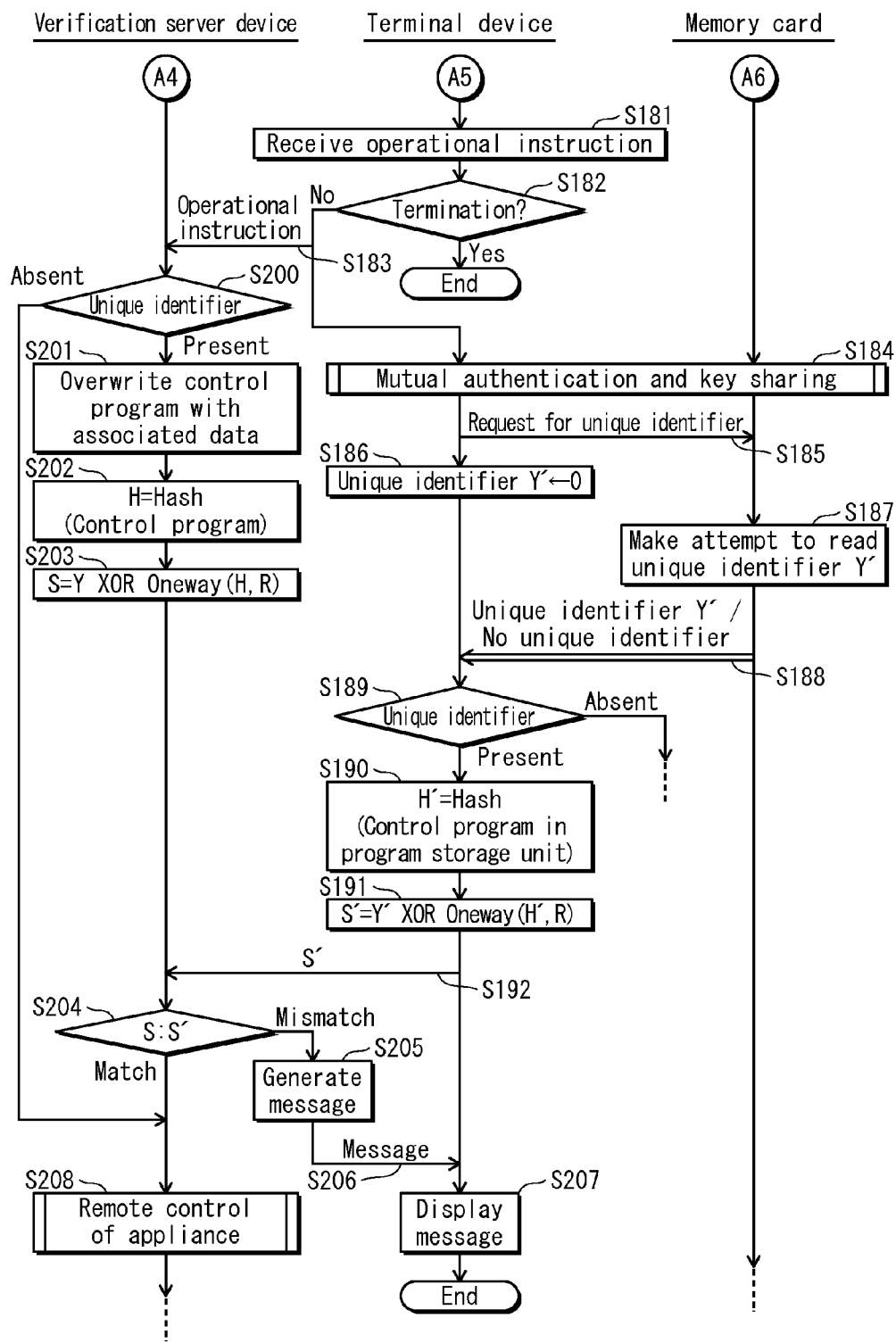
FIG. 20 is a sequence diagram (Part 3) showing procedures performed within the remote control system 10 when starting up the control program.

The following describes the procedures for starting up the control program with reference to the sequence diagram shown in FIGS. 18 through 20.

The input unit 310 of the terminal device 300 receives, from the user of the terminal device 300, an instruction to start up the control program (Step S130). This point in time is hereinafter called "the first time point".

The verification unit 311 reads the public key assigned to the verification server device 200 from the key storage unit 304. Subsequently, the verification unit 311 applies the digital signature verification Vrfy to the signature data 334a stored in the signature region 334 of the control program 331 installed in the program storage unit 305, the execution region 332, and the first data region 333 by using the public key thus read (Step S131). When the digital signature verification Vrfy fails (Step S132: Failure), the verification unit 311 generates a message indicating that the verification has failed, and the display unit 309 displays the message (Step S133). Accordingly, the terminal device 300 terminates the processing.

When the digital signature verification Vrfy is successful (Step S132: Success), the program execution unit 306 puts the control program 331 into the execution state (Step S134). The associated data processing unit 901 determines whether the associated data is stored in the associated data storage unit 307 (Step S135).

When the associated data is stored in the associated data storage unit 307 (Step S135: Present), the verification unit 311 reads the public key assigned to the verification server device 200 from the key storage unit 304. Subsequently, the verification unit 311 applies the digital signature verification Vrfy to the signature data stored in the signature region of the associated data in the associated data storage unit 307, and to the variable K stored in the variable number region, by using the read public key (Step S136). When the digital signature verification Vrfy fails (Step S137: Failure), the verification unit 311 generates a message indicating that the verification has failed, and the display unit 309 displays the message (Step S138). Accordingly, the terminal device 300 terminates the processing.

When the digital signature verification Vrfy is successful (Step S137: Success), the associated data processing unit 901 overwrites the second data region 335 of the control program 331 with the associated data stored in the associated data storage unit 307 (Step S139).

When the associated data is not stored in the associated data storage unit 307 (Step S135: Absent), the verification unit 311 does not perform the verification and the associated data processing unit 901 does not perform the overwriting with the associated data.

The control unit 301 transmits the connection request for the remote control of the appliance 500 to the verification server device 200 via the communication unit 302 and the network 20 (Step S140). The control unit 201 receives the connection request from the terminal device 300 via the network 20 and the communication unit 202 (Step S140).

Subsequently, the mutual authentication unit 203 of the verification server device 200 and the mutual authentication unit 303 of the terminal device 300 perform mutual authentication and key sharing (Step S141).

Subsequently, the mutual authentication unit 203 of the verification server device 200 and the mutual authentication unit 403 of the memory card 400 perform mutual authentication and key sharing (Step S142).

The control unit 201 of the verification server device 200 transmits a request for the unique identifier to the memory card 400 via the communication unit 202, the network 20 and the terminal device 300 (Step S143). The control unit 401 of the memory card 400 receives the request for the unique identifier from the verification server device 200 via the network 20, the terminal device 300 and the input/output unit 408 (Step S143). Subsequently, the control unit 401 attempts to read the unique identifier Y from the unique identifier storage unit 407 (Step S144). The control unit 401 transmits the unique identifier Y thus read to the verification server device 200 via the input/output unit 408, the terminal device 300 and the network 20 by using a secure means (Step S145). When failing to read the unique identifier Y, the control unit 401 transmits a message indicating that there is no unique identifier, to the verification server device 200 via the input/output unit 408, the terminal device 300 and the network 20 by using a secure means (Step S145).

The control unit 201 receives the unique identifier Y or the message indicating that there is no unique identifier, from the memory card 400 via the terminal device 300, the network 20 and the communication unit 202 by using a secure means. When the control unit 201 does not receive the unique identifier Y or the message indicating that there is no unique identifier from the memory card 400 until even after a predetermined period has elapsed since transmitting the request for the unique identifier to the memory card 400, the control unit 201 generates a message indicating that there is no unique identifier (Step S145).

Subsequently, the input unit 310 of the terminal device 300 receives, from the user of the terminal device 300, an instruction to acquire the login necessity information (Step S146). Subsequently, the account acquisition unit 908 transmits the login necessity information to the verification server device 200 via the communication unit 302 and the network 20 (Step S147).

Subsequently, the account acquisition unit 908 determines whether the received login necessity information indicates that the login is necessary (Step S148).

When the login necessity information indicates that the login is necessary (Step S148: Necessary), the input unit 310 receives the user identifier and the password from the user of the terminal device 300 (Step S149). Subsequently, the account acquisition unit 908 transmits the received user identifier and password to the verification server device 200 via the communication unit 302 and the network 20 by using a secure means (Step S150).

The account verification unit 215 receives login necessity information from the terminal device 300 via the network 20 and the communication unit 202 (Step S150).

The account verification unit 215 determines whether the received login necessity information indicates that the login is necessary (Step S156).

When the login necessity information indicates that the login is unnecessary (Step S156: Unnecessary), the control moves to Step S162.

When the login necessity information indicates that the login is necessary (Step S156: Necessary), the account verification unit 215 receives the user identifier and the password from the terminal device 300 via the network 20 and the communication unit 202 by using a secure means (Step S150). Subsequently, the account verification unit 215 determines whether the pair of the user identifier and the password is contained in the account management table 261 (Step S151). When the received user identifier and password are not stored in the account management table 261, the account verification unit 215 determines that the login has failed (i.e. unsuccessful login). When the received user identifier and password are stored in the account management table 261, the account verification unit 215 determines that the login has been successful (i.e. successful login).

In the case of the unsuccessful login (Step S152: unsuccessful), the account verification unit 215 generates a message showing the unsuccessful login (Step S153). Subsequently, the account verification unit 215 transmits the message to the terminal device 300 via the communication unit 202 and the network 20 (Step S154). Accordingly, the verification server device 200 terminates the processing.

The communication unit 302 of the terminal device 300 receives the message from the verification server device 200 via the network 20 (Step S154). Subsequently, the display unit 309 displays the message (Step S155). Accordingly, the terminal device 300 terminates the processing.

In the case of the successful login (Step S152: Successful), the control unit 101 stores the user identifier and the password (Step S161).

Subsequently, the associated data generation unit 208 determines whether the unique identifier has been received from the memory card 400 (Step S162). When the unique identifier has been received (Step S162: Present), the associated data generation unit 208 generates the random number R (Step S163), and calculates Variable K=Unique Identifier Y XOR Random Number R (Step S164). Subsequently, the associated data generation unit 208 generates the associated data containing the variable K thus calculated (Step S165). Subsequently, the signature generation unit 214 applies the digital signature Sign to the associated data to generate the signature data, and adds the signature data thus generated to the associated data (Step S166). Subsequently, the associated data generation unit 208 transmits the associated data and the random number R to the terminal device 300 via the communication unit 202 and the network 20 by using a secure means (Step S167).

When the unique identifier has not been received (Step S162: Absent), none of the generation of the random number R, the calculation of the variable K, the generation of the associated data, the generation of the signature data and the transmission of the associated data random number R is performed.

In some cases, the associated data processing unit 901 receives the associated data and the random number R from the verification server device 200 via the network 20 and the communication unit 302 by using a secure means (Step S167).

Subsequently, the associated data processing unit 901 determines whether the associated data and the random number R have been received (Step S168).

When the associated data and the random number R have been received (Step S168: Yes), the associated data processing unit 901 writes the received associated data into the associated data storage unit 307 (Step S169). Subsequently, the associated data processing unit 901 writes the received random number R into the associated data storage unit 307 (Step S170).

When the associated data and the random number R have not been received (Step S168: No), the associated data processing unit 168 does not perform the writing of the associated data and the random number R.

The input unit 310 of the terminal device 300 receives an operational instruction from the user of the terminal device 300 (Step S181). This point in time is hereinafter called "the second time point". When the operational instruction thus received indicates termination of the processing (Step S182: Yes), the terminal device 300 terminates the processing.

When the operational instruction is not an instruction to terminate the processing (Step S182: No), the operational instruction acquisition unit 910 transmits the received operational instruction to the verification server device 200 via the communication unit 302 and the network 20 (Step S183).

The appliance control unit 213 of the verification server device 200 receives the operational instruction from the terminal device 300 via the network 20 and the communication unit 202 (Step S183). Subsequently, the authenticity evaluation unit 210 determines whether the unique identifier has been received (Step S200).

When the unique identifier has been received (Step S200: Present), the associated data generation unit 208 overwrites the control program stored in the program storage unit 207 with the associated data (Step S201). Subsequently, the authenticity evaluation unit 210 applies the hash operation Hash to the control program, and thereby calculates the hash value H (Step S202). Subsequently, the authenticity evaluation unit 210 calculates Evaluation Value S=Unique Identifier Y XOR Oneway(Hash Value H, Random Number R) (Step S203).

After transmitting the operational instruction at Step S183, the mutual authentication unit 303 of the terminal device 300 and the mutual authentication unit 403 of the memory card 400 perform mutual authentication and key sharing (Step S184).

Subsequently, the unique identifier acquisition processing unit 902 of the terminal device 300 outputs a request for the unique identifier to the memory card 400 via the input/output unit 308 (Step S185). Subsequently, the control unit 401 of the memory card 400 receives the request for the unique identifier from the terminal device 300 via the input/output unit 408 (Step S185).

After outputting the request for the unique identifier at Step S185, the unique identifier acquisition processing unit 902 sets "0" to the unique identifier Y' (Step S186).

The control unit 401 of the memory card 400 attempts to read the unique identifier from the unique identifier storage unit 407. Here, it is assumed that the unique identifier Y' is to be read. The control unit 401 outputs the unique identifier Y' thus read to the terminal device 300 by using a secure means. When failing to read the unique identifier, the control unit 401 outputs a message indicating that there is no unique identifier, to the terminal device 300 by using a secure means (Step S188).

Subsequently, the unique identifier acquisition processing unit 902 determines whether the unique identifier Y' has been received from the memory card 400 (Step S189). When receiving the unique identifier Y' (Step S189: Present), the unique identifier acquisition processing unit 902 calculates Hash Value H'=Hash (Control Program stored in Program Storage Unit 305) (Step S190). Subsequently, the unique identifier acquisition processing unit 902 calculates S'=Y' XOR Oneway(H', R) (Step S191). Subsequently, the unique identifier acquisition processing unit 902 transmits the evaluation value S' to the verification server device 200 via the communication unit 302 and the network 20 (Step S192).

The authenticity evaluation unit 210 receives the evaluation value S' from the terminal device 300 via the network 20 and the communication unit 202 (Step S192).

Subsequently, the authenticity evaluation unit 210 determines whether the evaluation value S thus calculated matches the evaluation value S' thus received (Step S204). When the evaluation value S does not match the evaluation value S' (Step S204: Mismatch), the authenticity evaluation unit 210 outputs prohibition information, which prohibits the operation of the appliance, to the appliance control unit 213, and generates a message indicating that the evaluation value S does not match the evaluation value S' (Step S205). Subsequently, the authenticity evaluation unit 210 transmits the message thus generated to the terminal device 300 via the communication unit 202 and the network 20 (Step S206).

The control unit 301 of the terminal device 300 determines whether the message indicating that the evaluation value S does not match the evaluation value S' from the verification server device 200 via the network 20 and the communication unit 302 (Step S206). Subsequently, the display unit 309 displays the received message (Step S207). Accordingly, the terminal device 300 terminates the processing.

When the evaluation value S matches the evaluation value S' (Step S204: Match), the authenticity evaluation unit 210 outputs permission information, which permits the operation of the appliance, to the appliance control unit 213, and thus the remote control and so on of the appliance is performed (Step S208). Accordingly, the processing is terminated.

When the unique identifier has not been received (Step S200: Absent), the authenticity evaluation unit 210 does not perform the overwriting of the associated data, the calculation of the hash value H, the calculation of the evaluation value S, or the comparison between the evaluation value S and the evaluation value S'.

At Step S208, the user may terminate the control program after the remote control and so on of the appliance completes. Alternatively, at Step S208, the processing may be repeated from Step S130 after the remote control and so on of the appliance completes.

Alternatively, at Step S208, the processing may be repeated from Step S181 after the remote control and so on of the appliance completes.

(3) Procedures for Remote Control of Appliance and Related Processing

Figure 21:
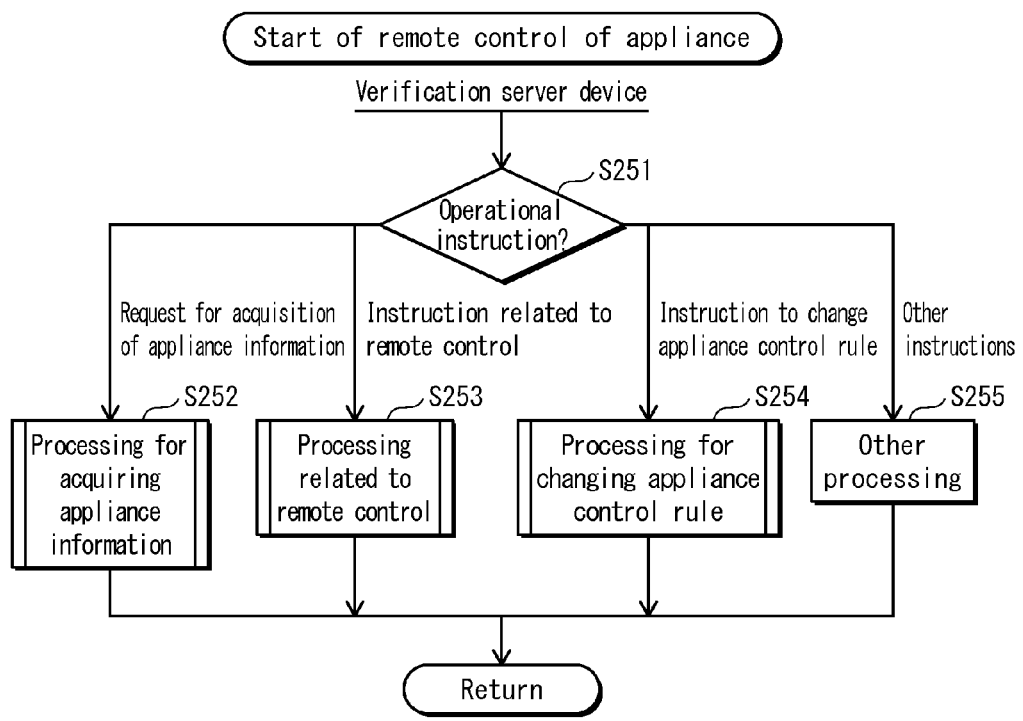
FIG. 21 is a flowchart showing procedures for remote control of appliances and related processing, performed within the remote control system 10.

The following explains the procedures for the remote control of the appliance and the related processing, with reference to the flowchart shown in FIG. 21. Note that the following description of the remote control of the appliance and the related processing shows the details of Step S208 shown in FIG. 20.

The appliance control unit 213 determines whether the operational instruction received from the terminal device 300 via the network 20 and the communication unit 202 is a request for acquisition of information related to the appliance 500, an instruction related to the remote control of the appliance 500, an instruction to change the appliance control rule, or other instructions (Step S251).

When the operational instruction is the request for acquisition of information related to the appliance 500 (Step S251: Request for acquisition of appliance information), the appliance control unit 213 performs processing for acquiring the information related to the appliance 500 (Step S252).

When the operational instruction is the instruction related to the remote control of the appliance 500 (Step S251: Instruction related to remote control), the appliance control unit 213 performs processing related to the remote control of the appliance 500 (Step S253).

When the operational instruction is the instruction to change the appliance control rule (Step S251: Instruction to change the appliance control rule), the appliance control unit 213 performs the processing for changing the appliance control rule (Step S254).

When the operational instruction is another instruction (Step S251: Another instruction), the appliance control unit 213 performs other processing (Step S255).

Accordingly, the procedures for the remote control of the appliance and the related processing are terminated.

(4) Procedures for Acquisition of Information of Appliance 500

Figure 22:
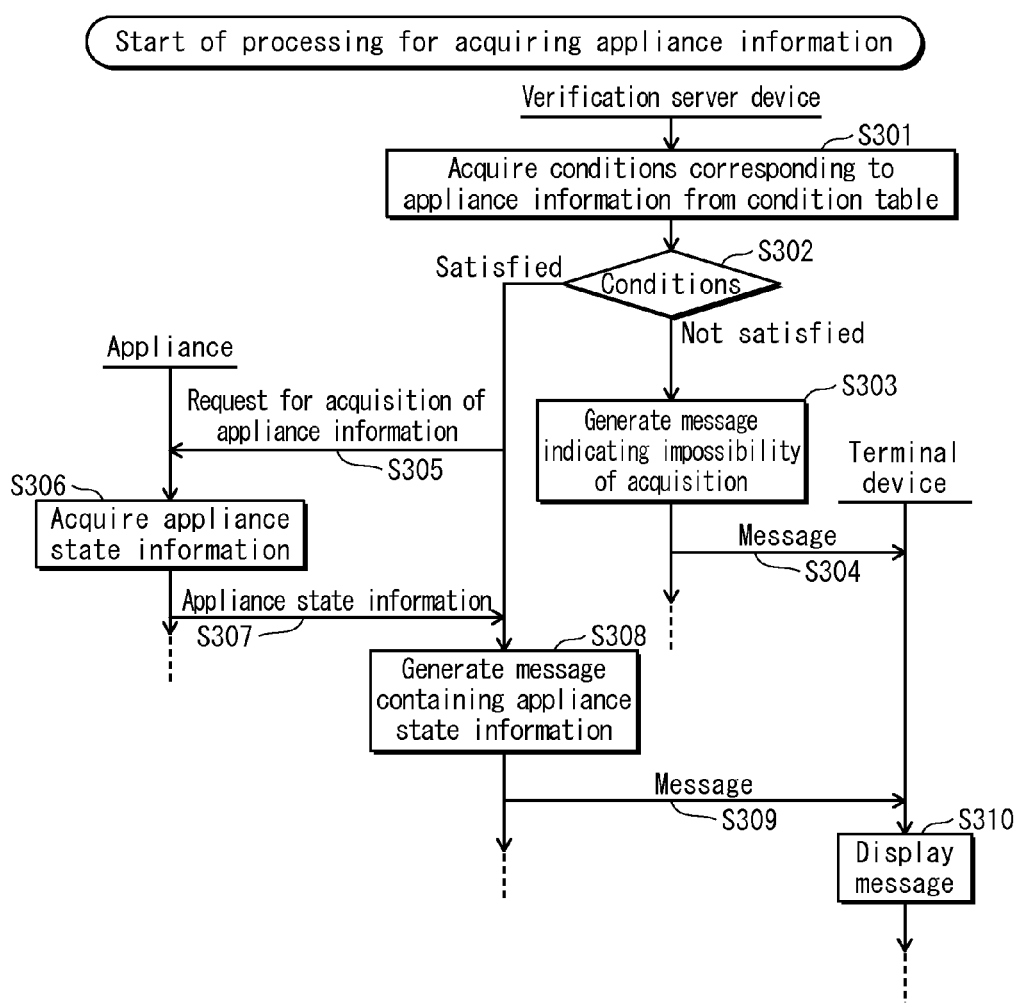
FIG. 22 is a sequence diagram showing procedures for appliance information acquisition performed within the remote control system 10.

The following explains the procedures for acquisition of the information of the appliance 500, with reference to the flowchart shown in FIG. 22. Note that the following description of the procedures for acquisition of the information of the appliance 500 shows the details of Step S252 shown in FIG. 21.

The appliance control unit 213 extracts the appliance information from the request for acquisition of the information of the appliance 500, and reads the conditions corresponding to the extracted appliance information from the condition table 271 (Step S301).

Subsequently, the appliance control unit 213 determines whether the current state of the verification server device 200 satisfies the conditions read from the condition table 271 (Step S302).

When the current state of the verification server device 200 does not satisfy the read conditions (Step S302: Not satisfied), the appliance control unit 213 generates a message indicating that it is impossible to acquire the appliance state information indicating the state of the appliance (Step S303). Subsequently, the appliance control unit 213 transmits the message thus generated to the terminal device 300 via the communication unit 202 and the network 20 (Step S304).

The appliance operation presentation unit 907 of the terminal device 300 receives the message indicating that it is impossible to acquire the appliance state information, from the verification server device 200 via the network 20 and the communication unit 302 (Step S304). Subsequently, the appliance operation presentation unit 907 outputs the received message to the display unit 309. The display unit 309 receives the message, and displays the received message (Step S310). Accordingly, the processing for acquisition of the appliance state information is terminated.

When the current state of the verification server device 200 satisfies the read conditions (Step S302: Satisfied), the appliance control unit 213 outputs the request for acquisition of the appliance state information to the appliance 500 via the communication unit 202 and the network 20 (Step S305).

The mechanism control unit 501 of the appliance 500 receives the request for acquisition of the appliance state information from the verification server device 200 via the network 20, the communication unit 502 and the instruction receiving unit 506 (Step S305). Subsequently, the mechanism control unit 501 extracts, from the request for acquisition of the appliance state information, appliance information related to the target appliance, and acquires the appliance state information corresponding to the extracted appliance information from the mechanism 508 (Step S306). Subsequently, the mechanism control unit 501 transmits the acquired appliance state information to the verification server device 200 via the information notification unit 507, the communication unit 502 and the network 20 (Step S307).

The appliance control unit 213 of the verification server device 200 receives the appliance state information from the appliance 500 via the network 20 and the communication unit 202 (Step S307). Subsequently, the appliance control unit 213 generates a message including the appliance state information thus received (Step S308). Subsequently, the appliance control unit 213 transmits the message thus generated to the terminal device 300 via the communication unit 202 and the network 20 (Step S309).

The appliance operation presentation unit 907 of the terminal device 300 receives the message including the appliance state information from the verification server device 200 via the network 20 and the communication unit 302 (Step S309). Subsequently, the appliance operation presentation unit 907 outputs the received message to the display unit 309. The display unit 309 receives the message, and displays the received message (Step S310). Accordingly, the processing for acquisition of the appliance state information is terminated.

(5) Procedures for Processing related to Remote Control of Appliance 500

Figure 23:
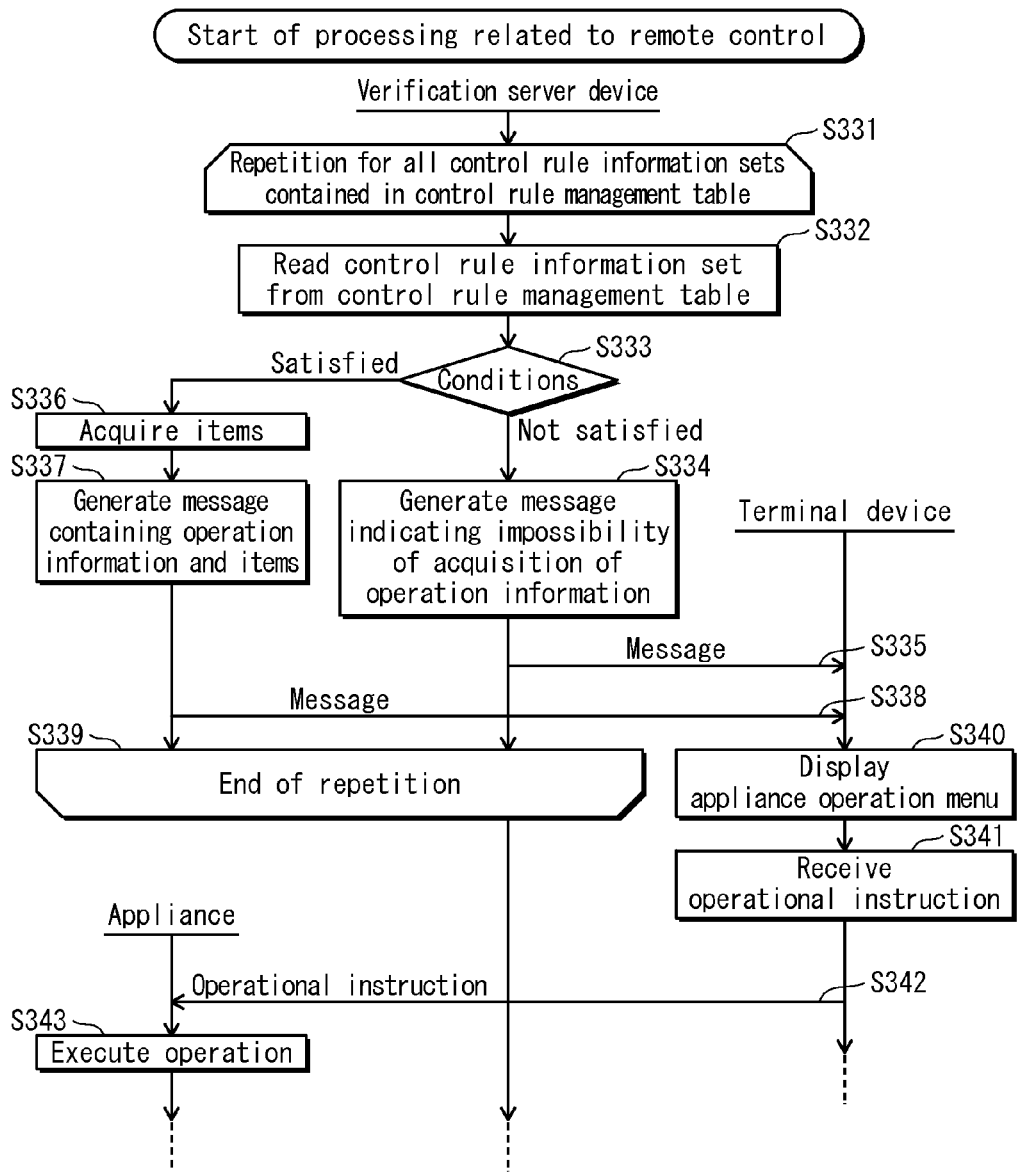
FIG. 23 is a sequence diagram showing procedures for remote control-related processing performed within the remote control system 10.

The following explains the procedures for the processing related to the remote control of the appliance, with reference to the flowchart shown in FIG. 23. Note that the following description of the procedures for the processing related to the remote control of the appliance 500 shows the details of Step S253 shown in FIG. 21.

The appliance control unit 213 repeats Steps S332 through S338 for all the control rule information sets contained in the control rule management table 281 (Steps S331 through S339).

The appliance control unit 213 reads one control rule information set from the control rule management table 281 (Step S332).

Subsequently, the appliance control unit 213 determines whether the current state of the verification server device 200 satisfies the conditions contained in the control rule information set thus read (Step S333).

When the current state of the verification server device 200 does not satisfy the read conditions (Step S333: Not satisfied), the appliance control unit 213 extracts the operation information from the read control rule information set, and generates a message indicating that it is impossible to acquire the operation information thus extracted (Step S334). Subsequently, the appliance control unit 213 transmits the message thus generated to the terminal device 300 via the communication unit 202 and the network 20 (Step S335).

When the current state of the verification server device 200 satisfies the read conditions (Step S333: Satisfied), the appliance control unit 213 extracts the operation information and the items from the read control rule information set (Step S336), and generates a message including the extracted operation information and items (Step S337). Subsequently, the appliance control unit 213 outputs the message thus generated to the appliance 500 via the communication unit 202 and the network 20 (Step S338).

The appliance operation presentation unit 907 of the terminal device 300 receives the message from the verification server device 200 via the network 20 and the communication unit 302 (Steps S335, S338).

Subsequently, using the received message, the appliance operation presentation unit 907 generates an appliance operation menu, and the display unit 309 displays the appliance operation menu (Step S340).

Subsequently, the input unit 310 of the terminal device 300 receives, from the user of the terminal device 300, an operational instruction with respect to the appliance 500 (Step S341). Subsequently, the control unit 301 transmits the operational instruction to the verification server device 200 via the communication unit 302 and the network 20. The appliance control unit 213 of the verification server device 200 transmits the operational instruction to the appliance 500 via the communication unit 202 and the network 20 (Step S342).

The mechanism control unit 501 of the appliance 500 receives a remote control instruction included in the operational instruction from the verification server device 200 via the network 20, the communication unit 502 and the instruction receiving unit 506 (Step S342). Subsequently, the mechanism control unit 501 controls the mechanism 508 according to the remote control instruction included in the operational instruction thus received. The mechanism 508 operates according to the remote control instruction included in the operational instruction (Step S343).

Then the operations related to the remote control of the appliance 500 are terminated.

(6) Procedures for Appliance Control Rule Change

Figure 24:
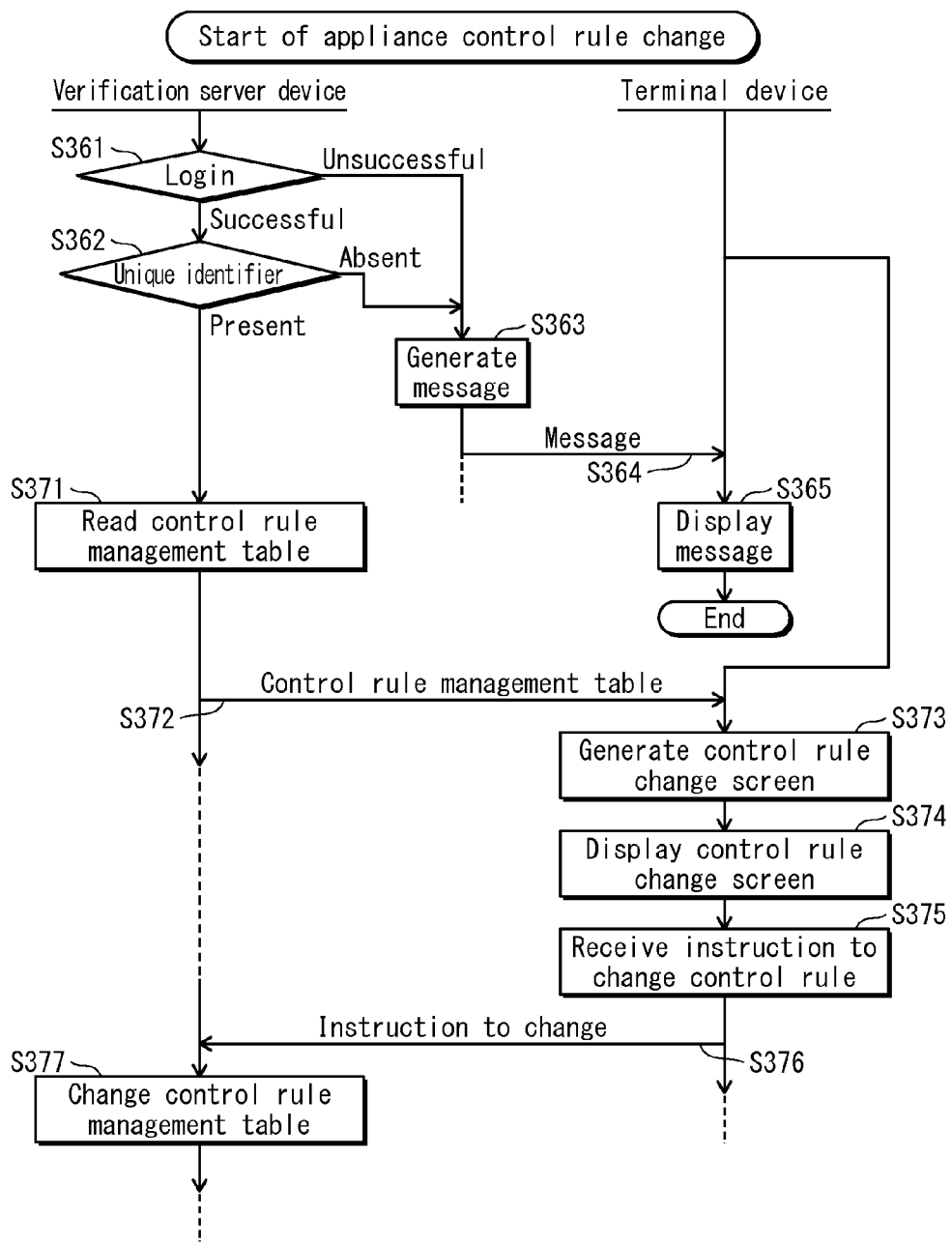
FIG. 24 is a sequence diagram showing procedures for appliance control rule change performed within the remote control system 10.

The following explains the procedures for changing the appliance control rule, with reference to the flowchart shown in FIG. 24. Note that the following description of the procedures for changing the appliance control rule shows the details of Step S254 shown in FIG. 21.

The appliance control unit 213 determines whether the user of the terminal device 300 is successfully logging in (Step S361).

When the user is not successfully logging in (Step S361: Unsuccessful), the appliance control unit 213 generates a message indicating that the user is not successfully logging in (Step S363). Subsequently, the appliance control unit 213 transmits the message thus generated to the terminal device 300 via the communication unit 202 and the network 20 (Step S364). The control unit 301 outputs to the display unit 309 a message indicating that the user is not successfully logging in. The display unit 309 displays the message (Step S365). Then, the processing of changing the appliance control rule is terminated.

When the user is successfully logging in (Step S361: Successful), the appliance control unit 213 determines whether the unique identifier has been acquired (Step S362). When the unique identifier has not been acquired (Step S362: Absent), the appliance control unit 213 generates a message indicating that the unique identifier has not been acquired (Step S363). Subsequently, the appliance control unit 213 transmits the message thus generated to the terminal device 300 via the communication unit 202 and the network 20 (Step S364). The control unit 301 outputs to the display unit 309 the message indicating that the unique identifier has not been acquired. The display unit 309 displays the message (Step S365). Then, the processing of changing the appliance control rule is terminated.

When the unique identifier has been acquired (Step S362: Present), the appliance control unit 213 reads the control rule management table 281 from the appliance information storage unit 212 (Step S371). Subsequently, the appliance control unit 213 transmits the control rule management table thus read to the terminal device 300 via the communication unit 202 and the network 20 (Step S372).

The appliance control rule presentation unit 906 of the terminal device 300 receives the control rule management table from the verification server device 200 via the network 20 and the communication unit 302 (Step S372).

Subsequently, the appliance control rule presentation unit 906 generates the control rule change screen 361 by using the control rule management table thus received (Step S373). The display unit 309 displays the control rule change screen 361 (Step S374).

Subsequently, the input unit 310 receives an instruction to change the control rule. The appliance control rule acquisition unit 909 receives the instruction to change the control rule (Step S375). Subsequently, the appliance control rule acquisition unit 909 transmits the instruction to change the control rule to the verification server device 200 via the communication unit 302 and the network 20 (Step S376).

The appliance information management unit 217 receives the instruction to change the control rule from the terminal device 300 via the network 20 and the communication unit 202 (Step S376). Subsequently, the appliance information management unit 217 changes the control rule management table 281 stored in the appliance information storage unit 212 according to the received control change instruction (Step S377).

Then, the processing of changing the appliance control rule is terminated.

(7) Procedures for Mutual Authentication and Key Sharing

Figure 25:
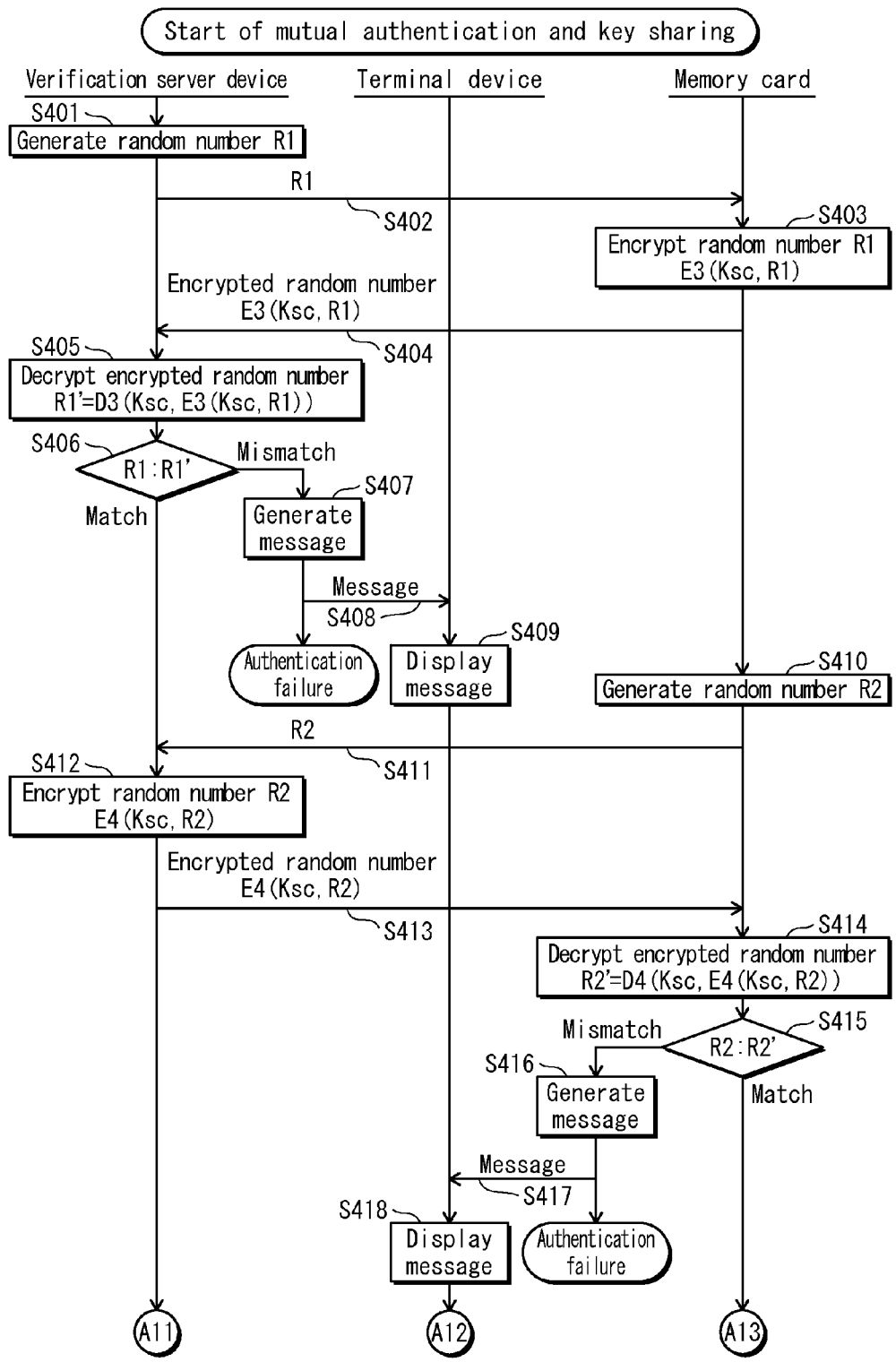
FIG. 25 is a sequence diagram (Part 1) showing procedures for mutual authentication and key sharing between the verification server device 200 and the memory card 400 of the remote control system 10, followed by FIG. 26.
Figure 26:
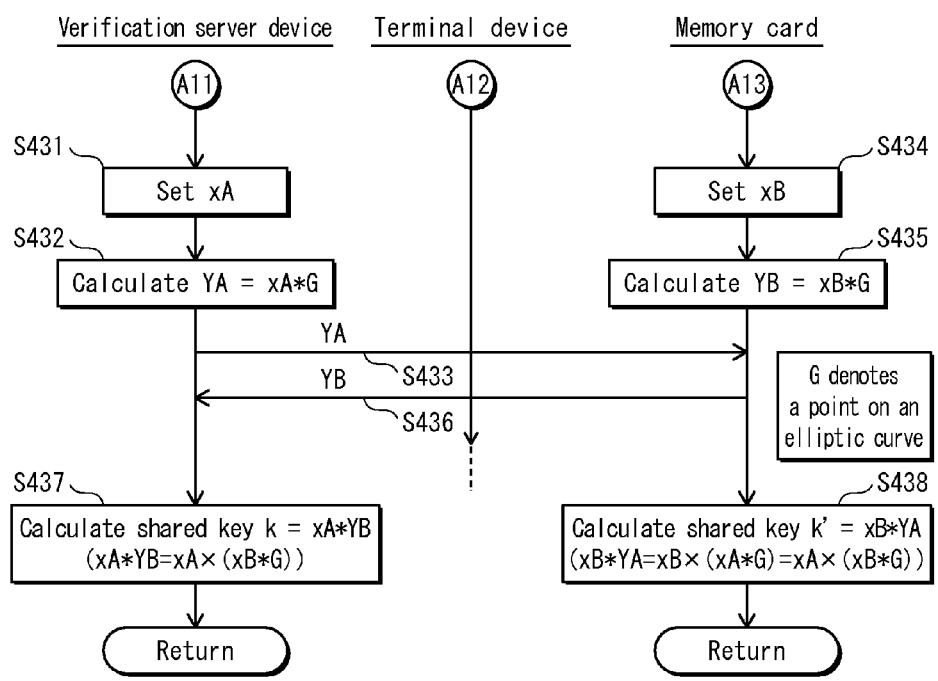
FIG. 26 is a sequence diagram (Part 2) showing procedures for mutual authentication and key sharing between the verification server device 200 and the memory card 400 of the remote control system 10.

The following describes procedures for mutual authentication and key sharing performed between the verification server device 200 and the memory card 400 with reference to the sequence diagram shown in FIG. 25 and FIG. 26.

The random number generator A10 generates a random number R1 (Step S401). Subsequently, the random number generator A10 transmits the generated random number R1 to the memory card 400 via the network 20 and the terminal device 300 (Step S402).

The encryptor B11 receives the random number R1 from the verification server device 200 (Step S402). Subsequently, using the system key Ksc, the encryptor B11 encrypts the random number R1 according to the encryption algorithm E3 to generate an encrypted random number E3(Ksc, R1) (Step S403). Subsequently, the encryptor B11 transmits the encrypted random number E3(Ksc, R1) thus generated to the verification server device 200 via the terminal device 300 and the network 20 (Step S404).

The decryptor A13 receives the encrypted random number E3(Ksc, R1) from the memory card 400 (Step S404). Subsequently, the decryptor A13 decrypts the received encrypted random number E3(Ksc, R1) according to a decryption algorithm D3 by using the system key Ksc, and thereby generates a plaintext R1'=D3(Ksc, E3(Ksc, R1)) (Step S405).

The random number comparer A12 compares the random number R1 with the plaintext R1' (Step S406). When the random number R1 does not match the plaintext R1' (Step S406: Mismatch), the mutual authentication unit 203 determines that the memory card 400 is invalid. The mutual authentication unit 203 generates a message indicating that (Step S407), and transmits the message thus generated to the terminal device 300 (Step S408). The terminal device 300 receives the message (Step S408), and the display unit 309 displays the message (Step S409). Then, the mutual authentication is terminated.

Subsequently, the random number generator B10 generates a random number R2 (Step S410). Subsequently, the random number generator B10 transmits the generated random number R2 to the verification server device 200 (Step S411).

On the other hand, when the random number R1 matches the plaintext R1' (Step S406: Match), the mutual authentication unit 203 determines that the other party is valid. The encryptor A14 receives the random number R2 from the other party (Step S411). Subsequently, using the system key Ksc, the encryptor A14 encrypts the random number R2 according to the encryption algorithm E4 to generate an encrypted random number E4(Ksc, R2) (Step S412), and transmits the encrypted random number E4(Ksc, R2) thus generated to the memory card 400 (Step S413).

The decryptor B13 receives the encrypted random number E4(Ksc, R2) from the verification server device 200 (Step S413). Subsequently, the decryptor B13 decrypts the received encrypted random number E4(Ksc, R2) according to a decryption algorithm D4 by using the system key Ksc, and thereby generates a plaintext R2'=D4(Ksc, E4(Ksc, R2)) (Step S414).

The random number comparer B14 compares the random number R2 with the plaintext R2' (Step S415). When the random number R2 does not match the plaintext R2' (Step S415: Mismatch), the mutual authentication unit 403 generates a message indicating that (Step S416). Subsequently, the mutual authentication unit 403 transmits the message thus generated to the terminal device 300 (Step S417). The terminal device 300 receives the message (Step S417), and the display unit 309 displays the message (Step S418). Then, the mutual authentication is terminated.

On the other hand, when the random number R2 matches the plaintext R2' (Step S415: Match), the mutual authentication unit 403 determines that the other party is valid.

When the authentication is successful (Step S406: Match), the key sharer A15 sets xA as a scalar value (Step S431). Subsequently, the key sharer A15 calculates YA=xA*G, which denotes a point on an elliptic curve (Step S432). G denotes a point on an elliptic curve. a*B denotes multiplication on an elliptic curve. Subsequently, the key sharer A15 transmits the point YA on the elliptic curve to the memory card 400 (Step S433).

When the authentication is successful (Step S415: Match), the key sharer B15 sets xB as a scalar value (Step S434). Subsequently, the key sharer B15 calculates YB=xB*G, which denotes a point on an elliptic curve (Step S435). Subsequently, the key sharer B15 transmits the point YB on the elliptic curve to the verification server device 200 (Step S436).

The key sharer A15 calculates a shared key k=xA*YB as a scalar value (Step S437).

The key sharer B15 calculates a shared key k'=xB*YA as a scalar value (Step S438). Then, the mutual authentication and key sharing is terminated.

Here, shared key $$\begin{aligned} k' &= xA * YB \\ &= xA \times (xB * G) \\ &= xB \times (xA * G) \\ &= xB * YA \\ &= \text{Shared key } k'. \end{aligned}$$

Note that the same operations as described above are applied to the mutual authentication and key sharing between the verification server device 200 and the distribution server device 100, to the mutual authentication and key sharing between the verification server device 200 and the terminal device 300, and to the mutual authentication and key sharing between the distribution server device 100 and the terminal device 300. Therefore, explanations thereof are omitted.

3. Other Modifications

Although the present invention has been described based on the embodiments above, the present invention should not be limited to the embodiments. The following modifications are within the scope of the present invention.

(1) Another aspect of the present invention may be a remote control system 10a.

Figure 27:
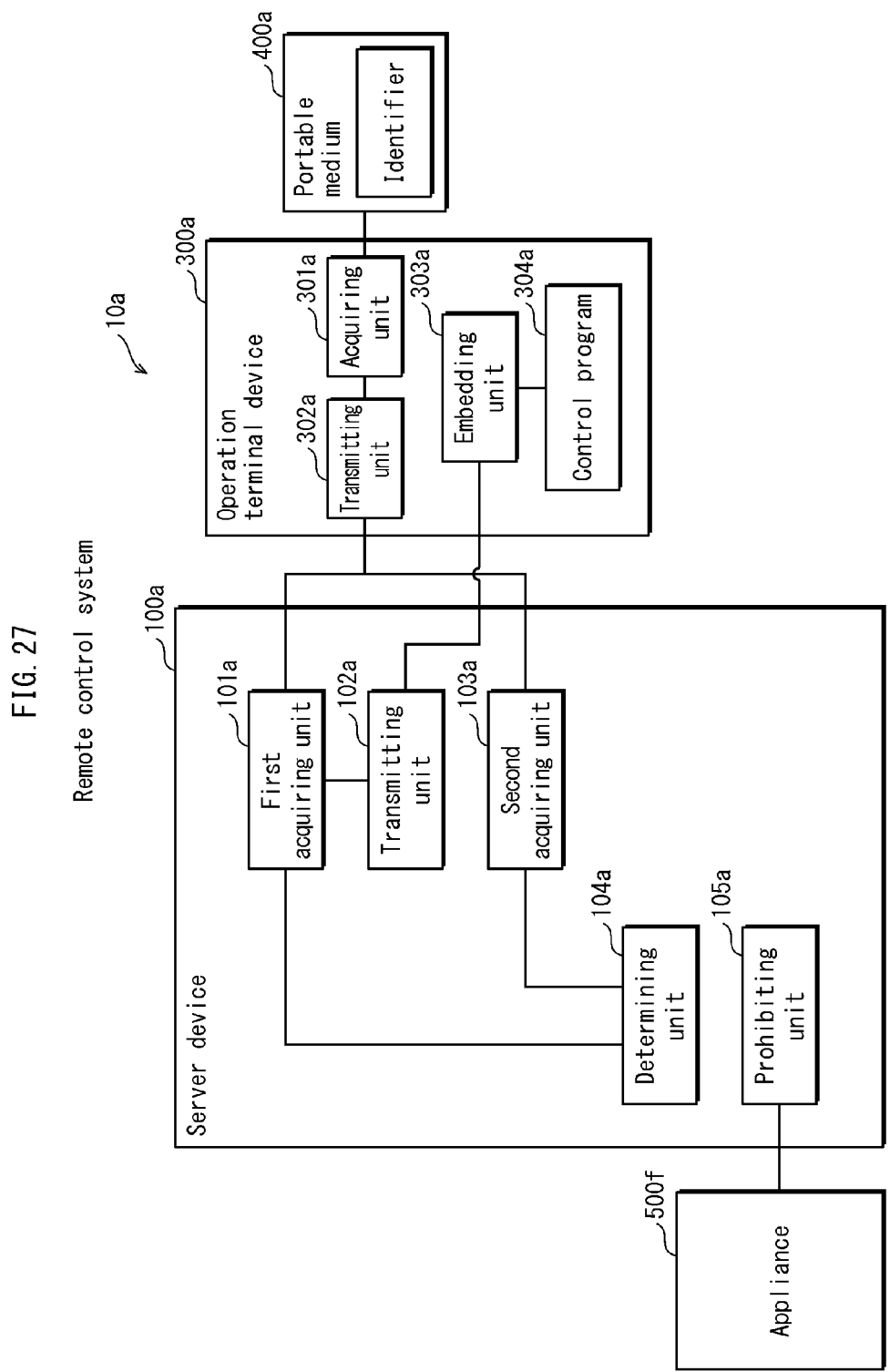
FIG. 27 shows the structure of a remote control system 10a as one aspect of the present invention.

As shown in FIG. 27, the remote control system 10a includes an operation terminal device 300a, a portable medium 400a, a server device 100a and an appliance 500f.

The operation terminal device 300a remotely controls the appliance by executing a remote control command contained in a control program stored therein. The server device 100a relays a remote control instruction between the operation terminal device 300a and the appliance 500f.

As shown in FIG. 27, the server device 100a includes a first acquiring unit 101a, a transmitting unit 102a, a second acquiring unit 103a, a determining unit 104a, and a prohibiting unit 105a.

The first acquiring unit 101a acquires a first identifier at a first time point, the first identifier being unique to a portable medium located close to an operation terminal device serving as a remote controller for the appliance 500f.

The transmitting unit 102a transmits the first identifier to the operation terminal device in order to allow for embedding of the first identifier into the control program stored in the operation terminal device.

The second acquiring unit 103a acquires a second identifier at a second time point later than the first time point, the second identifier being unique to a portable medium located close to the operation terminal device serving as the remote controller for the appliance 500f.

The determining unit 104a determines whether the first identifier embedded in the control program matches the second identifier acquired by the second acquiring unit 103a.

The prohibiting unit 105a prohibits remote control of the appliance 500f when the first identifier does not match the second identifier.

The operation terminal device 300a includes an acquiring unit 301a, a transmitting unit 302a and an embedding unit 303a.

The acquisition unit 301a acquires an identifier from the portable medium 400a located close to the operation terminal device 300a, the identifier being unique to the portable medium 400a.

The transmitting unit 302a transmits the identifier thus acquired to the server device 100a.

The embedding unit 303a receives the first identifier from the server device 100a and embeds the first identifier thus received into the control program.

Here, the second acquiring unit 103a may be omitted from the server device 100a. If this is the case, the first acquiring unit 101a acquires the second identifier at a second time point later than the first time point, the second identifier being unique to a portable medium located close to the operation terminal device serving as the remote controller for the appliance 500f.

(2) Another aspect of the present invention may be a remote control system 10b. The remote control system 10b includes a server device, an operation terminal device, and an appliance. The operation terminal device remotely controls the appliance by executing a remote control command contained in a control program stored therein. The server device relays a remote control instruction between the operation terminal device and the appliance. A portable medium is attached to the operation terminal device. The portable medium holds an identifier that is unique to the portable medium. The following describes the remote control system 10b with reference to the sequence diagram shown in FIG. 28.

The acquiring unit of the operation terminal device acquires the first identifier, which is unique, from the portable medium (Step S501).

The embedding unit of the operation terminal device embeds the first identifier thus acquired into the control program stored in the operation terminal device (Step S502).

The transmitting unit of the operation terminal device transmits the control program, into which the first identifier has been embedded, to the server device (Step S503).

The extracting unit of the server device extracts the first identifier from the control program (Step S504).

The acquiring unit of the operation terminal device also acquires the second identifier, which is unique, from the portable medium (Step S505).

The transmitting unit of the operation terminal device transmits the second identifier thus acquired to the server device (Step S506).

The determining unit of the server device compares the first identifier thus extracted with the second identifier thus transmitted (Step S507). When the first identifier does not match the second identifier (Step S507: Mismatch), the control unit of the server device prohibits remote control of the appliance (Step S508).

When the first identifier matches the second identifier (Step S507: Match), the control unit of the server device transmits the operational instruction received from the operation terminal device to the appliance (Step S509).

The appliance receives the operational instruction from the server device (Step S509), and operates according to the operational instruction thus received (Step S510).

(3) In the remote control system 10b, the following modifications may be adopted.

Figure 28:
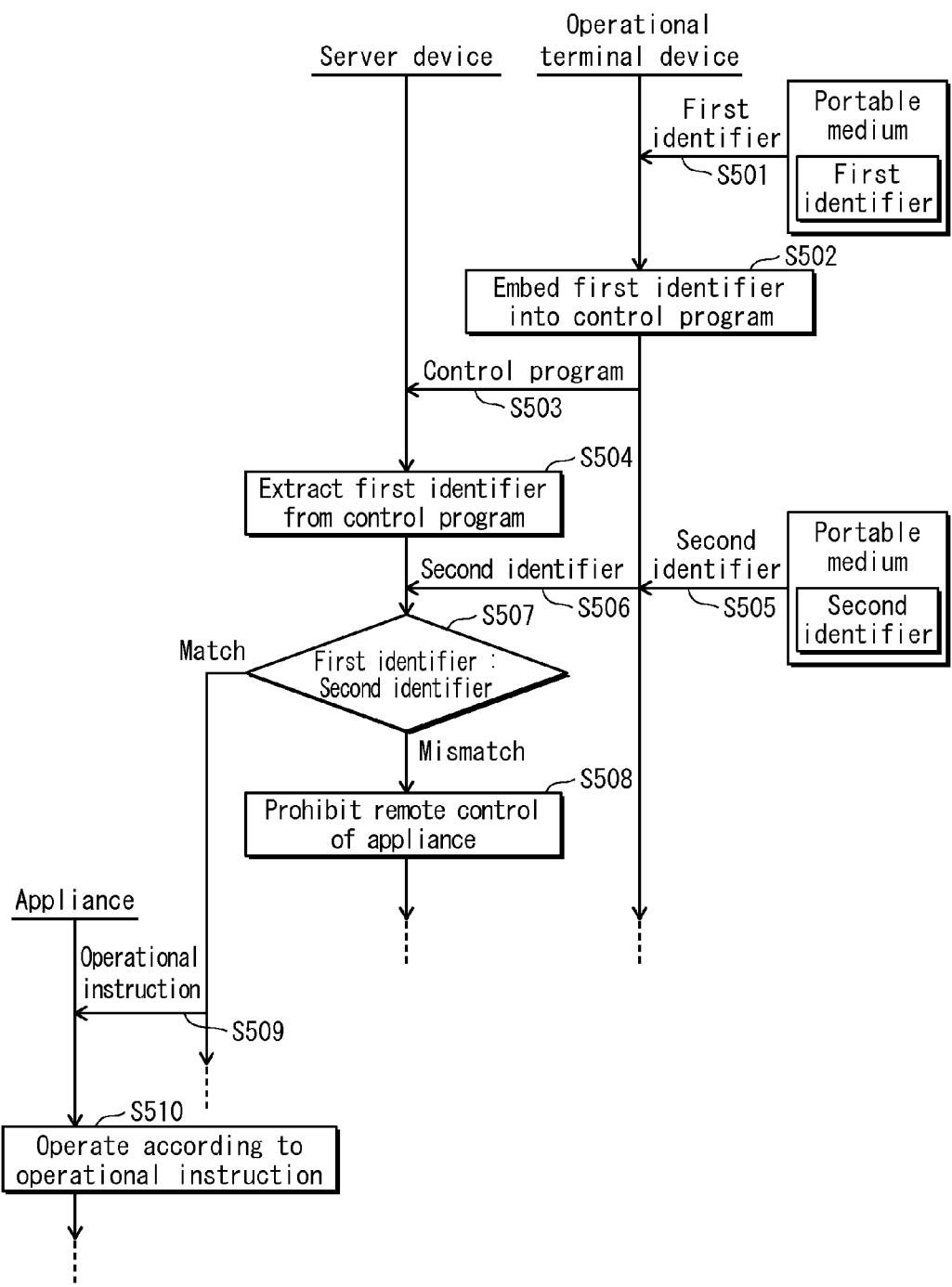
FIG. 28 is a sequence diagram showing operational procedures performed within a remote control system 10b as one aspect of the present invention.
Figure 29:
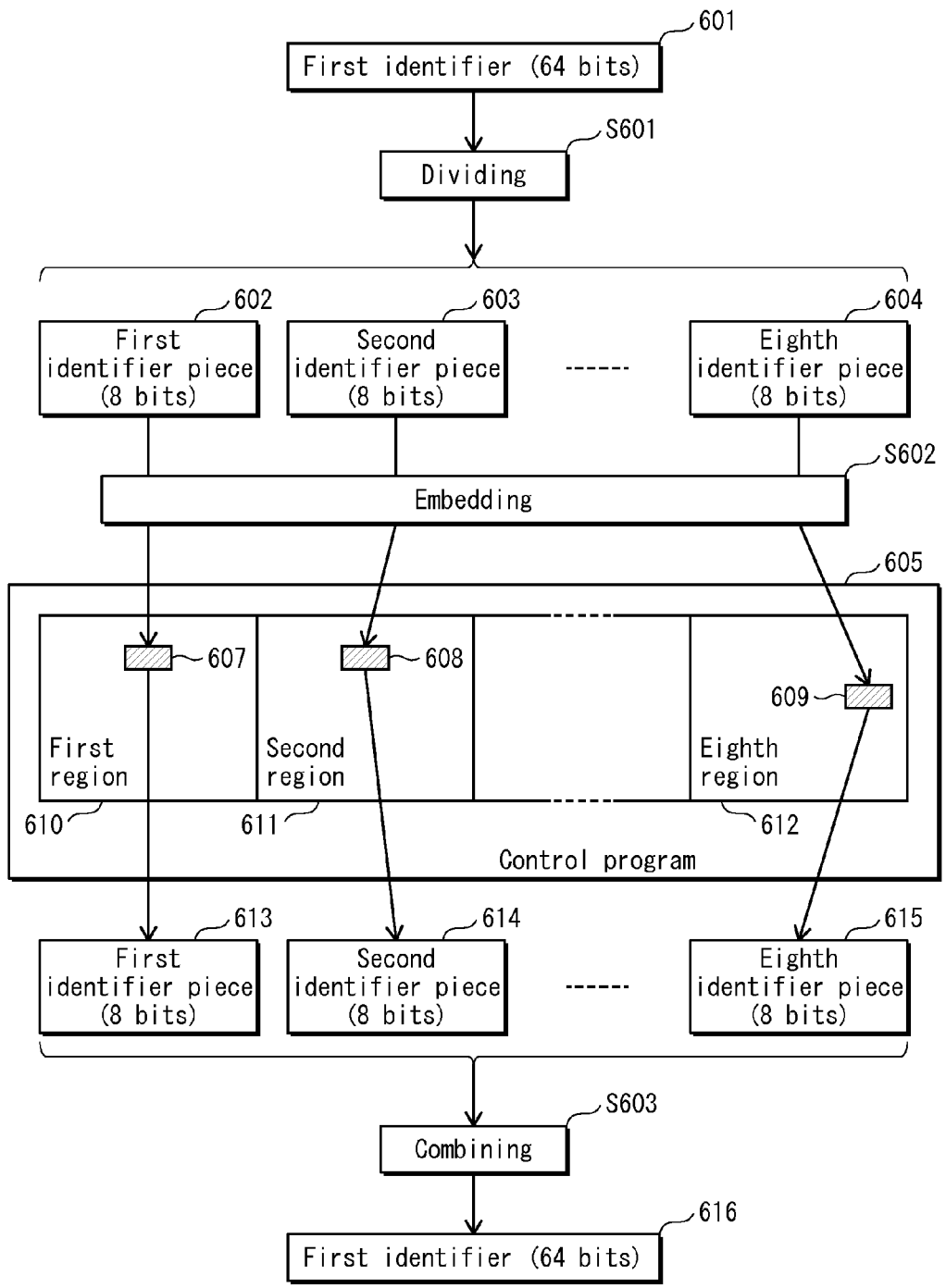
FIG. 29 shows embedding of a plurality of identifier pieces into a control program 605 and integration of the identifier pieces into one piece, performed within the remote control system 10b. In this drawing, the plurality of identifier pieces are dispersed throughout the control program 605.

In Step S502 shown in FIG. 28, the embedding unit of the terminal device divides, for example, the 64-bit first identifier into eight identifier pieces, namely a first identifier piece 602, a second identifier piece 603, . . . , and an eighth identifier piece 604, as shown in FIG. 29 (Step S601). Each of the first identifier piece 602, the second identifier piece 603, . . . and the eighth identifier piece 604 has a length of 8 bits, for example.

The control program 605 is divided into eight regions, namely a first region 610, a second region 611, . . . , and an eighth region 612. The embedding unit embeds the first identifier piece 602 into a region 607 of the first region 610. The embedding unit embeds the second identifier piece 603 into a region 608 of the second region 611. Similarly, the embedding unit embeds the eighth identifier piece 604 into a region 609 of the eighth region 612. The embedding unit thus disperses the identifier pieces into the regions of the control program 605 (Step S602).

In Step S504 shown in FIG. 28, the extracting unit of the server device extracts the first identifier piece 613 from the region 607 of the first region 610 in the control program 605 as shown in FIG. 29. The extracting unit extracts the second identifier piece 614 from the region 608 of the second region 611 in the control program 605. Similarly, the extracting unit extracts the eighth identifier piece 615 from the region 609 of the eighth region 612 in the control program 605. The extracting unit of the server device thus extracts the identifier pieces from the regions of the control program 605. Each identifier piece has a length of 8 bits. Subsequently, the eight identifiers thus extracted, namely the first identifier piece 613, the second identifier piece 614, . . . , and the eighth identifier piece 615 are combined in the stated order to generate the first identifier 616 (Step S603). The first identifier 616 has a length of 64 bits.

The embedding method described above may be adopted in Embodiment 1 and Embodiment 2.

(4) In the remote control system 10b, the following modifications may be adopted.

Figure 30:
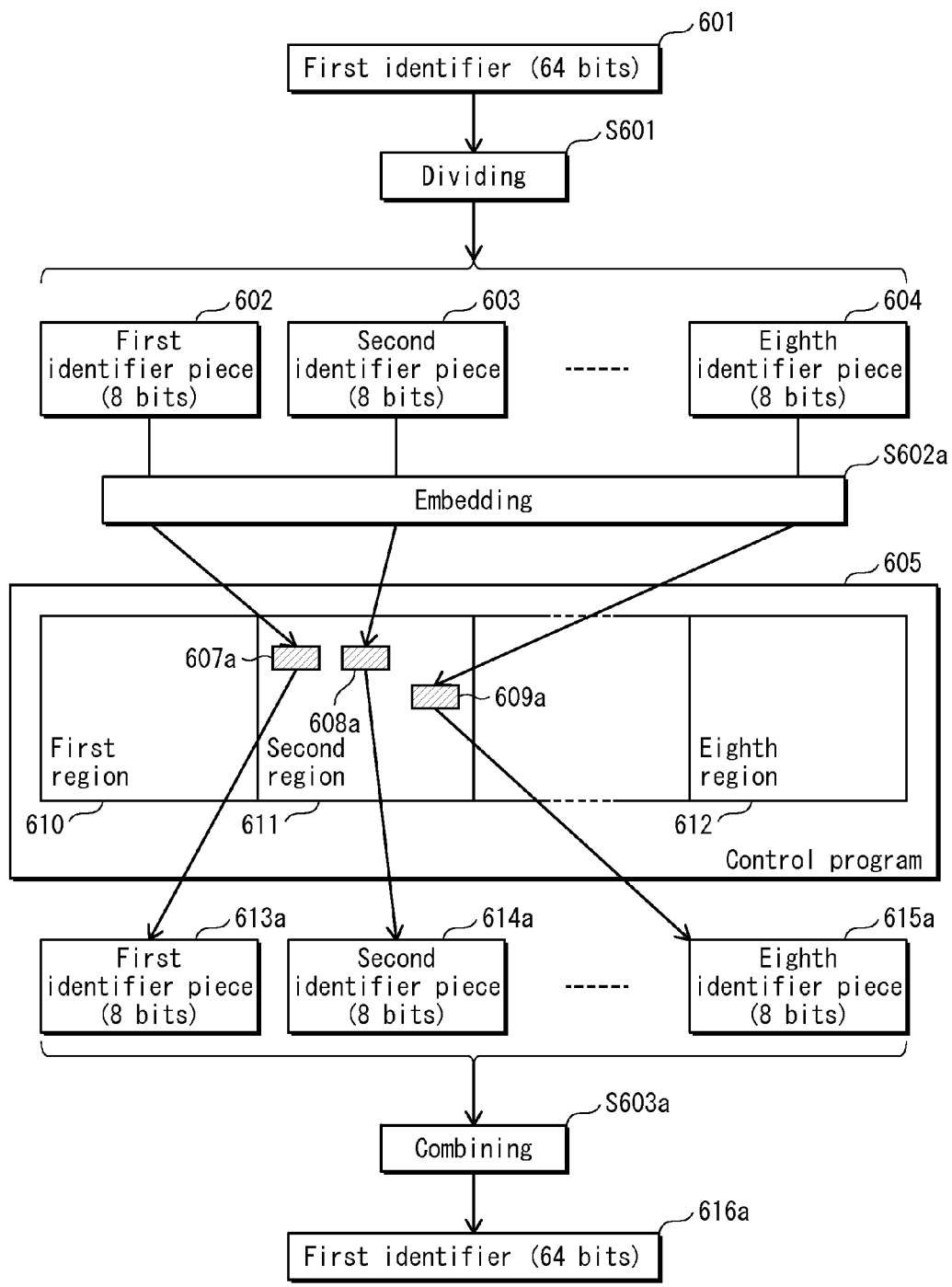
FIG. 30 shows embedding of a plurality of identifier pieces into a control program 605 and integration of the identifier pieces into one piece, performed within the remote control system 10b. In this drawing, the plurality of identifier pieces are embedded in a part of the control program 605.

In Step S502 shown in FIG. 28, the embedding unit of the terminal device divides, for example, the 64-bit first identifier into eight identifier pieces, namely a first identifier piece 602, a second identifier piece 603, . . . , and an eighth identifier piece 604, as shown in FIG. 30 (Step S601). Each of the first identifier piece 602, the second identifier piece 603, . . . and the eighth identifier piece 604 has a length of 8 bits, for example.

The control program 605 is divided into eight regions, namely a first region 610, a second region 611, . . . , and an eight region 612. The embedding unit embeds the first identifier piece 602 into a region 607a of the second region 611. The embedding unit embeds the second identifier piece 603 into a region 608a of the second region 611. Similarly, the embedding unit embeds the eighth identifier piece 604 into a region 609a of the second region 611. The embedding unit thus embeds each identifier piece into the second region of the control program 605 (Step S602a).

In Step S504 shown in FIG. 28, the extracting unit of the server device extracts the first identifier piece 613a from the region 607a of the second region 611 in the control program 605 as shown in FIG. 30. The extracting unit extracts the second identifier piece 614a from the region 608a of the second region 611 in the control program 605. Similarly, the extracting unit extracts the eighth identifier piece 615a from the region 609a of the second region 611 in the control program 605. The extracting unit of the server device thus extracts each identifier piece from the second region 611 of the control program 605. Each identifier piece has a length of 8 bits. Subsequently, the eight identifiers thus extracted, namely the first identifier piece 613a, the second identifier piece 614a, . . . , and the eighth identifier piece 615a are combined in the stated order to generate the first identifier 616a (Step S603a). The first identifier 616 has a length of 64 bits.

The embedding method described above may be adopted in Embodiment 1 and Embodiment 2.

(5) In the remote control system 10b, the following modifications may be adopted.

Figure 31:
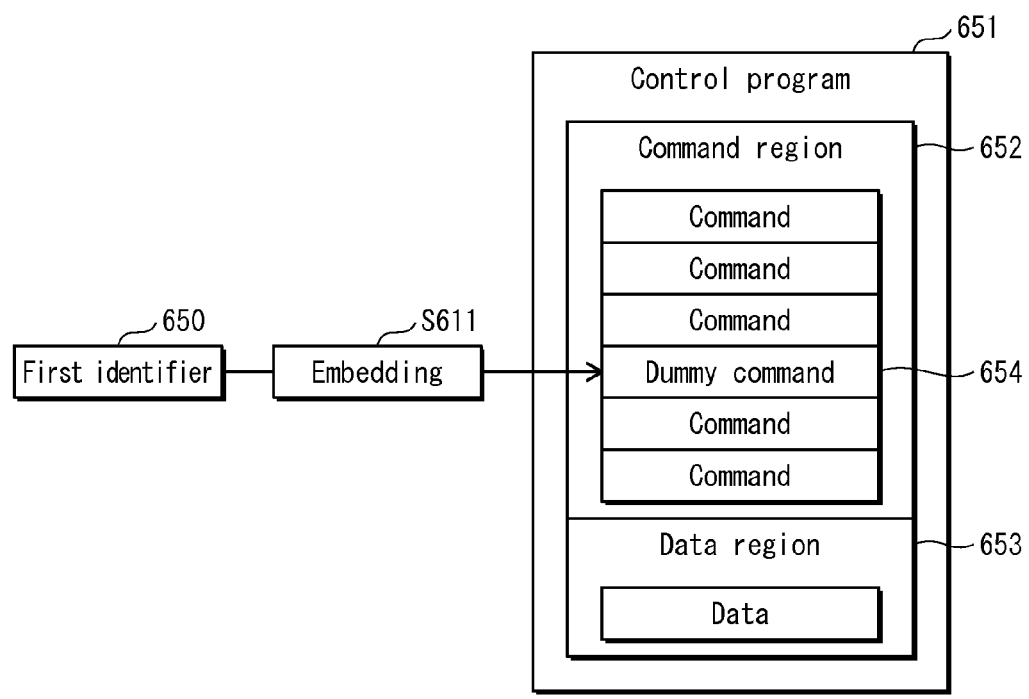
FIG. 31 shows embedding of a first identifier into a dummy instruction 654 within a control program 651, performed within the remote control system 10b.

As shown in FIG. 31, the control program 651 stored in the operation terminal device includes a command region 652 and a data region 653. The command region 652 contains a plurality of commands. The plurality of commands include a dummy command 654. The dummy command 654 is located such that it will not be executed. The data region 653 contains data.

In Step S502 shown in FIG. 28, the embedding unit of the terminal device embeds the first identifier into the dummy command 654 in the command region 652 as shown in FIG. 31 (Step S611).

The embedding method described above may be adopted in Embodiment 1 and Embodiment 2.

In Step S504 shown in FIG. 28, the extracting unit of the server device may extract the first identifier embedded in the dummy command 654 in the command region 652 of the control program 651.

(6) In the remote control system 10b, the following modifications may be adopted.

Figure 32:
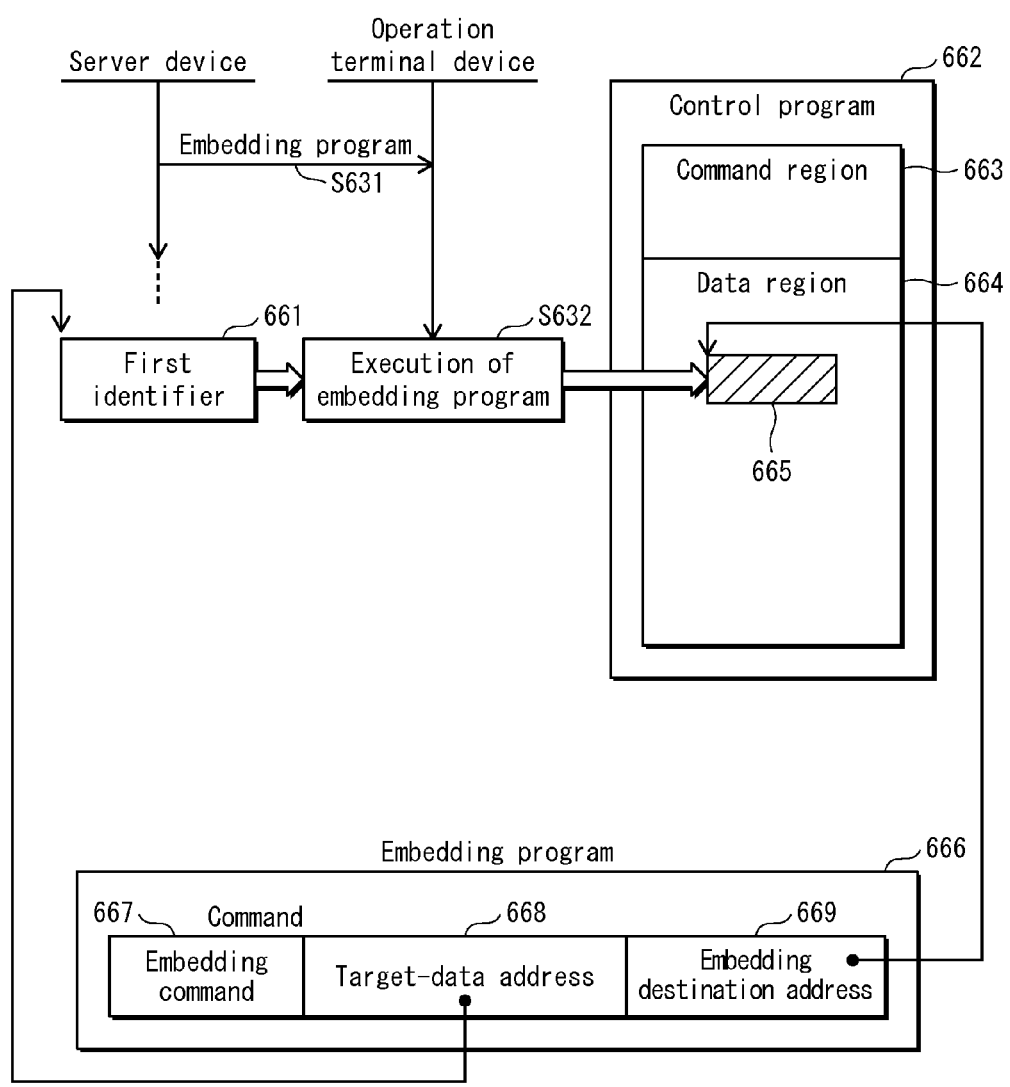
FIG. 32 shows embedding of the first identifier into a control program 662 by execution of an embedding program 666, performed within the remote control system 10b.

As shown in FIG. 32, the transmitting unit of the server device transmits an embedding program 666 to the operation terminal device (Step S631).

As shown in FIG. 32, the embedding program 666 contains an instruction including an embedding command 667, a target-data address 668, and an embedding destination address 669. The embedding command 667 instructs to embed the data stored in the location indicated by the target-data address 668 into the location indicated by the embedding destination address 669.

The receiving unit of the operation terminal device receives the embedding program 666 from the server device (Step S631).

The terminal device stores a control program 662. The control program 662 includes a command region 663 and a data region 664.

The program execution unit of the terminal device executes the embedding program 666 thus received (Step S632). Consequently, the data stored in the location indicated by the target-data address 668, namely the first identifier 661, is embedded into the region 665 in the data region 664 of the control program 662 as indicated by the embedding destination address 669.

The embedding method described above may be adopted in Embodiment 1 and Embodiment 2.

Figure 33:
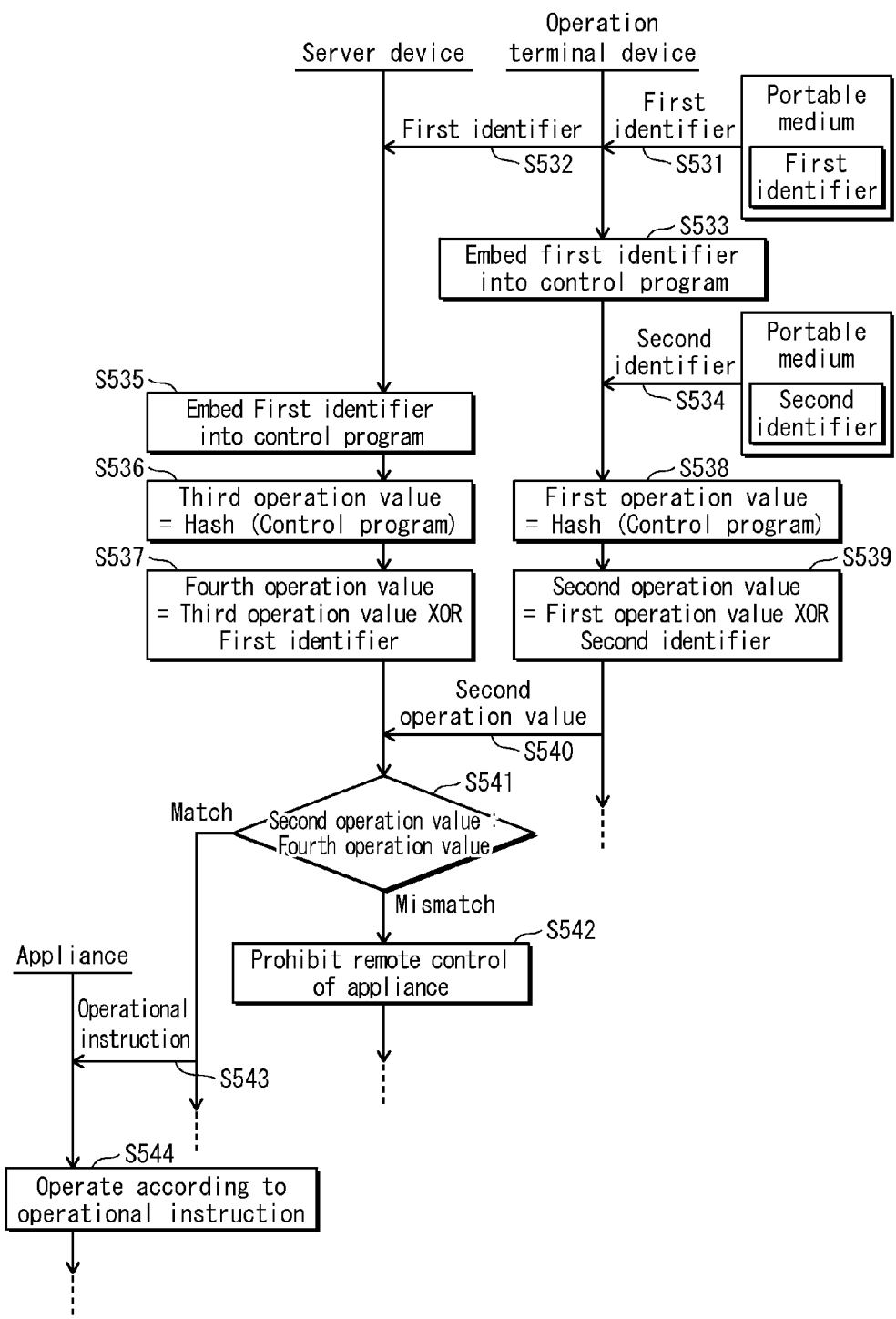
FIG. 33 is a sequence diagram showing operational procedures performed within a remote control system 10c as one aspect of the present invention.

(7) Another aspect of the present invention may be a remote control system 10c. The remote control system 10c includes a server device, an operation terminal device, and an appliance. The operation terminal device remotely controls the appliance by executing a remote control command contained in a control program stored therein. The server device relays a remote control instruction between the operation terminal device and the appliance. A portable medium is attached to the operation terminal device. The portable medium holds an identifier that is unique to the portable medium. The following describes the remote control system 10c with reference to the sequence diagram shown in FIG. 33.

The acquiring unit of the operation terminal device acquires the first identifier, which is unique, from the portable medium (Step S531).

The transmitting unit of the operation terminal device transmits the first identifier to the server device (Step S532).

The embedding unit of the operation terminal device embeds the first identifier thus acquired into the control program stored in the operation terminal device (Step S533).

The acquiring unit of the operation terminal device also acquires the second identifier, which is unique, from the portable medium (Step S534).

The embedding unit of the server device embeds the first identifier thus received into the control program stored in the server device (Step S535).

The third operation unit of the server device calculates the third operation value by applying a hash operation to the control program stored in the server device, into which the first identifier has been embedded (Step S536).

The fourth operation unit of the server device calculates the fourth operation value by applying an exclusive-or operation XOR to the third operation value and the first identifier thus received (Step S537).

The first operation unit of the terminal device calculates the first operation value by applying a hash operation Hash to the control program stored in the terminal device, into which the first identifier has been embedded (Step S538).

The second operation unit of the terminal device calculates the second operation value by applying an exclusive-or operation XOR to the first operation value and the second identifier thus received (Step S539).

The transmitting unit of the terminal device transmits the second operation value to the server device (Step S540).

The determining unit of the server device compares the fourth operation value thus calculated with the second operation value thus transmitted (Step S541). When the fourth operation value does not match the second operation value (Step S541: Mismatch), the control unit of the server device prohibits remote control of the appliance (Step S542).

When the fourth operation value matches the second operation value (Step S541: Match), the control unit of the server device transmits the operational instruction received from the operation terminal device to the appliance (Step S543).

The appliance receives the operational instruction from the server device (Step S543), and operates according to the operational instruction thus received (Step S544).

Figure 34:
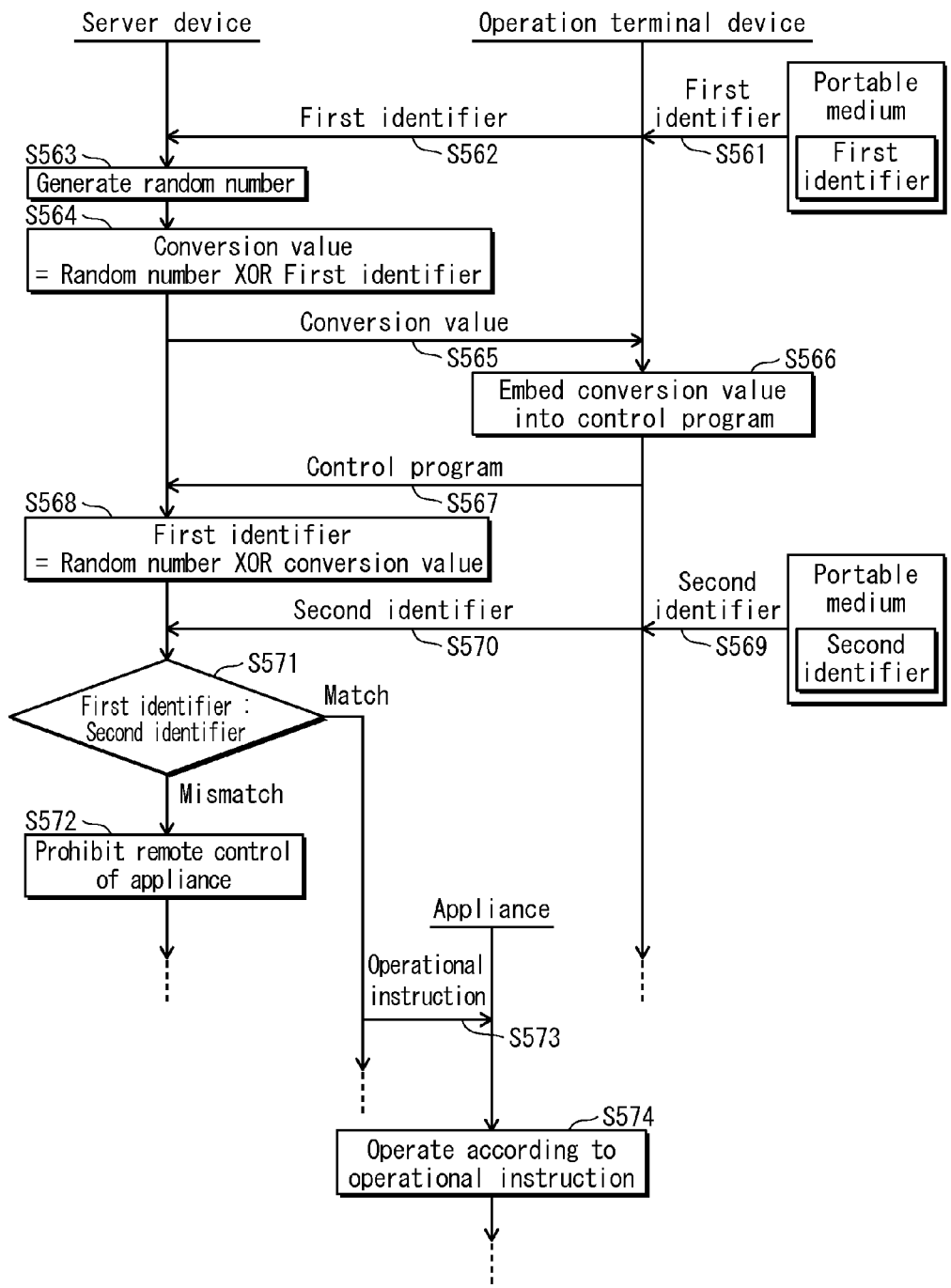
FIG. 34 is a sequence diagram showing operational procedures performed within a remote control system 10d as one aspect of the present invention.

(8) Another aspect of the present invention may be a remote control system 10d. The remote control system 10d includes a server device, an operation terminal device, and an appliance. The operation terminal device remotely controls the appliance by executing a remote control command contained in a control program stored therein. The server device relays a remote control instruction between the operation terminal device and the appliance. A portable medium is attached to the operation terminal device. The portable medium holds an identifier that is unique to the portable medium. The following describes the remote control system 10d with reference to the sequence diagram shown in FIG. 34.

The acquiring unit of the operation terminal device acquires the first identifier, which is unique, from the portable medium (Step S561).

The transmitting unit of the operation terminal device transmits the first identifier to the server device (Step S562).

The random number generator of the server device generates a random number (Step S563).

The conversion value generator of the server device generates a conversion value by applying an exclusive-or operation XOR to the random number thus generated and the first identifier thus received (Step S564).

The transmitting unit of the server device transmits the conversion value thus generated to the operation terminal device (Step S565).

The embedding unit of the operation terminal device embeds the conversion value thus acquired into the control program stored in the operation terminal device (Step S566).

The transmitting unit of the terminal device transmits the control program, in which the conversion value has been embedded, to the server device (Step S567).

The operation unit of the server device extracts the conversion value from the control program thus received, and restores the first identifier by applying an exclusive-or operation XOR to the random number and the conversion value thus extracted (Step S568).

The acquiring unit of the operation terminal device acquires the second identifier, which is unique, from the portable medium (Step S569).

The transmitting unit of the operation terminal device transmits the second identifier to the server device (Step S570).

The determining unit of the server device compares the first identifier thus restored with the second identifier thus transmitted (Step S571). When the first identifier does not match the second identifier (Step S571: Mismatch), the control unit of the server device prohibits remote control of the appliance (Step S572).

When the first identifier matches the second identifier (Step S571: Match), the control unit of the server device transmits the operational instruction received from the operation terminal device to the appliance (Step S573).

The appliance receives the operational instruction from the server device (Step S573), and operates according to the operational instruction thus received (Step S574).

(9) In the embodiments, modifications and aspects described above, one example of the memory card and the portable medium is an SD card. However, the memory card and the portable medium are not necessarily an SD card. A hard disk device, a built-in memory device or the like suffices if it can store the unique identifier.

In addition, the memory card and the portable medium may perform non-contact communications such as short-range communications with the terminal device.

Instead of the memory card and the portable medium, a portable terminal device storing the unique identifier may be used.

(10) In Embodiment 2, the following modifications may be adopted.

The authenticity evaluation unit 210 may evaluate the authenticity of the control program stored in the terminal device 300 by using the unique identifier received by the unique identifier acquisition unit 216 and the user identifier and the password acquired by the account verification unit 215. Specifically, the evaluation is performed by the following determination processes and their combinations.

(a) Determine whether the acquired unique identifier matches the unique identifier recorded in the account management table 261.

(b) Determine whether the acquired user identifier and password match the user identifier and password listed in the account management table 261.

(c) Determine whether or not the associated data generated by the verification server device 200 matches the associated data embedded into the control program by the terminal device 300.

The appliance control unit 213 permits or prohibits remote control of the appliance 500 according to the combination of the results of these determination processes. For example, if even one of (a) through (c) is negative, the appliance control unit 213 prohibits the remote control of the appliance 500. If all of (a) through (c) are positive, the appliance control unit 213 permits the remote control of the appliance 500.

(11) In Embodiment 2, the following modifications may be adopted.

The authenticity evaluation unit 210 performs the following evaluation.

(a) Determine whether the acquired unique identifier matches the unique identifier recorded in the account management table 261.

(b) Determine whether or not the generated associated data matches the associated data embedded in the control program.

When a unique identifier mismatch occurs in (a), or when an associated data mismatch occurs in (b), the authenticity evaluation unit 210 requests the terminal device 300 to instruct the user to input the user identifier and the password.

The account acquisition unit 908 of the terminal device 300 requests the user to input the user identifier and the password, and receives the user identifier and the password from the user. Subsequently, the account acquisition unit 908 transmits the user identifier and the password to the verification server device 200.

The account verification unit 215 of the verification server device 200 receives the user identifier and the password, and determines whether the user identifier and the password thus received are recorded in the account management table 261.

When the user identifier and the password are recorded in the account management table 261, the appliance control unit 213 permits the remote control of the appliance 500. When the user identifier and the password are not recorded in the account management table 261, the appliance control unit 213 prohibits the remote control of the appliance 500.

(12) In Embodiment 2 above, the time point when the instruction to start up the control program is received is called the first time point, and the unique identifier Y is acquired at the first time point. Similarly, the time point when the operational instruction is received is called the second time point, and the unique identifier Y' is acquired at the second time point.

However, this is not essential. The first time point may be the point when the control program is initially started up, or any point when the control program is started up.

Alternatively, the first time point may be the point when the control program is installed in Step S125 shown in FIG. 17. The unique identifier Y may be acquired at this first time point.

Alternatively, the first time point may be the point when the operational instruction is received in Step S181 shown in FIG. 20. The unique identifier Y may be acquired at this first time point. The second time point may be the point when another operational instruction is received from the user. The unique identifier Y' may be acquired at this second time point.

(13) Each device described above may be realized as a computer system including a microprocessor, ROM, RAM, a hard disk device, and so on. The RAM or the hard disk device stores a computer program. The microprocessor operates according to the computer program and thereby realizes the functions of each device. The computer program is made up of a plurality of bundled instruction codes for making instructions to the computer so as to realise a predetermined function.

(14) The components of each device described above may be realized in whole or in part as a single system large scale integration (LSI). The system LSI is a super-multifunction LSI in which a plurality of components are integrated on a single chip. The system LSI is specifically realized as a computer system including a microprocessor, ROM, RAM, and so on. The RAM stores the computer program. The microprocessor operates according to the computer program and thereby realizes the functions of the system LSI.

The components of the above-described devices may be realised individually as separate chips, or else a subset of or all of the components may be realised as a single chip.

Although it is stated above that the components of each device described above may be realized in whole or in part as a single system LSI, the components may be realized with IC, LSI, super LSI, or ultra LSI whose degree of integration is different from the system LSI.

Also, the integration method is not limited to LSI. A dedicated circuit or general-purpose processor may also be used. It is also possible to use a Field Programmable Gate Array (FPGA) which can be programmed after manufacturing, or a reconfigurable processor whose internal circuit cells are reconfigurable in terms of their connections and settings.

Further still, advances and discoveries in semiconductor technology may lead to a new technology replacing LSI. Functional blocks may, of course, be integrated using such future technology.

(15) The components of each of the above-described devices may be in whole or in part realized as a removable IC card or as a simple module. The IC card and the module are each configured as a computer system having a microprocessor, ROM, RAM, and so on. The IC card and the module may also include the aforementioned super-multifunctional LSI. The microprocessor operates according to the computer program and thereby realizes the functions of the IC card or the module. The IC card and the module may be temper resistant.

(16) The computer program may be recorded on a computer readable recording medium, such as a flexible disk, a hard disk, a CD-ROM, an MO disc, a DVD, DVD-ROM, DVD-RAM, a Blu-ray Disc (BD)(registered trademark), semiconductor memory, and so on.

The computer program may be transmitted via electrical signal lines, wireless or wired communication lines, a network such as the Internet, or a data broadcasting network.

Also, the computer program may be recorded onto the recording medium and transferred, or may be transferred over a network, so as to be executed by another, independent computer system.

(17) The following may be adopted.

One aspect of the present invention is an authenticity verification system for executing information provision or remote operation of a user-owned terminal, the authenticity verification system including an authenticity verification server and a mobile terminal executing a program, wherein the program receives a partial program from the authenticity verification server, executes the partial program, and makes a notification of execution results to the authenticity verification server, the authenticity verification server verifies authenticity of the program based on the execution results received from the program, and when the authenticity is low, the program is restricted from executing an information presentation request or a terminal operation request.

The authenticity verification server may transmit the partial program to the program when the program is activated, and the partial program may be associated with a private number managed by the authenticity verification server, and the authenticity of the program may be evaluated according to results of executing the partial program.

The authenticity verification server may further comprise a unique ID storage device storing a unique ID, wherein the unique ID storage device may be connected to the mobile terminal, the unique ID storage device may make a notification of the unique ID stored therein to the authenticity verification server via the program, and the authenticity verification server may evaluate the authenticity of the program by verifying the unique ID received via the program.

Another aspect of the present invention is an authenticity verification server in an authenticity verification system for executing information provision or remote operation of a user-owned terminal, the authenticity verification system including the authenticity verification server and a mobile terminal executing a program, wherein the program receives a partial program from the authenticity verification server, executes the partial program, and makes a notification of execution results to the authenticity verification server, the authenticity verification server evaluates authenticity of the program based on the execution results received from the program, and when the authenticity is low, the program is restricted from executing an information presentation request or a terminal operation request.

The authenticity verification server may transmit the partial program when the program is initialized, and the partial program may be associated with a private number managed by the authenticity verification server, and the authenticity of the program may be evaluated according to results of executing the partial program.

The authenticity verification server may further comprise a unique ID storage device storing a unique ID, wherein the unique ID storage device may be connected to the mobile terminal, the unique ID storage device may make a notification of the unique ID stored therein to the authenticity verification server via the program, and the authenticity verification server may evaluate the authenticity of the program by verifying the unique ID received via the program.

Another aspect of the present invention is a program in an authenticity verification system for executing remote operation of a user-owned terminal, the authenticity verification system including an authenticity verification server, a mobile terminal executing the program, and a unique ID storage device storing a unique ID, wherein the program receives a partial program from the authenticity verification server, executes the partial program, and makes a notification of execution results to the authenticity verification server, the unique ID storage device is connected to the mobile terminal, the unique ID storage device makes a notification of the unique ID stored therein to the authenticity verification server via the program, the authenticity verification server evaluates authenticity of the program based on one or both of the execution results received from the program and the unique ID received via the program, when the authenticity of the program is low, the authenticity verification server restricts the program from executing an information presentation request or a terminal operation request, and the program generates a user presentation screen indicating whether or not a terminal operation is possible, according to operation possibility information for the terminal, a function, and a function group, as received from the authenticity verification server.

Another aspect of the present invention is a user interface for a program in an authenticity verification system for executing remote operation of a user-owned terminal, the authenticity verification system including an authenticity verification server and a mobile terminal executing the program, wherein the program generates a presentation user interface indicating an operable terminal, in accordance with operable terminal information received from the authenticity verification server, and an icon of the user-owned terminal is less active when not operable, compared to when the user-owned terminal is operable.

Another aspect of the present invention is a user interface for a program in an authenticity verification system for executing remote operation of a user-owned terminal, the authenticity verification system including an authenticity verification server and a mobile terminal executing the program, wherein the program generates a presentation user interface indicating an operable function, in accordance with operable function information received from the authenticity verification server, and an icon of the operable function is less active when not operable, compared to when the operable function is operable.

The authenticity verification system may further comprise a unique ID storage device, and the program may receive a notification of the unique ID as a message from the unique ID storage device, and may notify the authenticity verification server accordingly.

(18) One aspect of the present invention verifies whether the application or the operating system (OS) on the mobile terminal has been tampered with or is running in an illicit environment, thereby preventing output of personal information or constraining operation of home terminals when there is a high risk of spoofing. This decreases the risks posed by spoofed applications and increases safety.

Mechanisms are in place for safely managing a unique ID, defined to be globally unique, in an independent program execution environment. When a server verifying authenticity is able to acquire the unique ID via the program subject to evaluation, the mobile terminal executing the program and the device having the unique ID are highly likely to be in physical proximity to each other. As a result, the user is highly likely to be executing the program and operation in person. The device having the unique ID is an SD card, an internal HDD, a device having an internal flash memory, a USB memory, or similar.

Furthermore, the server verifying authenticity recreates a portion of the program, updates the corresponding portion of the program stored on the mobile terminal, reinitialises the updated portion of the program at the next instance of start-up, and detects tampering in the program. That is, time-varying data is incorporated to perform a check at each start-up, so that program tampering is highly likely to be detected and illicit operations are stopped.

(19) The above-described Embodiments and Modifications may be freely combined.

INDUSTRIAL APPLICABILITY

The method pertaining to the present invention, used in a system for remotely controlling an appliance, prevents a user's appliance from being remotely controlled by an unauthorized third party, and the method is therefore useful as technology of remotely controlling an appliance.

REFERENCE SIGNS LIST 10, 10a, 10b, 10c, 10d, 10e Remote control system
20 Network
100 Distribution server device
101 Control unit
102 Communication unit
103 Mutual authentication unit
104 Key storage unit
105 Storage unit
106 Account storage unit
107 Account verification unit
200 Verification server device
201 Control unit
202 Communication unit
203 Mutual authentication unit
204 Key storage unit
206 Program creation unit
207 Program storage unit
208 Associated data generation unit
209 Account storage unit
210 Authenticity evaluation unit
212 Appliance information storage unit
213 Appliance control unit
214 Signature generation unit
215 Account verification unit
216 Unique identifier acquisition unit
217 Appliance information management unit
300 Terminal device
301 Control unit
302 Communication unit
303 Mutual authentication unit
304 Key storage unit
305 Program storage unit
306 Program execution unit
307 Associated data storage unit
308 Input/output unit
309 Display unit
310 Input unit
311 Verification unit
400 Memory card
401 Control unit
403 Mutual authentication unit
404 Key storage unit
407 Unique identifier storage unit
408 Input/output unit
500 Appliance
501 Mechanism control unit
502 Communication unit
506 Instruction receiving unit
507 Information notification unit
508 Mechanism
510 Communication unit

The invention claimed is:

1. A method used in a remote control system for remotely controlling an appliance by execution of a remote control command contained in a control program stored in an operation terminal device, the method comprising:
  a first acquiring step of acquiring, at a first time point, a first identifier which is unique, the first identifier being acquired from a portable medium located close to an operation terminal device serving as a remote controller for the appliance;
  an embedding step of embedding the first identifier into the control program stored in the operation terminal device;
  a second acquiring step of acquiring, at a second time point later than the first time point, a second identifier which is unique, the second identifier being acquired from a portable medium located close to the operation terminal device serving as the remote controller for the appliance;
  a determining step of determining whether the first identifier embedded in the control program matches the second identifier acquired in the second acquiring step; and
  a prohibiting step of prohibiting remote control of the appliance when the first identifier does not match the second identifier, wherein
  the operation terminal device remotely controls the appliance via a server device,
  the server device stores the control program in which the first identifier has not been embedded, and
  the determining step includes:
    a first step, performed by the operation terminal device, of generating a first operation value by applying a one-way operation to the control program stored in the operation terminal device in which the first identifier has been embedded, and generating a second operation value by applying an operation to the first operation value and the second identifier;
    a second step, performed by the server device, of embedding the first identifier into the control program stored in the server device, generating a third operation value by applying a same one-way operation as said one-way operation to the control program in which the first identifier has been embedded, and generating a fourth operation value by applying a same operation as said operation to the third operation value and the first identifier, and
    a third step, performed by the server device, of determining whether the first identifier matches the second identifier by determining whether the second operation value matches the fourth operation value.

2. The method of claim 1, wherein
  the acquiring of the first identifier, the embedding into the control program, the acquiring of the second identifier, the determining and the prohibiting, respectively performed in the first acquiring step, the embedding step, the second acquiring step, the determining step, the determining step and the prohibiting step, are sequentially repeated, and in the embedding step, the first identifier is embedded into the control program every time the first identifier is acquired in the first acquiring step.

3. The method of claim 1, wherein
the first time point is a point when the operation terminal device receives an instruction to remotely control the appliance, and
in the first acquiring step, the first identifier is acquired each time the operation terminal device receives the instruction.

4. The method of claim 1, wherein
in the determining step, the control program in which the first identifier has been embedded is acquired, and the first identifier is extracted from the control program.

5. The method of claim 1, wherein
the control program includes a command region storing commands and a data region storing data, and
in the embedding step, the first identifier is embedded into the data region in the control program.

6. The method of claim 1, wherein
the control program includes a command region storing commands and a data region storing data, the commands including a dummy command that is not to be executed, and
in the embedding step, the first identifier is embedded into the dummy command in the control program.

7. The method of claim 1, wherein
in the embedding step, an embedding program for controlling the embedding of the first identifier into the control program is acquired, and the first identifier is embedded into the control program by execution of the embedding program by the operation terminal device.

8. The method of claim 7, wherein
the embedding program indicates an embedding position within the control program where the first identifier is to be embedded, and
in the embedding step, the first identifier is embedded into the embedding position within the control program.

9. The method of claim 1, wherein
the first time point is a point when the control program is installed onto the operation terminal device, a point when the control program in the operation terminal device is initially started up, or any point when the control program in the operation terminal device is started up, and
the second time point is a point when the operation terminal device receives the instruction to remotely control the appliance.

10. The method of claim 1, wherein
the first time point is a point when the operation terminal device receives a first remote control instruction to remotely control the appliance, and
the second time point is a point when the operation terminal device receives a second remote control instruction to remotely control the appliance.

11. A method used in a remote control system for remotely controlling an appliance by execution of a remote control command contained in a control program stored in an operation terminal device, the method comprising:
a first acquiring step of acquiring, at a first time point, a first identifier which is unique, the first identifier being acquired from a portable medium located close to an operation terminal device serving as a remote controller for the appliance;
an embedding step of embedding the first identifier into the control program stored in the operation terminal device;
a second acquiring step of acquiring, at a second time point later than the first time point, a second identifier which is unique, the second identifier being acquired from a portable medium located close to the operation terminal device serving as the remote controller for the appliance;
a determining step of determining whether the first identifier embedded in the control program matches the second identifier acquired in the second acquiring step; and
a prohibiting step of prohibiting remote control of the appliance when the first identifier does not match the second identifier, wherein
in the embedding step, a random number is generated, a conversion, which is reversible, is applied to the random number and the first identifier, and a conversion value obtained by the conversion is embedded into the control program, and
in the determining step, a reverse of the conversion is applied to the random number and the conversion value embedded in the control program, and the first identifier is thereby restored.

12. The method of claim 11, wherein
the acquiring of the first identifier, the embedding into the control program, the acquiring of the second identifier, the determining and the prohibiting, respectively performed in the first acquiring step, the embedding step, the second acquiring step, the determining step, the determining step and the prohibiting step, are sequentially repeated, and
in the embedding step, a different random number is generated each time the first identifier is acquired in the first acquiring step, the conversion is applied to the random number and the first identifier, and the conversion value obtained by the conversion is embedded into the control program.

13. A method used in a remote control system for remotely controlling an appliance by execution of a remote control command contained in a control program stored in an operation terminal device, the method comprising:
a first acquiring step of acquiring, at a first time point, a first identifier which is unique, the first identifier being acquired from a portable medium located close to an operation terminal device serving as a remote controller for the appliance;
an embedding step of embedding the first identifier into the control program stored in the operation terminal device;
a second acquiring step of acquiring, at a second time point later than the first time point, a second identifier which is unique, the second identifier being acquired from a portable medium located close to the operation terminal device serving as the remote controller for the appliance;
a determining step of determining whether the first identifier embedded in the control program matches the second identifier acquired in the second acquiring step; and
a prohibiting step of prohibiting remote control of the appliance when the first identifier does not match the second identifier, wherein
in the embedding step, the first identifier is divided into a plurality of identifier pieces, and the plurality of identifier pieces are dispersed over the control program or a portion of the control program, and
in the determining step, the plurality of identifier pieces are extracted from the control program or the portion of the control program, the plurality of identifier pieces are combined together, and the first identifier is thereby restored.

14. A method used in a remote control system for remotely controlling an appliance by execution of a remote control command contained in a control program stored in an operation terminal device, the method comprising:
    a first acquiring step of acquiring, at a first time point, a first identifier which is unique, the first identifier being acquired from a portable medium located close to an operation terminal device serving as a remote controller for the appliance;
    an embedding step of embedding the first identifier into the control program stored in the operation terminal device;
    a second acquiring step of acquiring, at a second time point later than the first time point, a second identifier which is unique, the second identifier being acquired from a portable medium located close to the operation terminal device serving as the remote controller for the appliance;
    a determining step of determining whether the first identifier embedded in the control program matches the second identifier acquired in the second acquiring step; and
    a prohibiting step of prohibiting remote control of the appliance when the first identifier does not match the second identifier, wherein
    the operation terminal device remotely controls the appliance via a server device, and
    the method further comprises:
        a displaying step, performed by the operation terminal device, of displaying one or more instructions selectable by a user, from among a plurality of instructions to remotely control the appliance;
        a receiving step, performed by the operation terminal device, of receiving a single instruction selected by the user from among the plurality of instructions; and
        a transmitting step, performed by the operation terminal device, of transmitting the single instruction to the appliance via the server device.

15. A method used in a remote control system for remotely controlling an appliance by execution of a remote control command contained in a control program stored in an operation terminal device, the method comprising:
    a first acquiring step of acquiring, at a first time point, a first identifier which is unique, the first identifier being acquired from a portable medium located close to an operation terminal device serving as a remote controller for the appliance;
    an embedding step of embedding the first identifier into the control program stored in the operation terminal device;
    a second acquiring step of acquiring, at a second time point later than the first time point, a second identifier which is unique, the second identifier being acquired from a portable medium located close to the operation terminal device serving as the remote controller for the appliance;
    a determining step of determining whether the first identifier embedded in the control program matches the second identifier acquired in the second acquiring step; and
    a prohibiting step of prohibiting remote control of the appliance when the first identifier does not match the second identifier, wherein
    the operation terminal device remotely controls the appliance via a server device, and
    the method further comprises:
        a displaying step, performed by the operation terminal device, of displaying a first condition and a second condition in association with information on an operation of remotely controlling the appliance, the first condition being a condition for accepting the operation, and the second condition being a candidate for replacing the first condition;
        a receiving step, performed by the operation terminal device, of receiving an instruction to select the second condition from a user;
        a transmitting step of transmitting the second condition from the operation terminal device to the server device; and
        a storing step, performed by the server device, of storing the second condition instead of the first condition in association with the information on the operation of remotely controlling the appliance.

16. A system comprising:
    an operation terminal device remotely controlling an appliance by execution of a remote control command contained in a control program stored in the operation terminal device; the appliance; and
    a server device relaying a remote control instruction between the operation terminal device and the appliance, wherein
    the server device includes:
        a first acquiring unit acquiring, at a first time point, a first identifier which is unique, the first identifier being acquired from a portable medium located close to an operation terminal device serving as a remote controller for the appliance;
        a transmitting unit transmitting the first identifier to the operation terminal device in order to allow for embedding of the first identifier into the control program stored in the operation terminal device;
        a second acquiring unit acquiring, at a second time point later than the first time point, a second identifier which is unique, the second identifier being acquired from a portable medium located close to the operation terminal device serving as the remote controller for the appliance;
        a determining unit determining whether the first identifier embedded in the control program matches the second identifier acquired by the second acquiring unit; and
        a prohibiting unit prohibiting remote control of the appliance when the first identifier does not match the second identifier,
    the operation terminal device includes:
        an acquiring unit acquiring an identifier from a portable medium located close to the operation terminal device, the identifier being unique to the portable medium;
        a transmitting unit transmitting the identifier to the server device; and
        an embedding unit receiving the first identifier from the server device and embedding the first identifier into the control program,
    the operation terminal device remotely controls the appliance via a server device,
    the server device stores the control program in which the first identifier has not been embedded,
    the operation terminal device generates a first operation value by applying a one-way operation to the control program stored in the operation terminal device in which the first identifier has been embedded, and generates a second operation value by applying an operation to the first operation value and the second identifier;

the server device embeds the first identifier into the control program stored in the server device, generates a third operation value by applying a same one-way operation as said one-way operation to the control program in which the first identifier has been embedded, and generates a fourth operation value by applying a same operation as said operation to the third operation value and the first identifier; and the determining unit determines whether the first identifier matches the second identifier by determining whether the second operation value matches the fourth operation value.

* * * * *